US009767017B2

(12) United States Patent
Talagala et al.

(10) Patent No.: US 9,767,017 B2
(45) Date of Patent: Sep. 19, 2017

(54) MEMORY DEVICE WITH VOLATILE AND NON-VOLATILE MEDIA

(71) Applicant: Fusion-io, Inc., Salt Lake City, UT (US)

(72) Inventors: Nisha Talagala, Livermore, CA (US); David Flynn, Sandy, UT (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 189 days.

(21) Appl. No.: 14/465,631

(22) Filed: Aug. 21, 2014

(65) Prior Publication Data

US 2014/0365707 A1 Dec. 11, 2014

Related U.S. Application Data

(63) Continuation of application No. 13/836,826, filed on Mar. 15, 2013, now Pat. No. 9,208,071, and a (Continued)

(51) Int. Cl.

*G06F 12/02* (2006.01)
*G06F 12/0804* (2016.01)

(Continued)

(52) U.S. Cl.

CPC ........ *G06F 12/0246* (2013.01); *G06F 3/0619* (2013.01); *G06F 3/0656* (2013.01); *G06F 3/0679* (2013.01); *G06F 12/0804* (2013.01); *G06F 13/28* (2013.01); *G06F 2212/202* (2013.01); *G06F 2212/7205* (2013.01)

(58) Field of Classification Search

USPC .......................................... 710/308; 711/103
See application file for complete search history.

(56) References Cited

U.S. PATENT DOCUMENTS

| | | | |
|---|---|---|---|
| 4,980,861 | A | 12/1990 | Herdt et al. |
| 5,193,184 | A | 3/1993 | Belsan et al. |

(Continued)

FOREIGN PATENT DOCUMENTS

| | | |
|---|---|---|
| CN | 1771495 | 5/2006 |
| EP | 0747822 | 12/1996 |

(Continued)

OTHER PUBLICATIONS

Volos, Haris, "Mnemosyne: Lightweight Persistent Memory", ASPLOS, Mar. 5-11, 2011, Newport Beach, California, US.

(Continued)

*Primary Examiner* — Ryan Bertram
*Assistant Examiner* — Tracy Chan
(74) *Attorney, Agent, or Firm* — Kunzler Law Group, PC

(57) ABSTRACT

Apparatuses, systems, methods, and computer program products are disclosed for providing a memory device with volatile and non-volatile media. A volatile memory medium is on a circuit board configured to be installed on a memory bus of a processor. A non-volatile memory medium is on the same circuit board. A mapping module is configured to selectively store data in either the volatile memory medium or the non-volatile memory medium. The data is provided by way of one or more commands from the processor.

19 Claims, 13 Drawing Sheets

Related U.S. Application Data continuation-in-part of application No. 13/694,000, filed on Dec. 4, 2012, now Pat. No. 9,047,178, said application No. 13/836,826 is a continuation-in-part of application No. 13/324,942, filed on Dec. 13, 2011, now Pat. No. 8,527,693.

(60) Provisional application No. 61/583,133, filed on Jan. 4, 2012, provisional application No. 61/705,058, filed on Sep. 24, 2012, provisional application No. 61/691,221, filed on Aug. 20, 2012, provisional application No. 61/661,742, filed on Jun. 19, 2012, provisional application No. 61/637,257, filed on Apr. 23, 2012, provisional application No. 61/422,635, filed on Dec. 13, 2010.

(51) Int. Cl.
*G06F 3/06* (2006.01)
*G06F 13/28* (2006.01)

(56) References Cited

U.S. PATENT DOCUMENTS 5,261,068 A 11/1993 Gaskins et al.
5,325,509 A 6/1994 Lautzenheiser
5,404,485 A 4/1995 Ban
5,438,671 A 8/1995 Miles
5,479,630 A 12/1995 Killian
5,502,833 A 3/1996 Byrn et al.
5,504,882 A 4/1996 Chai
5,535,399 A 7/1996 Blitz
5,548,757 A 8/1996 Matsuyama
5,553,261 A 9/1996 Hasbun et al.
5,590,304 A 12/1996 Adkisson
5,594,883 A 1/1997 Pricer
5,598,370 A 1/1997 Nijima et al.
5,638,289 A 6/1997 Yamada et al.
5,651,133 A 7/1997 Burkes
5,682,497 A 10/1997 Robinson
5,682,499 A 10/1997 Bakke et al.
5,701,434 A 12/1997 Nakagawa
5,721,874 A 2/1998 Carnevale
5,742,787 A 4/1998 Talreja
5,754,563 A 5/1998 White
5,799,140 A 8/1998 Niijima et al.
5,799,200 A 8/1998 Brant et al.
5,802,602 A 9/1998 Rahman et al.
5,805,501 A 9/1998 Shiau et al.
5,812,457 A 9/1998 Arase
5,845,329 A 12/1998 Onishi et al.
5,893,086 A 4/1999 Schmuck et al.
5,915,124 A 6/1999 Morris, III
5,960,462 A 9/1999 Solomon et al.
6,000,019 A 12/1999 Dykstal et al.
6,006,323 A 12/1999 Ma et al.
6,014,724 A 1/2000 Jennett
6,125,072 A 9/2000 Wu
6,128,630 A 10/2000 Shackelford
6,148,377 A 11/2000 Carter
6,170,039 B1 1/2001 Kishida
6,170,047 B1 1/2001 Dye
6,173,381 B1 1/2001 Dye
6,181,630 B1 1/2001 Caulkins
6,185,654 B1 2/2001 Van Doren
6,205,521 B1 3/2001 Schumann
6,236,593 B1 5/2001 Hong et al.
6,240,040 B1 5/2001 Akaogi et al.
6,256,642 B1 7/2001 Krueger et al.
6,278,633 B1 8/2001 Wong et al.
6,295,571 B1 9/2001 Scardamalia et al.
6,295,581 B1 9/2001 DeRoo
6,330,688 B1 12/2001 Brown
6,336,174 B1 1/2002 Li et al.
6,356,986 B1 3/2002 Solomon et al.
6,370,631 B1 4/2002 Dye
6,385,688 B1 5/2002 Mills
6,385,710 B1 5/2002 Goldman et al.
6,404,647 B1 6/2002 Minne
6,412,080 B1 6/2002 Fleming et al.
6,418,478 B1 7/2002 Ignatius et al.
6,467,011 B2 10/2002 Scardamalia et al.
6,470,238 B1 10/2002 Nizar et al.
6,507,911 B1 1/2003 Langford
6,515,909 B1 2/2003 Wooldridge
6,515,928 B2 2/2003 Sato et al.
6,523,102 B1 2/2003 Dye et al.
6,552,955 B1 4/2003 Miki
6,564,285 B1 5/2003 Mills
6,587,915 B1 7/2003 Kim
6,601,211 B1 7/2003 Norman
6,608,793 B2 8/2003 Park et al.
6,625,685 B1 9/2003 Cho et al.
6,629,112 B1 9/2003 Shank
6,633,950 B1 10/2003 Brown et al.
6,633,956 B1 10/2003 Mitani
6,643,181 B2 11/2003 Sofer et al.
6,655,758 B2 12/2003 Pasotti et al.
6,658,438 B1 12/2003 Moore et al.
6,671,757 B1 12/2003 Multer et al.
6,683,810 B2 1/2004 Sakamoto
6,694,453 B1 2/2004 Shukla et al.
6,715,027 B2 3/2004 Kim et al.
6,715,046 B1 3/2004 Shoham et al.
6,735,546 B2 5/2004 Scheuerlein
6,751,155 B2 6/2004 Gorobets
6,754,774 B2 6/2004 Gruner et al.
6,760,806 B2 7/2004 Jeon
6,775,185 B2 8/2004 Fujisawa et al.
6,779,088 B1 8/2004 Benveniste et al.
6,785,785 B2 8/2004 Piccirillo et al.
6,807,097 B2 10/2004 Takano et al.
6,845,053 B2 1/2005 Chevallier
6,849,480 B1 2/2005 Low et al.
6,865,657 B1 3/2005 Traversat et al.
6,871,257 B2 3/2005 Conley et al.
6,877,076 B1 4/2005 Cho et al.
6,880,049 B2 4/2005 Gruner et al.
6,883,079 B1 4/2005 Priborsky
6,887,058 B2 5/2005 Fujiwara
6,892,298 B2 5/2005 West
6,938,133 B2 8/2005 Johnson et al.
6,957,158 B1 10/2005 Hancock et al.
6,959,369 B1 10/2005 Ashton et al.
6,973,551 B1 12/2005 Walton
6,977,847 B2 12/2005 Lasser et al.
6,981,070 B1 12/2005 Luk et al.
6,990,547 B2 1/2006 Ulrich et al.
6,996,676 B2 2/2006 Megiddo
7,010,652 B2 3/2006 Piccirillo et al.
7,042,664 B2 5/2006 Gill et al.
7,043,599 B1 5/2006 Ware et al.
7,050,337 B2 5/2006 Iwase et al.
7,057,936 B2 6/2006 Yaegashi et al.
7,058,769 B1 6/2006 Danilak
7,064,994 B1 6/2006 Wu
7,089,391 B2 8/2006 Geiger et al.
7,096,321 B2 8/2006 Modha
7,127,507 B1 10/2006 Clark et al.
7,167,944 B1 1/2007 Estakhri
7,167,953 B2 1/2007 Megiddo et al.
7,173,852 B2 2/2007 Gorobets
7,177,197 B2 2/2007 Cernea
7,181,572 B2 2/2007 Walmsley
7,185,162 B1 2/2007 Snyder
7,194,577 B2 3/2007 Johnson et al.
7,194,740 B1 3/2007 Frank et al.
7,219,238 B2 5/2007 Saito et al.
7,227,777 B2 6/2007 Roohparvar
7,243,203 B2 7/2007 Scheuerlein
7,246,179 B2 7/2007 Camara et al.
7,257,129 B2 8/2007 Lee et al.
7,257,690 B1 8/2007 Baird
7,263,591 B2 8/2007 Estakhri et al.

(56) References Cited

U.S. PATENT DOCUMENTS 7,275,135 B2 9/2007 Coulson
7,305,520 B2 12/2007 Voigt et al.
7,310,711 B2 12/2007 New et al.
7,328,307 B2 2/2008 Hoogterp
7,340,558 B2 3/2008 Lee et al.
7,340,566 B2 3/2008 Voth
7,340,581 B2 3/2008 Gorobets et al.
7,380,081 B2 5/2008 Ji et al.
7,398,348 B2 7/2008 Moore et al.
7,400,537 B2 7/2008 Hemink et al.
7,403,424 B2 7/2008 Hemink et al.
7,424,593 B2 9/2008 Estakhri et al.
7,441,090 B2 10/2008 Estakhri et al.
7,450,420 B2 11/2008 Sinclair et al.
7,451,344 B1 11/2008 Rothberg
7,457,166 B2 11/2008 Hemink et al.
7,460,432 B2 12/2008 Warner
7,463,521 B2 12/2008 Li
7,463,532 B2 12/2008 Tran et al.
7,464,240 B2 12/2008 Caulkins et al.
7,480,766 B2 1/2009 Gorobets
7,487,320 B2 2/2009 Bansal et al.
7,495,954 B2 2/2009 Ito
7,499,317 B2 3/2009 Ito
7,499,338 B2 3/2009 Ito
7,522,457 B2 4/2009 Hemink et al.
7,532,537 B2 5/2009 Solomon et al.
7,535,766 B2 5/2009 Ito
7,548,464 B2 6/2009 Kim
7,552,271 B2 6/2009 Sinclair et al.
7,599,967 B2 10/2009 Girkar et al.
7,619,912 B2 11/2009 Bhakta et al.
7,630,255 B2 12/2009 Yang
7,631,138 B2 12/2009 Gonzalez et al.
7,644,239 B2 1/2010 Ergan et al.
7,652,922 B2 1/2010 Kim
7,694,191 B1 4/2010 Bono et al.
7,725,628 B1 5/2010 Phan et al.
7,743,210 B1 6/2010 Jernigan, IV et al.
7,752,360 B2 7/2010 Galles
7,761,625 B2 7/2010 Karamcheti et al.
7,773,521 B2 8/2010 Zhang et al.
7,777,652 B2 8/2010 Lee et al.
7,778,092 B2 8/2010 Klein
7,793,061 B1 * 9/2010 Gupta ................ G06F 11/1441 711/108
7,818,525 B1 10/2010 Frost et al.
7,856,528 B1 12/2010 Frost et al.
7,873,782 B2 1/2011 Terry
7,881,150 B2 2/2011 Solomon et al.
7,898,867 B2 3/2011 Hazama et al.
7,903,468 B2 3/2011 Litsyn et al.
7,908,501 B2 3/2011 Kim et al.
7,930,326 B2 4/2011 Doucette et al.
7,944,762 B2 5/2011 Gorobets
7,970,770 B2 6/2011 Edwards
7,978,541 B2 7/2011 Sutardja
8,001,334 B2 8/2011 Lee
8,001,434 B1 8/2011 Lee et al.
8,010,738 B1 8/2011 Chilton et al.
8,010,758 B1 8/2011 Bezbaruah et al.
8,046,551 B1 10/2011 Sahin
8,055,922 B2 11/2011 Brittain et al.
8,074,041 B2 12/2011 Clark et al.
8,081,536 B1 12/2011 Solomon et al.
8,130,551 B2 3/2012 Oowada et al.
8,250,295 B2 8/2012 Amidi et al.
8,289,801 B2 10/2012 Smith et al.
8,301,833 B1 10/2012 Chen et al.
8,359,501 B1 1/2013 Lee et al.
8,364,888 B2 1/2013 Melik-Martirosian et al.
8,397,013 B1 * 3/2013 Rosenband ........... G06F 13/385 365/205
8,423,710 B1 4/2013 Gole
8,429,436 B2 4/2013 Fillingim et al.
8,516,185 B2 8/2013 Lee et al.
8,516,187 B2 8/2013 Chen et al.
8,527,693 B2 9/2013 Flynn et al.
8,549,230 B1 10/2013 Chatterjee et al.
9,047,178 B2 6/2015 Talagala et al.
9,208,071 B2 12/2015 Talagala et al.
9,218,278 B2 12/2015 Talagala et al.
9,223,662 B2 12/2015 Flynn et al.
9,305,610 B2 4/2016 Smith et al.
2002/0066047 A1 5/2002 Olarig et al.
2002/0069318 A1 6/2002 Chow et al.
2002/0103819 A1 8/2002 Duvillier et al.
2002/0133743 A1 9/2002 Oldfield et al.
2002/0138686 A1 9/2002 Yang et al.
2002/0181134 A1 12/2002 Bunker et al.
2002/0199056 A1 12/2002 Ayukawa et al.
2003/0028704 A1 2/2003 Mukaida et al.
2003/0028726 A1 2/2003 Gaertner et al.
2003/0061296 A1 3/2003 Craddock et al.
2003/0115405 A1 6/2003 Funyu et al.
2003/0126475 A1 7/2003 Bodas
2003/0145230 A1 7/2003 Chiu et al.
2003/0163630 A1 8/2003 Aasheim et al.
2003/0163663 A1 8/2003 Aasheim et al.
2003/0198084 A1 10/2003 Fujisawa et al.
2003/0210601 A1 11/2003 Lin et al.
2004/0003002 A1 1/2004 Adelmann
2004/0064647 A1 4/2004 DeWhitt et al.
2004/0103238 A1 5/2004 Avraham et al.
2004/0148360 A1 7/2004 Mehra et al.
2004/0177054 A1 9/2004 Stern et al.
2004/0186946 A1 9/2004 Lee
2004/0225719 A1 11/2004 Kisley et al.
2004/0268359 A1 12/2004 Hanes
2005/0002263 A1 1/2005 Iwase et al.
2005/0015539 A1 1/2005 Horii et al.
2005/0018527 A1 1/2005 Gorobets
2005/0027951 A1 2/2005 Piccirillo et al.
2005/0141313 A1 6/2005 Gorobets
2005/0144361 A1 6/2005 Gonzalez et al.
2005/0172099 A1 8/2005 Lowe
2005/0193166 A1 9/2005 Johnson et al.
2005/0210323 A1 9/2005 Batchelor et al.
2005/0216653 A1 9/2005 Aasheim et al.
2005/0240713 A1 10/2005 Wu
2005/0246510 A1 11/2005 Retnamma et al.
2005/0246558 A1 11/2005 Ku
2005/0257017 A1 11/2005 Yagi
2005/0257213 A1 11/2005 Chu et al.
2005/0262150 A1 11/2005 Krishnaswamy
2005/0267882 A1 12/2005 Aupperlee et al.
2005/0270927 A1 12/2005 Hayashi
2005/0273476 A1 12/2005 Wertheimer
2006/0004955 A1 1/2006 Ware et al.
2006/0020744 A1 1/2006 Sinclair
2006/0026221 A1 2/2006 Chen et al.
2006/0059326 A1 3/2006 Aasheim et al.
2006/0064556 A1 3/2006 Aasheim et al.
2006/0069870 A1 3/2006 Nicholson et al.
2006/0074877 A1 4/2006 Kuersch et al.
2006/0075057 A1 4/2006 Gildea et al.
2006/0085471 A1 4/2006 Rajan et al.
2006/0095659 A1 5/2006 New et al.
2006/0106990 A1 5/2006 Benhase et al.
2006/0117056 A1 6/2006 Havewala et al.
2006/0136464 A1 6/2006 Rossmann
2006/0136779 A1 6/2006 Lee et al.
2006/0139069 A1 6/2006 Frank et al.
2006/0149893 A1 7/2006 Barfuss et al.
2006/0149916 A1 7/2006 Nase
2006/0179263 A1 8/2006 Song et al.
2006/0184722 A1 8/2006 Sinclair
2006/0184736 A1 8/2006 Benhase et al.
2006/0190552 A1 8/2006 Henze et al.
2006/0212644 A1 9/2006 Acton et al.
2006/0230295 A1 10/2006 Schumacher et al.
2006/0248387 A1 11/2006 Nicholson et al.
2006/0265624 A1 11/2006 Moshayedi
2006/0265636 A1 11/2006 Hummler

(56) References Cited

U.S. PATENT DOCUMENTS

2006/0280048 A1 12/2006 Jung et al.
2006/0294300 A1 12/2006 Lubbers
2007/0016699 A1 1/2007 Minami
2007/0033325 A1 2/2007 Sinclair
2007/0033326 A1 2/2007 Sinclair
2007/0033327 A1 2/2007 Sinclair
2007/0033362 A1 2/2007 Sinclair
2007/0043900 A1 2/2007 Yun
2007/0050571 A1 3/2007 Nakamura
2007/0061508 A1 3/2007 Zweighaft
2007/0083530 A1 4/2007 Lakshminath et al.
2007/0086260 A1 4/2007 Sinclair
2007/0088666 A1 4/2007 Saito
2007/0118713 A1 5/2007 Guterman
2007/0143560 A1 6/2007 Gorobets
2007/0143566 A1 6/2007 Gorobets
2007/0156998 A1 7/2007 Gorobets
2007/0168641 A1 7/2007 Hummel et al.
2007/0168698 A1 7/2007 Coulson et al.
2007/0174574 A1 7/2007 Kano
2007/0179995 A1 8/2007 Prahlad et al.
2007/0198770 A1 8/2007 Horii et al.
2007/0204270 A1 8/2007 Shin
2007/0208790 A1 9/2007 Reuter et al.
2007/0220227 A1 9/2007 Long
2007/0230253 A1 10/2007 Kim
2007/0233937 A1 10/2007 Coulson et al.
2007/0233938 A1 10/2007 Cho et al.
2007/0234021 A1 10/2007 Ruberg et al.
2007/0239728 A1 10/2007 Smits
2007/0239926 A1 10/2007 Gyl et al.
2007/0245076 A1 10/2007 Chang et al.
2007/0245094 A1 10/2007 Lee et al.
2007/0260608 A1 11/2007 Hertzberg et al.
2007/0260813 A1 11/2007 Lin
2007/0260821 A1 11/2007 Zeffer et al.
2007/0266037 A1 11/2007 Terry
2007/0274150 A1 11/2007 Gorobets
2007/0276994 A1 11/2007 Caulkins et al.
2007/0300008 A1 12/2007 Rogers et al.
2008/0010395 A1 1/2008 Mylly et al.
2008/0016295 A1 1/2008 Yim et al.
2008/0025126 A1 1/2008 Jewell et al.
2008/0052477 A1 2/2008 Lee
2008/0052483 A1 2/2008 Rangarajan et al.
2008/0059820 A1 3/2008 Vaden et al.
2008/0080243 A1 4/2008 Edahiro et al.
2008/0104344 A1 5/2008 Shimozono et al.
2008/0117686 A1 5/2008 Yamada
2008/0126507 A1 5/2008 Wilkinson
2008/0126686 A1 5/2008 Sokolov et al.
2008/0140737 A1 6/2008 Garst et al.
2008/0141043 A1 6/2008 Flynn
2008/0162590 A1 7/2008 Kundu et al.
2008/0228992 A1 9/2008 Dumitru et al.
2008/0243966 A1 10/2008 Croisettier
2008/0256316 A1 10/2008 Evanchik et al.
2008/0263259 A1 10/2008 Sadovsky et al.
2008/0263305 A1 10/2008 Shu et al.
2008/0263569 A1 10/2008 Shu et al.
2008/0266973 A1 10/2008 Sekar et al.
2008/0282031 A1 11/2008 Tanoue
2008/0301475 A1 12/2008 Felter et al.
2008/0320323 A1 12/2008 Brittain et al.
2009/0031072 A1 1/2009 Sartore
2009/0031098 A1 1/2009 Sartore
2009/0037778 A1 2/2009 Resnick
2009/0091979 A1 4/2009 Shalvi
2009/0091996 A1 4/2009 Chen et al.
2009/0094676 A1 4/2009 Burugula et al.
2009/0106479 A1 4/2009 Okin et al.
2009/0125700 A1 5/2009 Kisel
2009/0136144 A1 5/2009 Gwak
2009/0144818 A1 6/2009 Kumar et al.
2009/0150599 A1 6/2009 Bennett
2009/0150605 A1 6/2009 Flynn et al.
2009/0150621 A1 6/2009 Lee
2009/0157989 A1 6/2009 Karamcheti et al.
2009/0172253 A1 7/2009 Rothman et al.
2009/0193183 A1 7/2009 Kudo et al.
2009/0204649 A1 8/2009 Wong et al.
2009/0239468 A1 9/2009 He et al.
2009/0248763 A1 10/2009 Rajan
2009/0276654 A1 11/2009 Butterworth
2009/0287887 A1 11/2009 Matsuki
2009/0292861 A1 11/2009 Kanevsky et al.
2009/0300312 A1 12/2009 Handschuh et al.
2010/0005228 A1 1/2010 Fukutomi
2010/0005259 A1 1/2010 Prahlad et al.
2010/0023682 A1 1/2010 Lee et al.
2010/0049913 A1 2/2010 Marcu et al.
2010/0082529 A1 4/2010 Mace et al.
2010/0095059 A1 4/2010 Kisley et al.
2010/0102999 A1 4/2010 Lee et al.
2010/0106754 A1* 4/2010 Condit ................ G06F 12/0804 707/822
2010/0106917 A1 4/2010 Ruberg et al.
2010/0110748 A1 5/2010 Best
2010/0122017 A1 5/2010 Toyama
2010/0124123 A1 5/2010 Lee
2010/0131826 A1 5/2010 Shalvi et al.
2010/0145915 A1 6/2010 Min et al.
2010/0146187 A1 6/2010 Grimsrud et al.
2010/0153680 A1 6/2010 Baum et al.
2010/0191898 A1* 7/2010 Kim .................... G06F 12/0246 711/103
2010/0199020 A1 8/2010 Lin et al.
2010/0205335 A1 8/2010 Phan et al.
2010/0211737 A1 8/2010 Flynn
2010/0217924 A1* 8/2010 Panabaker .............. G06F 12/06 711/103
2010/0228912 A1 9/2010 Huang et al.
2010/0228936 A1 9/2010 Wright et al.
2010/0235831 A1 9/2010 Dittmer
2010/0250831 A1 9/2010 O'Brien et al.
2010/0257304 A1 10/2010 Rajan et al.
2010/0262738 A1 10/2010 Swing et al.
2010/0262740 A1 10/2010 Borchers et al.
2010/0262757 A1 10/2010 Sprinkle et al.
2010/0262758 A1 10/2010 Swing et al.
2010/0262759 A1 10/2010 Borchers et al.
2010/0262760 A1 10/2010 Swing et al.
2010/0262761 A1 10/2010 Borchers et al.
2010/0262762 A1 10/2010 Borchers et al.
2010/0262766 A1 10/2010 Sprinkle et al.
2010/0262767 A1 10/2010 Borchers et al.
2010/0262773 A1 10/2010 Borchers et al.
2010/0262894 A1 10/2010 Swing et al.
2010/0262979 A1 10/2010 Borchers et al.
2010/0268974 A1 10/2010 Floyd et al.
2010/0287347 A1 11/2010 Cameron et al.
2010/0332716 A1 12/2010 Sheaffer et al.
2010/0332871 A1 12/2010 Allalouf et al.
2010/0332897 A1 12/2010 Wilson
2011/0004722 A1 1/2011 Jeddeloh
2011/0035562 A1 2/2011 Gaither
2011/0208911 A1 8/2011 Taguchi et al.
2011/0225364 A1 9/2011 Edwards
2012/0030408 A1 2/2012 Flynn et al.
2012/0096217 A1 4/2012 Son et al.
2012/0151118 A1 6/2012 Flynn et al.
2012/0239860 A1 9/2012 Atkisson et al.
2012/0239868 A1 9/2012 Ryan et al.
2012/0254515 A1 10/2012 Melik-Martirosian et al.
2014/0365707 A1 12/2014 Talagala et al.

FOREIGN PATENT DOCUMENTS

GB 0123416 9/2001
JP 10320270 11/1998
KR 20000026300 5/2000
KR 20010034476 4/2001
KR 20050024278 3/2005
KR 20060107728 10/2006

(56) References Cited

FOREIGN PATENT DOCUMENTS

| | | | |
|---|---|---|---|
| KR | 10-2004-0047584 | | 3/2010 |
| TW | 200825696 | | 6/2008 |
| WO | 0131512 | | 5/2001 |
| WO | 0201365 | | 1/2002 |
| WO | 2004077219 | | 9/2004 |
| WO | 2004077219 | A2 | 9/2004 |
| WO | 2004077219 | A2 | 9/2004 |
| WO | 2004099989 | | 11/2004 |
| WO | 2005103878 | | 4/2005 |
| WO | 2006062511 | | 6/2006 |
| WO | 2006065626 | | 6/2006 |
| WO | 2008130799 | | 3/2008 |
| WO | 2008070799 | | 4/2008 |
| WO | 2010053756 | | 5/2010 |
| WO | 2011106394 | | 9/2011 |
| WO | 2012050934 | | 4/2012 |
| WO | 2012082792 | | 6/2012 |

OTHER PUBLICATIONS

U.S. Appl. No. 14/011,395, Office Action, Oct. 31, 2014.
"Problem: Non-Volatile RAMs Today", AGIGATech, pp. 11, San Diego, California, US.
Application No. PCT/US2007/086691, International Preliminary Report on Patentability, Feb. 16, 2009.
"Introduction to Samsung's Linux Flash File System—RFS", Samsung Electronics, Nov. 2006, pp. 6, Application Note, Version 1.0.
Application No. PCT/US2014/048129, International Preliminary Report on Patentability, Feb. 18, 2016.
EP Application No. 11 848 174.6 Examination Report dated Mar. 16, 2016.
U.S. Appl. No. 14/011,395, Final Office Action, Jun. 26, 2014.
Sun, Kang-Deog, "A 3.3 V 32 Mb NAND Flash Memory with Incremental Step Pulse Programming Scheme", IEEE Journal of Solid-State Circuits, Nov. 30, 1995, pp. 8, vol. 30, No. 11.
U.S. Appl. No. 11/952,098, Office Action, Jan. 7, 2011.
U.S. Appl. No. 11/952,098, Office Action, Jan. 13, 2012.
U.S. Appl. No. 11/952,098, Office Action, Sep. 18, 2012.
U.S. Appl. No. 11/952,098, Office Action, Oct. 8, 2013.
U.S. Appl. No. 13/174,449, Office Action, Sep. 6, 2011.
U.S. Appl. No. 13/174,449, Office Action, Sep. 11, 2012.
Application No. PCT/US2007/086701, International Search Report and Written Opinion, May 6, 2008.
Application No. PCT/US2007/086702, International Preliminary Report on Patentability, Nov. 19, 2009.
Application No. PCT/US2007/086702, International Search Report and Written Opinion, Apr. 11, 2009.
Application No. 11848174.6, Search Report, Apr. 2, 2014.
U.S. Appl. No. 60/625,495, Nov. 6, 2044.
U.S. Appl. No. 60/718,768, Aug. 20, 2005.
U.S. Appl. No. 60/797,127, May 3, 2006.
"BiTMICRO Introduces E-Disk PMC flash Disk Module", BiTMICRO, May 18, 2004, pp. 2, Military & Aerospace Electronics East 2004, http://www.bitmicro.com/press_news_releases_20040518_prt.php.
Condit, Jeremy, "Better I/O Through Byte-Addressable, Persistent Memory", SOSP, Oct. 11-14, 2009, pp. 14, Big Sky, Montana, US.
Volos, Haris, "Mnemosyne: Lightweight Persistent Memory", ASPLOS, Mar. 5-11, 2011, pp. 13, Newport Beach, California, US.
Rose, Mike, "FPGA PCIe Bandwidth", University of California San Diego, Jun. 9, 2010, pp. 7.
U.S. Appl. No. 13/324,942, Notice of Allowance, May 2, 2013.
U.S. Appl. No. 14/011,395, Office Action, Jan. 16, 2014.
Lottiaux, Renaud, "OpenMosix, OpenSSI and Kerrighed: A Comparative Study", INRIA, Nov. 2004, pp. 23, No. 5399.
U.S. Appl. No. 13/694,000, Notice of Allowance, Feb. 4, 2015.
U.S. Appl. No. 13/836,826, Office Action, Feb. 24, 2015.
U.S. Appl. No. 14/011,395, Final Office Action, May 18, 2015.
U.S. Appl. No. 14/042,189, Office Action, Jun. 4, 2015.
Application No. 201180059862.6, Office Action Apr. 1, 2015.
Shibata, Noboru, "19nm 112.8mm 64Gb Multi-Level Flash Memory with 400Mb/s/pin 1.8V Toggle Mode Interface", Flash Memory Summit 2012, Santa Clara, California, US.
Agrawal, Vikas, "ECC and Signal Processing Technology for SSDs and Multi-bit per cell NAND Flash Memories", Forward Insights, 2012, pp. 21, 2nd Edition, Report No. FI-NFL-FSP-0112.
Application No. 201080050702.0, Office Action, Feb. 20, 2014.
U.S. Appl. No. 12/878,987, Notice of Allowance, Mar. 21, 2013.
U.S. Appl. No. 12/878,987, Office Action, Oct. 18, 2012.
Application No. EP11813216, Search Report, Nov. 7, 2013.
U.S. Appl. No. 13/372,430, Office Action, Apr. 21, 2014.
Application No. 201080050702.0, Office Action, Sep. 19, 2014.
U.S. Appl. No. 13/372,430, Advisory Action, Aug. 6, 2014.
U.S. Appl. No. 13/372,430, Office Action, Nov. 7, 2013.
U.S. Appl. No. 13/834,955, Office Action, Apr. 4, 2014.
"Intel Turbo Memory with User Pinning", Intel NAND Storage Solutions, 2008, pp. 4.
Macko, Peter, "Tracking Back References in Write-Anywhere File System", 8th USENIX Conference on File and Storage Technologies, Feb. 23-26, 2010, pp. 15, San Jose, California, US.
Application No. PCT/US2011/025885, International Search Report and Written Opinion, Sep. 28, 2011.
Application No. PCT/US2011/036539, International preliminary Report on Patentability, Nov. 13, 2012.
Application No. PCT/US2011/045801, International Search Report, Apr. 6, 2012.
Application No. PCT/US2011/065927, International Search Report, Aug. 28, 2012.
Application No. PCT/US2012/024927, International Search Report, Oct. 12, 2012.
Application No. PCT/US2012/024927, Written Opinion, Oct. 12, 2012.
Am29DL322D/323D/324D Data Sheet, Spansion, Jul. 2003, pp. 57, Publication No. 21534 Revision D, Amendment +7, Issue Date Oct. 7, 2004.
Application No. 11848174.6, Examination Report, Jun. 30, 2015.
U.S. Appl. No. 13/836,826, Notice of Allowance, Jul. 30, 2015.
U.S. Appl. No. 13/838,070, Notice of Allowance, Aug. 26, 2015.
U.S. Appl. No. 13/834,955, Final Office Action, Sep. 8, 2014.
U.S. Appl. No. 14/011,395, Notice of Allowance, Aug. 19, 2015.
Application No. PCT/US2012/024927, International Preliminary Report on Patentability, Aug. 13, 2013.
Application No. PCT/US2011/045801, International Preliminary Report on Patentability, Apr. 6, 2012.
Application No. PCT/US2011/065927, International Preliminary Report on Patentability, Aug. 28, 2012.
Application No. PCT/US2011/036539, International Preliminary Report on Patentability, Jan. 2, 2012.
Application No. PCT/US2007/025049, International Search Report, May 14, 2008.
U.S. Appl. No. 13/015,458, Office Action, Sep. 7, 2012.
Application No. PCT/US2011/025885, International Search Report, Sep. 28, 2011.
Application No. PCT/US2009/063938, International Preliminary Report on Patentability, Jun. 23, 2010.
U.S. Appl. No. 14/207,093, Office Action, Oct. 29, 2015.
U.S. Appl. No. 14/042,189, Final Office Action, Sep. 25, 2015.
Application No. PCT/US2014/048129, International Search Report and Written Opinion, Nov. 7, 2014.
U.S. Appl. No. 14/011,395, Office Action, Jun. 26, 2014.
Guerra, Jorge, "Software Persistent Memory", Florida International University, downloaded Jul. 11, 2013, pp. 13.
Coburn, Joel, "From ARIES to MARS: Reengineering Transaction Management for Next-Generation, Solid-State Drives", UCSD CSE Technical Report, downloaded Jul. 11, 2013, pp. 17, San Diego, California, US.
Application No. PCT/US2007/025049, International Preliminary Report on Patentability, Mar. 11, 2009.
"Introduction to Samsung's Linux Flash File System-RFS", Samsung Electronics, Nov. 2006, pp. 6, Application Note, Version 1.0.
Application No. 10816108.4, Examination Report, Feb. 4, 2014.

(56) References Cited

OTHER PUBLICATIONS

"NAND Flash 101: An Introduction to NAND Flash and How to Design It in to your Next Product", Micron Technical Note, 2006, pp. 28, TN-29-19: NAND Flash 101 Introduction.
Magenheimer, Dan, "(Take 2): Transcendent Memory ("tmem") for Linux", LWN Merchandise, Jul. 7, 2009, http://lwn.net/Articles/340409/.
Application No. 200780050983.8, Office Action, May 18, 2011.
PCT/US2007/025048, International Search Report and Written Opinion, May 27, 2008.
PCT/US2007/025048, International Preliminary Report on Patentability, Jun. 18, 2009.
U.S. Appl. No. 12/878,981, Notice of Allowance, Aug. 28, 2012.
Ajanovic, Jasmin, "PCI Express (PCIe") 3.0 Accelerator Features, Intel Corporation, 2008, pp. 10.
"Pivot3 RAIGE Storage Cluster" Pivot3 Technology Overview, Jun. 2007, pp. 17, White Paper.
PCT/US2007/025049, International Preliminary Report on Patentability, Mar. 11, 2009.
PCT/US2007/086701, International Preliminary Report on Patentability, Mar. 16, 2009.
Application No. 07865334.2, Office Action, Nov. 17, 2010.
Application No. 07865334.2, Office Action, Jan. 30, 2012.
PCT/US2007/086687, International Preliminary Report on Patentability, Mar. 18, 2009.
PCT/US2007/086687, International Search Report and Written Opinion, Sep. 5, 2008.
U.S. Appl. No. 11/952,101, Office Action, Jan. 6, 2011.
PCT/US2011/025885, International Search Report and Written Opinion, Sep. 28, 2011.
PCT/US2011/025885, International Preliminary Report on Patentability, Sep. 7, 2012.
U.S. Appl. No. 13/015,458, Notice of Allowance, Sep. 19, 2012.
Application No. 12176826.1, Search Report, Dec. 10, 2012.
U.S. Appl. No. 13/189,402, Notice of Allowance, Nov. 15, 2012.
PCT/US2007/086688, International Preliminary Report on Patentability, Mar. 16, 2009.
PCT/US2007/086688, International Search Report and Written Opinion, Apr. 28, 2008.
PCT/US2011/053795, International Search Report and Patentability, May 4, 2012.
U.S. Appl. No. 11/952,109, Office Action, Nov. 29, 2011.
U.S. Appl. No. 11/952,109, Office Action, May 1, 2012.
U.S. Appl. No. 11/952,109, Office Action, Mar. 17, 2011.
U.S. Appl. No. 11/952,109, Office Action, Jul. 1, 2011.
Application No. 200780050970.0, Office Action, Oct. 28, 2010.
Application No. 200780050970.0, Office Action, Jun. 29, 2011.
Application No. 200780050970.0, Office Action, Jan. 5, 2012.
PCT/US2007/086691, International Search Report and Written Opinion, May 8, 2008.
PCT/US2007/086691, International Preliminary Report on Patentability, Feb. 16, 2009.
U.S. Appl. No. 11/952,113, Office Action, Mar. 6, 2012.
U.S. Appl. No. 11/952,113, Office Action, Dec. 15, 2010.
Application No. 200780051020.X, Office Action, Nov. 11, 2010.
Application No. 200780051020.X, Office Action, Nov. 7, 2011.
Application No. 07865345.8, Office Action, Nov. 17, 2010.
Application No. 07865345.8, Office Action, Jan. 30, 2012.
U.S. Appl. No. 12/878,981, Notice of Allowance, Jun. 25, 2012.
"NAND Flash Memories and Programming NAND Flash Memories Using ELNEC Device Programmers", ELNEC, Aug. 2008, pp. 44, Application Note, an_elnec_nand_flash, version 2.10.
Wright, Charles P., "Amino: Extending ACID Semantics to the File System", first cited Feb. 15, 2012, pp. 1.
"File Level Caching", Adabas, accessed Aug. 3, 2012, pp. 9, http://documentation.softwareag.com/adabas/ada824mfr/addons/acf/services/file-level-taching.htm.
Gal, Eran, "A Transactional Flash File System for Microcontrollers", Tel-Aviv University, 2005, pp. 16, USENIX Annual Technical Conference.
Garfinkel, Simson L., "One Big File is Not Enough", Harvard University, Jun. 28, 2006, pp. 31.
Gutmann, Peter, "Secure Deletion of Data from Magnetic and Solid-State Memory", Sixth USENIX Security Symposium Proceedings, Jul. 22-25, 1996, pp. 18, San Jose, California, US.
"Information Technology-SCSI Object-Based Storage Device Commands (OSD)", Seagate Technology, Jul. 30, 2004, pp. 187, Project T10/1355-D, Revision 10.
Kawaguchi, Atsuo, "A Flash-Memory Based File System", Hitachi, Ltd., 1995, pp. 10, Hatoyama, Saitama, Japan.
Leventhal, Adam, "Flash Storage Memory", Communications of the ACM, Jul. 2008, pp. 5, vol. 51, No. 7.
Kim, Jin-Ki, "Low Stress Program and Single Wordline Erase Schemes for NAND Flash Memory", MOSAID Technologies Inc., 2007, pp. 2, 1-4244-0753-2/07, Ontario, Canada.
Mesnier, Mike, "Object-Based Storage", IEEE Communications Magazine, Aug. 2003, pp. 7, 0163-6804/03.
Morgenstern, David, "Is There a Flash Memory RAID in Your Future?", Ziff Davis Enterprise Holdings, Inc., Nov. 8, 2006, pp. 4.
"File System Primer", CoolSolutionsWiki, downloaded Oct. 18, 2006, pp. 5, http://wiki.novell.com/index.php/File_System_Primer.
PCT/US2008/059048, International Search Report and Written Opinion, Aug. 25, 2008.
PCT/US2010/048320, International Search Report and Written Opinion, Apr. 28, 2011.
PCT/US2010/048321, International Search Report and Written Opinion, Apr. 28, 2011.
Porter, Donald E., "Operating System Transactions", University of Texas at Austin, Oct. 11-14, 2009, pp. 20, Big Sky, Montana, US.
Arpaci-Duseau, Andrea C., "Removing the Costs of Indirection in Flash-based SSDs with Nameless Writes", University of sconsin-Madison, Microsoft Research, Jun. 2010, pp. 5.
Rosenblum, Mendel, "The Design and Implementation of a Log-Structured File System", ACM Transactions on Computer Systems, Feb. 1992, pp. 27, vol. 10, No. 1.
Sears, Russell C., "Statis: Flexible Transactional Storage", University of California at Berkeley, Jan. 8, 2010, pp. 176, Technical Report No. UCB/EECS-2010-2, http://www.eecs.berkeley.edu/Pubs/TechRpts/2010/EECS-2010-2.html.
Seltzer, Margo Ilene, "File System Performance and Transaction Support", University of California at Berkeley, 1983, pp. 131.
Seltzer, Margo I., "Transaction Support in a Log-Structured File System", Harvard University, Jan. 1, 1993, pp. 8.
Seltzer, Margo, "Transaction Support in Read Optimized and Write Optimized File Systems", University of California, 1990, pp. 12, Proceedings of the 16th VLDB Conference, Brisbane, Australia.
"Data Management Software (DMS) for AMD Simultaneous Read/Write Flash Memory Devices", Spansion, Jul. 2003, pp. 10, Publication No. 22274, Revision A, Amendment 0.
Spillane, Richard P., "Enabling Transactional File Access via Lightweight Kernel Extensions", IBM T. J. Watson Research Center, 2009, pp. 23, Proceedings of the 7th USENIX Conference on File and Storage Technologies.
Tal, Arie, "NAND vs. NOR Flash Technology", Hearst Electronic Products, Mar. 5, 2013, pp. 3, http://www.electronicproducts.com/Digital_ICs/NAND_vs_NOR_flash.
Van Hensbergen, Eric, "Dynamic Policy Disk Caching for Storage Networking", IBM Research Report, Nov. 28, 2006, pp. 13, RC24123 (W0611-189).
Volos, Haris, "Mnemosyne: Lightweight Persistent Memory", University of Wisconsin-Madison, Mar. 5-11, 2011, pp. 13, ASPLOS'11.
Plank, James S., "A Tutorial on Reed-Solomon Coding for Fault-Tolerance in RAID-like Systems", University of Tennessee, first cited Jan. 9, 2012, pp. 19, Technical Report CS-96-332, http://www.cs.utk.edu/~plank/papers/cs-03-504.html.
"Actel Fusion FPGAs Supporting Intelligent Peripheral Management Interface (IPMI) Applications", Actel, Oct. 2006, pp. 17, Application Note AC286.
"Method for Fault Tolerance in Nonvolatile Storage", PriorArtDatabase, Feb. 3, 2005, pp. 6, IPCOM000042269D.

(56) References Cited

OTHER PUBLICATIONS

Ari, Ismail, "Performance Boosting and Workload Isolation in Storage Area Networks with SANCache", Hewlett Packard Laboratories, May 2006, pp. 11, Proceedings of the 23rd IEEE/14th NASA Goddard Conference on Mass Storage Systems and Technologies (MSST 2006), College Park, Maryland, US.
"ASPMC-660 Rugged IDE Flash Drive PMC Module", ASINE, copyright 2002, pp. 3, http://www.asinegroup.com/products/aspmc660.html.
Brandon, Daniel, Jr., "Sparse Matrices in CS Education", Consortium for Computing Sciences in Colleges, 2009, pp. 6.
Coburn, Joel, "NV-Heaps: Making Persistent Objects Fast and Safe with Next-Generation, Non-Volatile Memories", University of California, San Diego, Mar. 5-11, 2011, pp. 13, 2011 ACM 978-1-4503-0266-1/11/03, Newport Beach, California, US.
Dan, Raz, "Implementing MLC NAND Flash for Cost-Effective, High-Capacity Memory", M-Systems White Paper, Sep. 2003, pp. 13, 91-SR-014-02-8L, Rev 1.1.
Application No. 200780051020.X, Office Action, Jul. 6, 2011.
Application No. PCT/US2011/064728, International Search and Written Opinion, Jul. 31, 2012.
Mellor, Chris, "New RAM Shunts Data into Flash in Power Cuts", The Channel, Oct. 29, 2011, http://www.channelregister.co.uk/2011/10/19/viking_hybrid_dram_nand/.
AgigaRAM Company, Technology Review, Feb. 17, 2010.
"Problem—Non-Volatile RAMs Today", AgigaTech, pp. 11.
"Finding the Perfect Memory", AgigaTech, Sep. 3, 2009, pp. 15, Agiga Tech White Paper.
"Bulletproof Memory for RAID Servers, Part 1", Agigatech, 2009, pp. 4, http://agigatech.com/blog/bulletproof-memory-for-raid-servers-part-1/.
Ajanovic, Jasmin, "PCI Express* (PCIe*) 3.0 Accelerator Features", Intel Corporation, 2008, pp. 10.
"DDRdrive Hits the ground Running with its PCI-E RAM-based SSD", PCPerspective, pp. 2, downloaded Dec. 10, 2010, pp. 2, http://www.peper.com/article.php?aid=704.
Hutsell, Woody, "An In-Depth Look at the RamSan-500 Cached Flash Solid State Disk", Texas Memory Systems, Mar. 2008, pp. 16.
Shrout, Ryan, "Gigabyte iRAM Solid State SATA Storage Review", part 1, PCPerspective, Apr. 5, 2006, pp. 2, http://www.pcper.com/article.php?aid=224&type=expert.
Shrout, Ryan, "Gigabyte iRAM Solid State SATA Storage Review", part 2, PCPerspective, Apr. 5, 2006, pp. 4, http://www.pcper.com/article.php?aid=224&type=expert&pid=3.
"Internet Backbone and Colocation Provider", Hurricane Electric Internet Services, downloaded Sep. 28, 2011, p. 1, http://www.he.net/.
Savov, Vlad, "Viking Modular's SATADIMM Jacks an SSD Into Your Memory Slot", Engadget, Aug. 27, 2010, pp. 6, http://www.engadget.com/2010/08/27/viking-modulars-satadimm-jacks-an-ssd-into-your.
Wu, Michael, "eNVy: A Non-Volatile, Main Memory Storage System", ACM, 1994, pp. 12, 0-89791-660-3/94/0010, San Jose, California, US.
Application No. PCT/US2011/053792, International Search Report and Written Opinion, May 4, 2012.
Application No. PCT/US2011/053792, International Preliminary Report on Patentability, Apr. 11, 2013.
U.S. Appl. No. 13/248,006, Office Action, Aug. 30, 2013.
U.S. Appl. No. 13/248,006, Notice of Allowance, Nov. 8, 2013.
Korean Patent Application No. 10-2012-7009151 Preliminary Rejection, Apr. 21, 2016.
U.S. Appl. No. 14/042,189 Office Action mailed Jun. 30, 2016.
U.S. Appl. No. 14/207,093, Final Office Action mailed May 20, 2016.
U.S. Appl. No. 14/207,002 Non-Final Rejection mailed Aug. 2, 2016.
U.S. Appl. No. 14/042,189 Final Rejection mailed Dec. 1, 2016.
U.S. Appl. No. 14/207,093 Non-Final Rejection mailed Jan. 17, 2017.
U.S. Appl. No. 14/207,093 Final Office Action dated May 5, 2017.
U.S. Appl. No. 14/042,189 Notice of Allowance dated May 30, 2017.

* cited by examiner

MEMORY DEVICE WITH VOLATILE AND NON-VOLATILE MEDIA

CROSS-REFERENCES TO RELATED APPLICATIONS

This application is a continuation of and claims priority to U.S. patent application Ser. No. 13/836,826, now U.S. Pat. No. 9,208,071, entitled "APPARATUS, SYSTEM, AND METHOD FOR ACCESSING AUTO-COMMIT MEMORY" and filed on Mar. 15, 2013 for Nisha Talagala, et al., which:

- is a continuation-in-part of and claims priority to U.S. patent application Ser. No. 13/694,000, now U.S. Pat. No. 9,047,178, entitled "APPARATUS, SYSTEM, AND METHOD FOR AUTO-COMMIT MEMORY MANAGEMENT" and filed on Dec. 4, 2012 for Nisha Talagala, et al. which claims the benefit of at least U.S. Provisional Patent Application No. 61/583,133 entitled "APPARATUS, SYSTEM, AND METHOD FOR AUTO-COMMIT MEMORY" and filed on Jan. 4, 2012 for David Flynn, et al.;
- claims the benefit of U.S. Provisional Patent Application No. 61/705,058 entitled "APPARATUS, SYSTEM, AND METHOD FOR SNAPSHOTS IN A STORAGE DEVICE" and filed on Sep. 24, 2012 for Nisha Talagala, et al.;
- claims the benefit of U.S. Provisional Patent Application No. 61/691,221 entitled "APPARATUS, SYSTEM, AND METHOD FOR AUTO-COMMIT MEMORY" and filed on Aug. 20, 2012 for Nisha Talagala, et al.;
- claims the benefit of U.S. Provisional Patent Application No. 61/661,742 entitled "APPARATUS, SYSTEM, AND METHOD FOR AUTO-COMMIT MEMORY" and filed on Jun. 19, 2012 for Nisha Talagala, et al.;
- claims the benefit of U.S. Provisional Patent Application No. 61/637,257 entitled "APPARATUS, SYSTEM, AND METHOD FOR AUTO-COMMIT MEMORY" and filed on Apr. 23, 2012 for David Flynn, et al.; and
- is a continuation-in-part application of and claims priority to U.S. patent application Ser. No. 13/324,942, now U.S. Pat. No. 8,527,693, entitled "APPARATUS, SYSTEM, AND METHOD FOR AUTO-COMMIT MEMORY" and filed on Dec. 13, 2011 for David Flynn, et al. which claims the benefit of U.S. Provisional Patent Application No. 61/422,635 entitled "APPARATUS, SYSTEM, AND METHOD FOR AUTO-COMMIT MEMORY" and filed on Dec. 13, 2010 for David Flynn, et al.;

each of which are incorporated herein by reference in their entirety.

TECHNICAL FIELD

This disclosure relates to auto-commit memory and more particularly to an interface for accessing auto-commit memory.

BACKGROUND

Volatile memory such as random access memory (RAM) typically has faster access times than non-volatile storage, such as NAND flash, magnetic hard disk drives, or the like. While the capacities of volatile memory continue to increase as the price of volatile memory decreases, volatile memory remains more expensive per unit of capacity than most non-volatile storage.

This often leads to design tradeoffs between the speed and performance of volatile memory and the lower price of non-volatile storage at larger capacities. Further, to achieve the speed and performance benefits of volatile memory, a system typically sacrifices the persistence of non-volatile memory, causing data to be irretrievably lost without power.

SUMMARY

Apparatuses for a memory device with volatile and non-volatile media are presented. In one embodiment, a volatile memory medium is on a circuit board. A circuit board, in certain embodiments, is configured to be installed on a memory bus of a processor. A non-volatile memory medium, in one embodiment, is on the same circuit board as a volatile memory medium. In a further embodiment, a mapping module is configured to selectively store data in one of a volatile memory medium on the circuit board and a non-volatile memory medium on the circuit board. Data may be provided by way of one or more commands from a processor.

Systems for a memory device with volatile and non-volatile media are presented. In one embodiment, a memory device is in communication with a central processing unit (CPU). A volatile memory of a memory device, in a further embodiment, is mapped into an address space of a CPU. A non-volatile recording medium of a memory device, in certain embodiments, stores data accessible to a CPU using an address space of the non-volatile recording medium.

Methods for a memory device with volatile and non-volatile media are presented. In one embodiment, a method includes receiving first and second requests from a processor over a direct connection with the processor to store data in a storage device in communication with the processor over the direct connection. A method, in another embodiment, includes storing data of a first request in a volatile memory of a storage device. In certain embodiments, a method includes storing data of a second request in a non-volatile memory of a storage device.

BRIEF DESCRIPTION OF THE DRAWINGS

In order that the advantages of this disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which.

DETAILED DESCRIPTION

Figure 1:
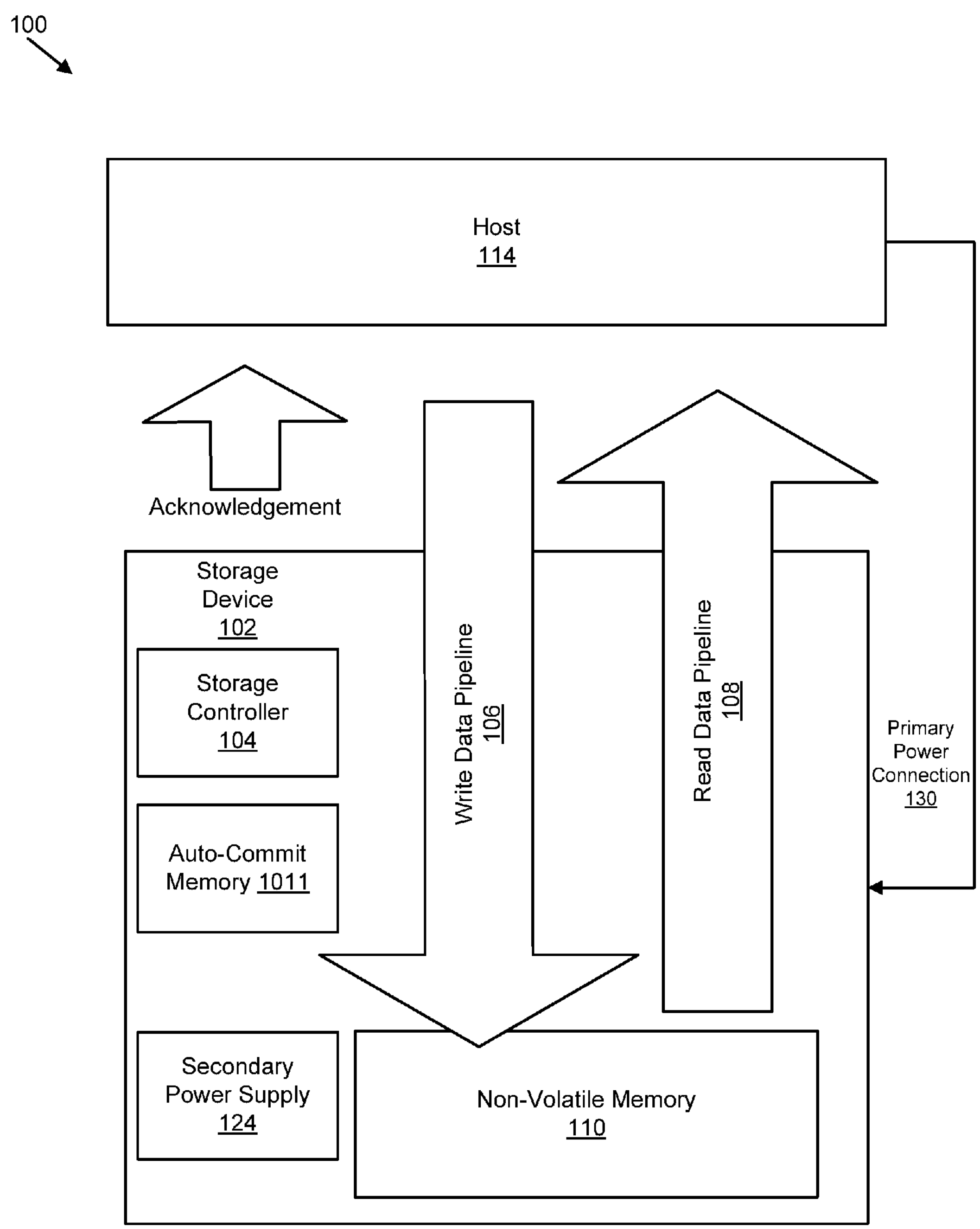
FIG. 1 is a schematic block diagram illustrating one embodiment of a system for auto-commit memory.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure. These features and advantages of the present invention will become more fully apparent from the following description and appended claims, or may be learned by the practice of the disclosure as set forth hereinafter.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. One skilled in the relevant art will recognize, however, that the disclosure may be practiced without one or more of the specific details, or with other methods, components, materials, and so forth. In other instances, well-known structures, materials, or operations are not shown or described in detail to avoid obscuring aspects of the disclosure.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 depicts one embodiment of a system 100 for data and/or power management in the event of a power failure, power reduction, or other power loss. In the depicted embodiment, the system 100 includes a host computing device 114 and a storage device 102. The host 114 may be a computer such as a server, laptop, desktop, or other computing device known in the art. The host 114 typically includes components such as memory, processors, buses, and other components as known to those of skill in the art.

The host 114 stores data in the storage device 102 and communicates data with the storage device 102 via a communications connection (not shown). The storage device 102 may be internal to the host 114 or external to the host 114. The communications connection may be a bus, a network, or other manner of connection allowing the transfer of data between the host 114 and the storage device 102. In one embodiment, the storage device 102 is connected to the host 114 by a PCI connection such as PCI express (PCI-e). The storage device 102 may be a card that plugs into a PCI-e connection on the host 114.

The storage device 102 also has a primary power connection 130 that connects the storage device 102 with a primary power source that provides the storage device 102 with the power that it needs to perform data storage operations such as reads, writes, erases, etc. The storage device 102, under normal operating conditions, receives the necessary power from the primary power source over the primary power connection 130. In certain embodiments, such as the embodiment shown in FIG. 1, the primary power connection 130 connects the storage device 102 to the host 114, and the host 114 acts as the primary power source that supplies the storage device 102 with power. In certain embodiments, the primary power connection 130 and the communications connection discussed above are part of the same physical connection between the host 114 and the storage device 102. For example, the storage device 102 may receive power over a PCI connection.

In other embodiments, the storage device 102 may connect to an external power supply via the primary power connection 130. For example, the primary power connection 130 may connect the storage device 102 with a primary power source that is a power converter (often called a power brick). Those in the art will appreciate that there are various ways by which a storage device 102 may receive power, and the variety of devices that can act as the primary power source for the storage device 102.

The storage device 102 provides nonvolatile storage, memory, and/or recording media 110 for the host 114. FIG. 1 shows the storage device 102 comprising a write data pipeline 106, a read data pipeline 108, nonvolatile memory 110, a storage controller 104, an auto-commit memory 1011, and a secondary power supply 124. The storage device 102 may contain additional components that are not shown in order to provide a simpler view of the storage device 102.

The nonvolatile memory 110 stores data such that the data is retained even when the storage device 102 is not powered. Examples of nonvolatile memory 110 include flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), Resistive random-access memory (RRAM), programmable metallization cell (PMC), conductive-bridging RAM (CBRAM), magneto-resistive RAM (MRAM), dynamic RAM (DRAM), phase change RAM (PRAM), or other non-volatile solid-state storage media. In other embodiments, the non-volatile memory 110 may comprise magnetic media, optical media, or other types of non-volatile storage media. For example, in those embodiments, the non-volatile storage device 102 may comprise a hard disk drive, an optical storage drive, or the like.

While the non-volatile memory 110 is referred to herein as "memory media," in various embodiments, the non-volatile memory 110 may more generally comprise a non-volatile recording media capable of recording data, the non-volatile recording media may be referred to as a non-volatile memory media, a non-volatile storage media, or the like. Further, the non-volatile storage device 102, in various embodiments, may comprise a non-volatile recording device, a non-volatile memory device, a non-volatile storage device, or the like.

The storage device 102 also includes a storage controller 104 that coordinates the storage and retrieval of data in the nonvolatile memory 110. The storage controller 104 may use one or more indexes to locate and retrieve data, and perform other operations on data stored in the storage device 102. For example, the storage controller 104 may include a groomer for performing data grooming operations such as garbage collection.

As shown, the storage device 102, in certain embodiments, implements a write data pipeline 106 and a read data pipeline 108, an example of which is described in greater detail below with regard to FIG. 3. The write data pipeline 106 may perform certain operations on data as the data is transferred from the host 114 into the nonvolatile memory 110. These operations may include, for example, error correction code (ECC) generation, encryption, compression, and others. The read data pipeline 108 may perform similar and potentially inverse operations on data that is being read out of nonvolatile memory 110 and sent to the host 114.

The storage device 102 also includes a secondary power supply 124 that provides power in the event of a complete or partial power disruption resulting in the storage device 102 not receiving enough electrical power over the primary power connection 130. A power disruption is any event that unexpectedly causes the storage device 102 to stop receiving power over the primary power connection 130, or causes a significant reduction in the power received by the storage device 102 over the primary power connection 130. A significant reduction in power, in one embodiment, includes the power falling below a predefined threshold. The predefined threshold, in a further embodiment, is selected to allow for normal fluctuations in the level of power from the primary power connection 130. For example, the power to a building where the host 114 and the storage device 102 may go out. A user action (such as improperly shutting down the host 114 providing power to the storage device 102), a failure in the primary power connection 130, or a failure in the primary power supply may cause the storage device 102 to stop receiving power. Numerous, varied power disruptions may cause unexpected power loss for the storage device 102.

The secondary power supply 124 may include one or more batteries, one or more capacitors, a bank of capacitors, a separate connection to a power supply, or the like. In one embodiment, the secondary power supply 124 provides power to the storage device 102 for at least a power hold-up time during a power disruption or other reduction in power from the primary power connection 130. The secondary power supply 124, in a further embodiment, provides a power hold-up time long enough to enable the storage device 102 to flush data that is not in nonvolatile memory 110 into the nonvolatile memory 110. As a result, the storage device 102 can preserve the data that is not permanently stored in the storage device 102 before the lack of power causes the storage device 102 to stop functioning. In certain implementations, the secondary power supply 124 may comprise the smallest capacitors possible that are capable of providing a predefined power hold-up time to preserve space, reduce cost, and simplify the storage device 102. In one embodiment, one or more banks of capacitors are used to implement the secondary power supply 124 as capacitors are generally more reliable, require less maintenance, and have a longer life than other options for providing secondary power.

In one embodiment, the secondary power supply 124 is part of an electrical circuit that automatically provides power to the storage device 102 upon a partial or complete loss of power from the primary power connection 130. Similarly, the system 100 may be configured to automatically accept or receive electric power from the secondary power supply 124 during a partial or complete power loss. For example, in one embodiment, the secondary power supply 124 may be electrically coupled to the storage device 102 in parallel with the primary power connection 130, so that the primary power connection 130 charges the secondary power supply 124 during normal operation and the secondary power supply 124 automatically provides power to the storage device 102 in response to a power loss. In one embodiment, the system 100 further includes a diode or other reverse current protection between the secondary power supply 124 and the primary power connection 130, to prevent current from the secondary power supply 124 from reaching the primary power connection 130. In another embodiment, the auto-commit memory 1011 may enable or connect the secondary power supply 124 to the storage device 102 using a switch or the like in response to reduced power from the primary power connection 130.

An example of data that is not yet in the nonvolatile memory 110 may include data that may be held in volatile memory as the data moves through the write data pipeline 106. If data in the write data pipeline 106 is lost during a power outage (i.e., not written to nonvolatile memory 110 or otherwise permanently stored), corruption and data loss may result.

In certain embodiments, the storage device 102 sends an acknowledgement to the host 114 at some point after the storage device 102 receives data to be stored in the nonvolatile memory 110. The write data pipeline 106, or a sub-component thereof, may generate the acknowledgement. It is advantageous for the storage device 102 to send the acknowledgement as soon as possible after receiving the data.

In certain embodiments, the write data pipeline 106 sends the acknowledgement before data is actually stored in the nonvolatile memory 110. For example, the write data pipeline 106 may send the acknowledgement while the data is still in transit through the write data pipeline 106 to the nonvolatile memory 110. In such embodiments, it is highly desirable that the storage device 102 flush all data for which the storage controller 104 has sent an acknowledgement to the nonvolatile memory 110 before the secondary power supply 124 loses sufficient power in order to prevent data corruption and maintain the integrity of the acknowledgement sent.

In addition, in certain embodiments, some data within the write data pipeline 106 may be corrupted as a result of the power disruption. A power disruption may include a power failure as well as unexpected changes in power levels supplied. The unexpected changes in power levels may place data that is in the storage device 102, but not yet in nonvolatile memory 110, at risk. Data corruption may begin to occur before the auto-commit memory 1011 is even aware (or notified) that there has been a disruption in power.

For example, the PCI-e specification indicates that, in the event that a power disruption is signaled, data should be assumed corrupted and not stored in certain circumstances. Similar potential corruption may occur for storage devices 102 connected to hosts 114 using other connection types, such as PCI, serial advanced technology attachment (serial ATA or SATA), parallel ATA (PATA), small computer system interface (SCSI), IEEE 1394 (FireWire), Fiber Channel, universal serial bus (USB), PCIe-AS, or the like. A complication may arise when a power disruption occurs (meaning that data received from that point to the present time may be presumed corrupt), a period of time passes, the disruption is sensed and signaled, and the auto-commit memory 1011 receives the signal and becomes aware of the power disruption. The lag between the power disruption occurring and the auto-commit memory 1011 discovering the power disruption can allow corrupt data to enter the write data pipeline 106. In certain embodiments, this corrupt data should be identified and not stored to the nonvolatile memory 110. Alternately, this corrupt data can be stored in the nonvolatile memory 110 and marked as corrupt as described below. For simplicity of description, identifying corrupt data and not storing the data to the nonvolatile memory 110 will be primarily used to describe the functions and features herein. Furthermore, the host 114 should be aware that this data was not stored, or alternatively data for which integrity is a question is not acknowledged until data integrity can be verified. As a result, corrupt data should not be acknowledged.

The storage device 102 also includes the auto-commit memory 1011. In certain embodiments, the auto-commit memory 1011 is in communication with, managed by, or at least partially integrated with the storage controller 104. The auto-commit memory 1011 may, for instance, cooperate with a software driver and/or firmware for the storage device 102. In one embodiment, at least a portion of the auto-commit memory 1011 is implemented on the storage device 102, so that the auto-commit memory 1011 continues to function during a partial or complete power loss using power from the secondary power supply 124, even if the host 114 is no longer functioning.

In one embodiment, the auto-commit memory 1011 initiates a power loss mode in the storage device 102 in response to a reduction in power from the primary power connection 130. During the power loss mode, the auto-commit memory 1011, in one embodiment flushes data that is in the storage device 102 that is not yet stored in nonvolatile memory 110 into the nonvolatile memory 110. In particular embodiments, the auto-commit memory 1011 flushes the data that has been acknowledged and is in the storage device 102 that is not yet stored in nonvolatile memory 110 into the nonvolatile memory 110. In certain embodiments, described below, the auto-commit memory 1011 may adjust execution of data operations on the storage device 102 to ensure that essential operations complete before the secondary power supply 124 loses sufficient power to complete the essential operations, i.e. during the power hold-up time that the secondary power supply 124 provides.

In certain embodiments, the essential operations comprise those operations for data that has been acknowledged as having been stored, such as acknowledged write operations. In other embodiments, the essential operations comprise those operations for data that has been acknowledged as having been stored and erased. In other embodiments, the essential operations comprise those operations for data that have been acknowledged as having been stored, read, and erased. The auto-commit memory 1011 may also terminate non-essential operations to ensure that those non-essential operations do not consume power unnecessarily and/or do not block essential operations from executing; for example, the auto-commit memory 1011 may terminate erase operations, read operations, unacknowledged write operations, and the like.

In one embodiment, terminating non-essential operations preserves power from the secondary power supply 124, allowing the secondary power supply 124 to provide the power hold-up time. In a further embodiment, the auto-commit memory 1011 quiesces or otherwise shuts down operation of one or more subcomponents of the storage device 102 during the power loss mode to conserve power from the secondary power supply 124. For example, in various embodiments, the auto-commit memory 1011 may quiesce operation of the read data pipeline 108, a read direct memory access (DMA) engine, and/or other subcomponents of the storage device 102 that are associated with non-essential operations.

The auto-commit memory 1011 may also be responsible for determining what data was corrupted by the power disruption, preventing the corrupt data from being stored in nonvolatile memory 110, and ensuring that the host 114 is aware that the corrupted data was never actually stored on the storage device 102. This prevents corruption of data in the storage device 102 resulting from the power disruption.

In one embodiment, the system 100 includes a plurality of storage devices 102. The auto-commit memory 1011, in one embodiment, manages power loss modes for each storage device 102 in the plurality of storage devices 102, providing a system-wide power loss mode for the plurality of storage devices 102. In a further embodiment, each storage device 102 in the plurality of storage devices 102 includes a separate auto-commit memory 1011 that manages a separate power loss mode for each individual storage device 102. The auto-commit memory 1011, in one embodiment, may quiesce or otherwise shut down one or more storage devices 102 of the plurality of storage devices 102 to conserve power from the secondary power supply 124 for executing essential operations on one or more other storage devices 102.

In one embodiment, the system 100 includes one or more adapters for providing electrical connections between the host 114 and the plurality of storage devices 102. An adapter, in various embodiments, may include a slot or port that receives a single storage device 102, an expansion card or daughter card that receives two or more storage devices 102, or the like. For example, in one embodiment, the plurality of storage devices 102 may each be coupled to separate ports or slots of the host 114. In another example embodiment, one or more adapters, such as daughter cards or the like, may be electrically coupled to the host 114 (i.e. connected to one or more slots or ports of the host 114) and the one or more adapters may each provide connections for two or more storage devices 102.

In one embodiment, the system 100 includes a circuit board, such as a motherboard or the like, that receives two or more adapters, such as daughter cards or the like, and each adapter receives two or more storage devices 102. In a further embodiment, the adapters are coupled to the circuit board using PCI-e slots of the circuit board and the storage devices 102 are coupled to the adapters using PCI-e slots of the adapters. In another embodiment, the storage devices 102 each comprise a dual in-line memory module (DIMM) of non-volatile solid-state storage, such as Flash memory, or the like. In one embodiment, the circuit board, the adapters, and the storage devices 102 may be external to the host 114, and may include a separate primary power connection 130. For example, the circuit board, the adapters, and the storage devices 102 may be housed in an external enclosure with a power supply unit (PSU) and may be in communication with the host 114 using an external bus such as eSATA, eSATAp, SCSI, FireWire, Fiber Channel, USB, PCIe-AS, or the like. In another embodiment, the circuit board may be a motherboard of the host 114, and the adapters and the storage devices 102 may be internal storage of the host 114.

In view of this disclosure, one of skill in the art will recognize many configurations of adapters and storage devices 102 for use in the system 100. For example, each adapter may receive two storage devices 102, four storage devices 102, or any number of storage devices. Similarly, the system 100 may include one adapter, two adapters, three adapters, four adapters, or any supported number of adapters. In one example embodiment, the system 100 includes two adapters and each adapter receives four storage devices 102, for a total of eight storage devices 102.

In one embodiment, the secondary power supply 124 provides electric power to each of a plurality of storage devices 102. For example, the secondary power supply 124 may be disposed in a circuit on a main circuit board or motherboard and may provide power to several adapters. In a further embodiment, the system 100 includes a plurality of secondary power supplies that each provide electric power to a subset of a plurality of storage devices 102. For example, in one embodiment, each adapter may include a secondary power supply 124 for storage devices 102 of the adapter. In a further embodiment, each storage device 102 may include a secondary power supply 124 for the storage device 102. In view of this disclosure, one of skill in the art will recognize different arrangements of secondary power supplies 124 for providing power to a plurality of storage devices 102.

The systems, methods, and apparatus described above may be leveraged to implement an auto-commit memory capable of implementing memory semantic write operations (e.g., persistent writes) at CPU memory write granularity and speed. By guaranteeing that certain commit actions for the write operations will occur, even in the case of a power failure or other restart event, in certain embodiments, volatile memory such as DRAM, SRAM, BRAM, or the like, may be used as, considered, or represented as non-volatile.

A restart event, as used herein, comprises an intentional or unintentional loss of power to at least a portion of the host computing device and/or a non-volatile storage device. A restart event may comprise a system reboot, reset, or shutdown event; a power fault, power loss, or power failure event; or another interruption or reduction of power. By guaranteeing certain commit actions, the auto-commit memory may allow storage clients to resume execution states, even after a restart event, may allow the storage clients to persist different independent data sets, or the like.

As used herein, the term "memory semantic operations," or more generally, "memory operations," refers to operations having a granularity, synchronicity, and access semantics of volatile memory accesses, using manipulatable memory pointers, or the like. Memory semantic operations may include, but are not limited to: load, store, peek, poke, write, read, set, clear, and so on. Memory semantic operations may operate at a CPU-level of granularity (e.g., single bytes, words, cache lines, or the like), and may be synchronous (e.g., the CPU waits for the operation to complete). In certain embodiments, providing access at a larger sized granularity, such as cache lines, may increase access rates, provide more efficient write combining, or the like than smaller sized granularity access.

The ACM may be available to computing devices and/or applications (both local and remote) using one or more of a variety of memory mapping technologies, including, but not limited to, memory mapped I/O (MMIO), port I/O, port-mapped IO (PMIO), Memory mapped file I/O, and the like. For example, the ACM may be available to computing devices and/or applications (both local and remote) using a PCI-e Base Address Register (BAR), or other suitable mechanism. ACM may also be directly accessible via a memory bus of a CPU, using an interface such as a double data rate (DDR) memory interface, HyperTransport, QuickPath Interconnect (QPI), or the like. Accordingly, the ACM may be accessible using memory access semantics, such as CPU load/store, direct memory access (DMA), 3$^{rd}$ party DMA, remote DMA (RDMA), atomic test and set, and so on. The direct, memory semantic access to the ACM disclosed herein allows many of the system and/or virtualization layer calls typically required to implement committed operations to be bypassed, (e.g., call backs via asynchronous Input/Output interfaces may be bypassed). In some embodiments, an ACM may be mapped to one or more virtual ranges (e.g., virtual BAR ranges, virtual memory addresses, or the like). The virtual mapping may allow multiple computing devices and/or applications to share a single ACM address range 1021 (e.g., access the same ACM simultaneously, within different virtual address ranges). An ACM may be mapped into an address range of a physical memory address space addressable by a CPU so that the CPU may use load/store instructions to read and write data directly to the ACM using memory semantic accesses. A CPU, in a further embodiment, may map the physically mapped ACM into a virtual memory address space, making the ACM available to user-space processes or the like as virtual memory.

The ACM may be pre-configured to commit its contents upon detection of a restart condition (or other pre-determined triggering event) and, as such, operations performed on the ACM may be viewed as being "instantly committed." For example, an application may perform a "write-commit" operation on the ACM using memory semantic writes that operate at CPU memory granularity and speed, without the need for separate corresponding "commit" commands, which may significantly increase the performance of applications affected by write-commit latencies. As used herein, a write-commit operation is an operation in which an application writes data to a memory location (e.g., using a memory semantic access), and then issues a subsequent commit command to commit the operation (e.g., to persistent storage or other commit mechanism).

Applications whose performance is based on write-commit latency, the time delay between the initial memory write and the subsequent persistent commit operation, typically attempt to reduce this latency by leveraging a virtual memory system (e.g., using a memory backed file). In this case, the application performs high-performance memory semantic write operations in system RAM, but, in order to commit the operations, must perform subsequent "commit" commands to persist each write operation to the backing file (or other persistent storage). Accordingly, each write-commit operation may comprise its own separate commit command. For example, in a database logging application, each log transaction must be written and committed before a next transaction is logged. Similarly, messaging systems (e.g., store and forward systems) must write and commit each incoming message, before receipt of the message can be acknowledged. The write-commit latency, therefore, comprises a relatively fast memory semantic write followed by a much slower operation to commit the data to persistent storage. Write-commit latency may include several factors including, access times to persistent storage, system call overhead (e.g., translations between RAM addresses, backing store LBA, etc.), and so on. Examples of applications that may benefit from reduced write-commit latency include, but are not limited to: database logging applications, file-system logging, messaging applications (e.g., store and forward), semaphore primitives, and so on.

The systems, apparatus, and methods for auto-commit memory disclosed herein may be used to significantly increase the performance of write-commit latency bound applications by providing direct access to a memory region at any suitable level of addressing granularity including byte level, page level, cache-line level, or other memory region level, that is guaranteed to be committed in the event of a system failure or other restart event, without the application issuing a commit command. Accordingly, the write-commit latency of an application may be reduced to the latency of a memory semantic access (a single write over a system bus).

Figure 2:
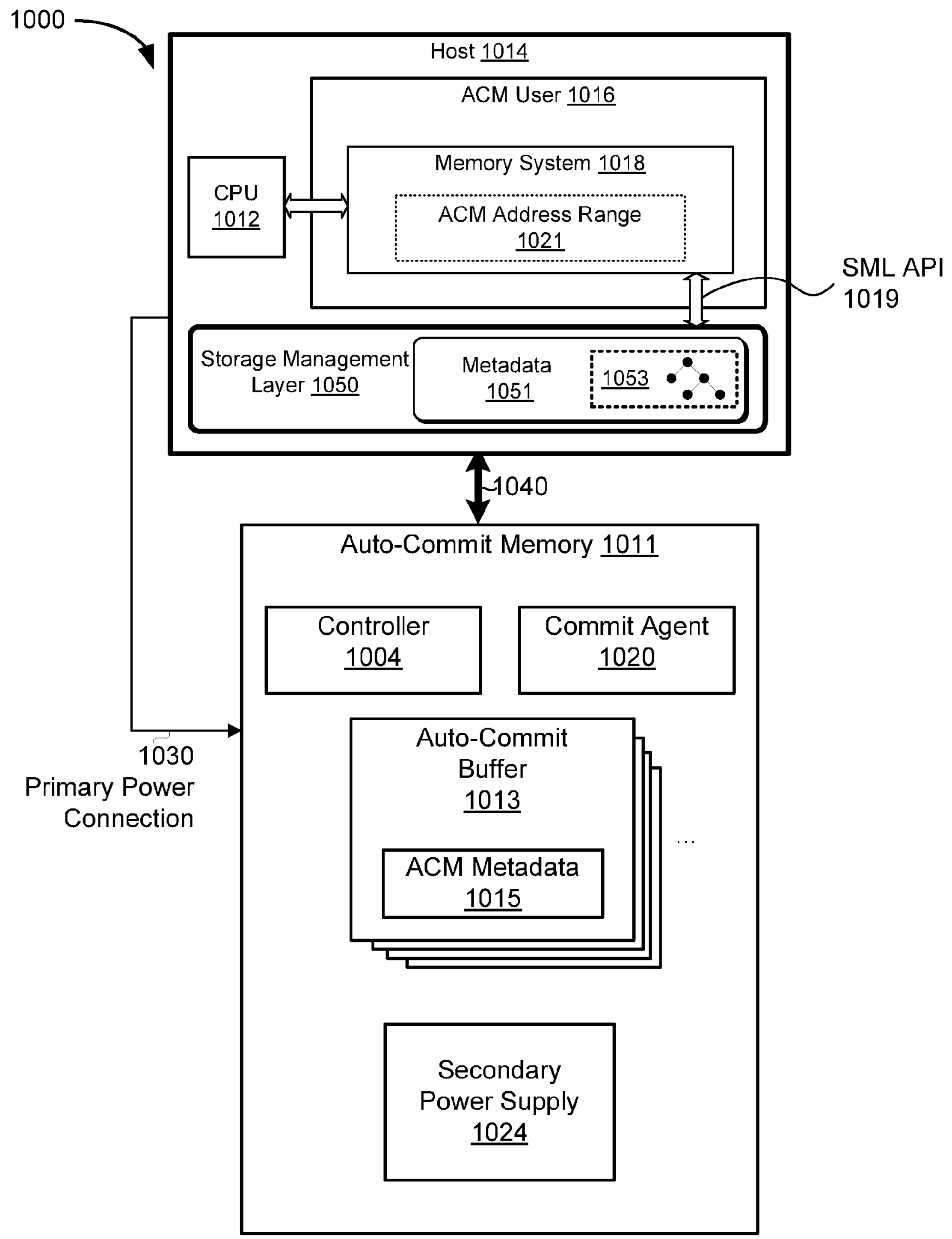
FIG. 2 is a block diagram of one embodiment of an auto-commit memory.

FIG. 2 is a block diagram of a system 1000 comprising one embodiment of an auto-commit memory (ACM) 1011. As used herein, an auto-commit memory comprises low-latency, high reliability memory media, exposed to ACM users for direct memory semantic access, at a memory semantic access and address granularity level of at least byte level, combined with logic and components together configured to restore the same state of data stored in the ACM 1011 that existed prior to the restart event and the same level of memory semantic access to data stored in the auto-commit memory after a restart event. In certain embodiments, the ACM 1011 guarantees that data stored in the ACM 1011 will be accessible after a restart event. The ACM 1011, in one embodiment, comprises a volatile memory media coupled to a controller, logic, and other components that commit data to a non-volatile storage medium when necessary or when directed by an ACM user. In a further embodiment, the ACM 1011 may include a natively non-volatile storage medium such as phase change memory (PCM or PRAM), and a triggered commit action may process data on the non-volatile storage medium in response to a restart event such that the data remains available to an owner of the data after the restart event.

Accordingly, when data is written to the ACM 1011, it may not initially be "committed" per se (is not necessarily stored on a persistent memory media and/or state); rather, a pre-configured process is setup to preserve the ACM data and its state, if a restart event occurs while the ACM data is stored in the ACM 1011. The pre-configuring of this restart survival process is referred to herein as "arming." The ACM 1011 may be capable of performing the pre-configured commit action autonomously and with a high degree of assurance, despite the system 1000 experiencing failure conditions or another restart event. As such, an entity that stores data on the ACM 1011 may consider the data to be "instantaneously committed" or safe from loss or corruption, at least as safe as if the data were stored in a non-volatile storage device such as a hard disk drive, tape storage media, or the like.

In embodiments where the ACM 1011 comprises a volatile memory media, the ACM 1011 may make the volatile memory media appear as a non-volatile memory, may present the volatile memory as a non-volatile medium, or the like, because the ACM 1011 preserves data, such as ACM data and/or ACM metadata 1015, across system restart events. The ACM 1011 may allow a volatile memory media to be used as a non-volatile memory media by determining that a trigger event, such as a restart or failure condition, has occurred, copying the contents of the volatile memory media to a non-volatile memory media during a hold-up time after the trigger event, and copying the contents back into the volatile memory media from the non-volatile memory media after the trigger event is over, power has been restored, the restart event has completed, or the like.

In one embodiment, the ACM 1011 is at least byte addressable. A memory media of the ACM 1011, in certain embodiments, may be natively byte addressable, directly providing the ACM 1011 with byte addressability. In another embodiment, a memory media of the ACM 1011 is not natively byte addressable, but a volatile memory media of the ACM 1011 is natively byte addressable, and the ACM 1011 writes or commits the contents of the byte addressable volatile memory media to the non-byte addressable memory media of the ACM 1011 in response to a trigger event, so that the volatile memory media renders the ACM 1011 byte addressable.

The ACM 1011 may be accessible to one or more computing devices, such as the host 1014. As used herein a computing device (such as the host 1014) refers to a computing device capable of accessing an ACM. The host 1014 may be a computing device that houses the ACM 1011 as a peripheral; the ACM 1011 may be attached to a system bus 1040 of the host 1014; the ACM 1011 may be in communication with the host 1014 over a data network; and/or the ACM 1011 may otherwise be in communication with the host 1014. The host 1014, in certain embodiments, may access the ACM 1011 hosted by another computing device. The access may be implemented using any suitable communication mechanism, including, but not limited to: CPU programmed 10 (CPIO), port-mapped IO (PMIO), memory-mapped IO (MMIO), a Block interface, a PCI-e bus, Infiniband, RDMA, or the like. The host 1014 may comprise one or more ACM users 1016. As used herein, an ACM user 1016 refers to any operating system (OS), virtual operating platform (e.g., an OS with a hypervisor), a guest OS, application, process, thread, entity, utility, user, or the like, that is configured to access the ACM 1011.

The ACM 1011 may be physically located at one or more levels of the host 1014. In one embodiment, the ACM 1011 may be connected to a PCI-e bus and may be accessible to the host 1014 with MMIO. In another embodiment, the ACM 1011 may be directly accessible to a CPU of the host 1014 via a memory controller. For example, the ACM 1011 may be directly attached to and/or directly (e.g., Quick Path Interconnect (QPI)) in communication with a CPU of the host 1014 or the like. Volatile media of the ACM 1011 and non-volatile backing media of the ACM 1011, in certain embodiments, may not be physically co-located within the same apparatus, but may be in communication over a communications bus, a data network, or the like. In other embodiments, as described below, hardware components of the ACM 1011 may be tightly coupled, and integrated in a single physical hardware apparatus. Volatile memory media and/or non-volatile memory media of the ACM 1011, in one embodiment, may be integrated with, or may otherwise cooperate with, a CPU cache hierarchy of the host 1014, to take advantage of CPU caching technologies such as write combining or the like.

One or more ACM buffers 1013, in certain embodiments, may be mapped into an address range of a physical memory address space addressable by a CPU, a kernel, or the like of the host device 1014, such as the memory system 1018 described below. For example, one or more ACM buffers 1013 may be mapped as directly attached physical memory, as MMIO addressable physical memory over a PCI-e bus, or otherwise mapped as one or more pages of physical memory. At least a portion of the physically mapped ACM buffers 1013, in a further embodiment, may be mapped into a virtual memory address space, accessible to user-space processes or the like as virtual memory.

Allowing ACM users 1016 to directly address the ACM buffers 1013, in certain embodiments, bypasses one or more layers of the traditional operating system memory stack of the host device 1014, providing direct load/store operation access to kernel-space and/or user-space applications. An operating system, using a kernel module, an application programming interface, the storage management layer (SML) 1050 described below, or the like, in one embodiment, maps and unmaps ACM buffers 1013 to and from the memory system 1018 for one or more ACM users 1016, and the ACM users 1016 may directly access an ACM buffer 1013 once the operating system maps the ACM buffer 1013 into the memory system 1018. In a further embodiment, the operating system may also service system flush calls for the ACM buffers 1013, or the like.

The SML 1050 and/or the SML API 1019 described below, in certain embodiments, provide an interface for ACM users 1016, an operating system, and/or other entities to request certain ACM functions, such as a map function, an unmap function, a flush function, and/or other ACM functions. To perform a flush operation in response to a flush request, the ACM 1011 may perform a commit action for each ACM buffer 1013 associated with the flush request. Each ACM buffer 1013 is committed as indicated by the ACM metadata 1015 of the associated ACM buffer 1013. A flush function, in various embodiments, may be specific to one or more ACM buffers 1013, system-wide for all ACM buffers 1013, or the like. In one embodiment, a CPU, an operating system, or the like for the host 1014 may request an ACM flush operation in response to, or as part of a CPU cache flush, a system-wide data flush for the host 1014, or another general flush operation.

An ACM user 1016, an operating system, or the like may request a flush operation to maintain data consistency prior to performing a maintenance operation, such as a data snapshot or a backup, to commit ACM data prior to reallocating an ACM buffer 1013, to prepare for a scheduled restart event, or for other circumstances where flushing data from an ACM buffer 1013 may be beneficial. An ACM user 1016, an operating system, or the like, in certain embodiments, may request that the ACM 1011 map and/or unmap one or more ACM buffers 1013 to perform memory management for the ACM buffers 1013; to reallocate the ACM buffers 1013 between applications or processes; to allocate ACM buffers 1013 for new data, applications, or processes; to transfer use of the ACM buffers 1013 to a different host 1014 (in shared ACM 1011 embodiments); or to otherwise manipulate the memory mapping of the ACM buffers 1013. In another embodiment, the SML 1050 may dynamically allocate, map, and/or unmap ACM buffers 1013 using a resource management agent as described below.

Since the ACM 1011 is guaranteed to auto-commit the data stored thereon in the event of a trigger event, the host 1014 (or ACM user 1016) may view data written to the ACM 1011 as being instantaneously "committed" or non-volatile, as the host 1014 or ACM user 1016 may access the data both before and after the trigger event. Advantageously, while the restart event may cause the ACM user 1016 to be re-started or re-initialized the data stored in the ACM 1011 is in the same state/condition after the restart event as it was before the restart event. The host 1014 may, therefore, write to the ACM 1011 using memory write semantics (and at CPU speeds and granularity), without the need for explicit commit commands by relying on the pre-configured trigger of the ACM 1011 to commit the data in the event of a restart (or other trigger event).

The ACM 1011 may comprise a plurality of auto-commit buffers 1013, each comprising respective ACM metadata 1015. As discussed below, the ACM metadata 1015 may include data to facilitate committing of ACM data in response to a triggering event for the auto-commit buffer 1013, such as a logical identifier for data in the ACM buffer 1013, an identifier of a commit agent 1020, instructions for a commit process or other processing procedure, security data, or the like. The auto-commit buffers 1013 may be of any suitable size, from a single sector, page, byte, or the like, to a virtual or logical page size (e.g., 80 to 400 kb). The size of the auto-commit buffers 1013 may be adapted according to the storage capacity of the underlying non-volatile storage media, and or hold-up time available from the secondary power supply 1024.

In one embodiment, the ACM 1011 may advertise or present to the host 1014, to ACM users 1016, or the like, a storage capacity of the ACM buffers 1013 that is larger than an actual storage capacity of memory of the ACM buffers 1013. To provide the larger storage capacity, the ACM 1011 may dynamically map and unmap ACM buffers 1013 to the memory system 1018 and to the non-volatile backing memory of the ACM 1011, such as the non-volatile memory 110 described above. For example, the ACM 1011 may provide virtual address ranges for the ACM buffers 1013, and demand page data and/or ACM buffers 1013 to the non-volatile memory 110 as ACM buffer 1013 accesses necessitate. In another embodiment, for ACM buffers 1013 that are armed to commit to one or more predefined LBAs of the non-volatile memory 110, the ACM 1011 may dynamically move the ACM data and ACM metadata 1015 from the ACM buffers 1013 to the associated LBAs of the non-volatile memory 110, freeing storage capacity of the ACM buffers 1013 to provide a larger storage capacity. The ACM 1011 may further return the ACM data and ACM metadata 1015 back to one or more ACM buffers 1013 as ACM buffers become available, certain addresses outside the data of currently loaded ACM buffers 1013 is requested, or the like, managing storage capacity of the ACM buffers 1013.

The ACM 1011 is pre-configured or "armed" to implement one or more "triggered commit actions" in response to a restart condition (or other, pre-determined condition). As used herein, a restart condition or event may include, but is not limited to a software or hardware shutdown/restart of a host 1014, a failure in a host 1014 computing device, a failure of a component of the host 1014 (e.g., failure of the bus 1040), a software fault (e.g., an fault in software running on the host 1014 or other computing device), a loss of the primary power connection 1030, an invalid shutdown, or another event that may cause the loss of data stored in a volatile memory.

In one embodiment, a restart event comprises the act of the host 1014 commencing processing after an event that can cause the loss of data stored within a volatile memory of the host 1014 or a component in the host 1014. The host 1014 may commence/resume processing once the restart condition or event has finished, a primary power source is available, and the like.

The ACM 1011 is configured to detect that a restart event/condition has occurred and/or respond to a restart event by initiating a recovery stage. During a recovery stage, the ACM 1011 may restore the data of the ACM 1011 to the state prior to the restart event. Alternatively, or in addition, during the recovery stage, the ACM 1011 may complete processing of ACM data or ACM metadata 1015 needed to satisfy a guarantee that data in the ACM 1011 is available to ACM users after the restart event. Alternatively, or in addition, during the recovery stage, the ACM 1011 may complete processing of ACM data or ACM metadata 1015 needed to satisfy a guarantee that data in the ACM 1011 is committed after the restart event. As used herein, "commit" means data in the ACM 1011 is protected from loss or corruption even after the restart event and is persisted as required per the arming information associated with the data. In certain embodiments, the recovery stage includes processing ACM data and ACM metadata 1015 such that the ACM data is persisted, even though the restart event occurred.

As used herein, a triggered commit action is a pre-configured commit action that is armed to be performed by the ACM 1011 in response to a triggering event (e.g., a restart event, a flush command, or other pre-determined event). In certain embodiments, the triggered commit action persists at least enough ACM data and/or ACM metadata 1015 to make data of the ACM 1011 available after a system restart, to satisfy a guarantee of the ACM 1011 that the data will be accessible to an ACM user after a restart event, in certain embodiments, this guarantee is satisfied, at least in part, by committing and/or persisting data of the ACM 1011 to non-volatile memory media. A triggered commit action may be completed before, during, and/or after a restart event. For example, the ACM 1011 may write ACM data and ACM metadata 1015 to a predefined temporary location in the nonvolatile memory 110 during a hold-up time after a restart event, and may copy the ACM data back into the ACM buffers 1013, to an intended location in the nonvolatile memory 110, or perform other processing once the restart event is complete.

A triggered commit action may be "armed" when the ACM 1011 is requested and/or a particular ACM buffer 1013 is allocated for use by a host 1014. In some embodiments, an ACM 1011 may be configured to implement a triggered commit action in response to other, non-restart conditions. For example, an operation directed to a particular logical address (e.g., a poke), may trigger the ACM 1011, a flush operation may trigger the ACM 1011, or the like. This type of triggering may be used to commit the data of the ACM 1011 during normal operation (e.g., non-restart or non-failure conditions).

The arming may occur when an auto-commit buffer 1013 is mapped into the memory system 1018 of the host 1014. Alternatively, arming may occur as a separate operation. As used herein, arming an auto-commit buffer 1013 comprises performing the necessary configuration steps needed to complete the triggered action when the action is triggered. Arming may include, for example, providing the ACM metadata 1015 to the ACM 1011 or the like. In certain embodiments, arming further includes performing the necessary configuration steps needed to complete a minimal set of steps for the triggered action, such that the triggered action is capable of completing after a trigger event. In certain embodiments, arming further includes verifying the arming data (e.g., verifying that the contents of the auto-commit buffer 1013, or portion thereof, can be committed as specified in the ACM metadata 1015) and verifying that the ACM 1011 is capable and configured to properly perform the triggered action without error or interruption.

The verification may ensure that once armed, the ACM 1011 can implement the triggered commit action when required. If the ACM metadata 1015 cannot be verified (e.g., the logical identifier or other ACM metadata 1015 is invalid, corrupt, unavailable, or the like), the arming operation may fail; memory semantic operations on the auto-commit buffer 1013 may not be allowed unit the auto-commit buffer 1013 is successfully armed with valid ACM metadata 1015. For example, an auto-commit buffer 1013 that is backed by a hard disk having a one-to-one mapping between LBA and physical address, may fail to arm if the LBA provided for the arming operation does not map to a valid (and operational) physical address on the disk. Verification in this case may comprise querying the disk to determine whether the LBA has a valid, corresponding physical address and/or using the physical address as the ACM metadata 1015 of the auto-commit buffer 1013.

The armed triggered commit actions are implemented in response to the ACM 1011 (or other entity) detecting and/or receiving notification of a triggering event, such as a restart condition. In some embodiments, an armed commit action is a commit action that can be performed by the ACM 1011, and that requires no further communication with the host 1014 or other devices external to the "isolation zone" of the ACM 1011 (discussed below). Accordingly, the ACM 1011 may be configured to implement triggered commit actions autonomously of the host 1014 and/or other components thereof. The ACM 1011 may guarantee that triggered commit actions can be committed without errors and/or despite external error conditions. Accordingly, in some embodiments, the triggered commit actions of the ACM 1011 do not comprise and/or require potentially error-introducing logic, computations, and/or calculations. In some embodiments, a triggered commit action comprises committing data stored on the volatile ACM 1011 to a persistent storage location. In other embodiments, a triggered commit action may comprise additional processing of committed data, before, during, and/or after a triggering event, as described below. The ACM 1011 may implement pre-configured triggered commit actions autonomously; the ACM 1011 may be capable of implementing triggered commit actions despite failure or restart conditions in the host 1014, loss of primary power, or the like. The ACM 1011 can implement triggered commit actions independently due to arming the ACM 1011 as described above.

The ACM metadata 1015 for an ACM buffer 1013, in certain embodiments, identifies the data of the ACM buffer 1013. For example, the ACM metadata 1015 may identify an owner of the data, may describe the data itself, or the like. In one embodiment, an ACM buffer 1013 may have multiple levels of ACM metadata 1015, for processing by multiple entities or the like. The ACM metadata 1015 may include multiple nested headers that may be unpackaged upon restart, and used by various entities or commit agents 1020 to determine how to process the associated ACM data to fulfill the triggered commit action as described above. For example, the ACM metadata 1015 may include block metadata, file metadata, application level metadata, process execution point or callback metadata, and/or other levels of metadata. Each level of metadata may be associated with a different commit agent 1020, or the like. In certain embodiments, the ACM metadata 1015 may include security data, such as a signature for an owner of the associated ACM data, a pre-shared key, a nonce, or the like, which the ACM 1011 may use during recovery to verify that a commit agent 1020, an ACM user 1016, or the like is authorized to access committed ACM metadata 1015 and/or associated ACM data. In this manner, the ACM 1011 may prevent ownership spoofing or other unauthorized access. In one embodiment, the ACM 1011 does not release ACM metadata 1015 and/or associated ACM data until a requesting commit agent 1020, ACM user 1016, or the like provides valid authentication, such as a matching signature or the like.

One or more commit agents 1020, such as the commit management apparatus 1122 described below with regard to FIG. 3, in certain embodiments, process ACM data based on the associated ACM metadata 1015 to execute a triggered commit action. A commit agent 1020, in various embodiments, may comprise software, such as a device driver, a kernel module, the SML 1050, a thread, a user space application, or the like, and/or hardware, such as the controller 1004 described below, that is configured to interpret ACM metadata 1015 and to process the associated ACM data according to the ACM metadata 1015. In embodiments with multiple commit agents 1020, the ACM metadata 1015 may identify one or more commit agents 1020 to process the associated ACM data. The ACM metadata 1015 may identify a commit agent 1020, in various embodiments, by identifying a program/function of the commit agent 1020 to invoke (e.g., a file path of the program), by including computer executable code of the commit agent 1020 (e.g., binary code or scripts), by including a unique identifier indicating which of a set of registered commit agents 1020 to use, and/or by otherwise indicating a commit agent 1020 associated with committed ACM metadata 1015. The ACM metadata 1015, in certain embodiments, may be a functor or envelope which contains the information, such as function pointer and bound parameters for a commit agent 1020, to commit the ACM data upon restart recovery.

In one embodiment, a primary commit agent 1020 processes ACM metadata 1015, and hands-off or transfers ACM metadata 1015 and/or ACM data to one or more secondary commit agents 1020 identified by the ACM metadata 1015. A primary commit agent 1020, in one embodiment, may be integrated with the ACM 1011, the controller 1004, or the like. An ACM user 1016 or other third party, in certain embodiments, may provide a secondary commit agent 1020 for ACM data that the ACM user 1016 or other third party owns, and the primary commit agent 1020 may cooperate with the provided secondary commit agent 1020 to process the ACM data. The one or more commit agents 1020 for ACM data, in one embodiment, ensure and/or guarantee that the ACM data remains accessible to an owner of the ACM data after a restart event. As described above with regard to triggered commit actions, a commit agent 1020 may process ACM metadata 1015 and associated ACM data to perform one or more triggered commit actions before, during, and/or after a trigger event, such as a failure or other restart event.

In one embodiment, a commit agent 1020, in cooperation with the ACM 1011 or the like, may store the ACM metadata 1015 in a persistent or non-volatile location in response to a restart or other trigger event. The commit agent 1020 may store the ACM metadata 1015 at a known location, may store pointers to the ACM metadata 1015 at a known location, may provide the ACM metadata 1015 to an external agent or data store, or the like so that the commit agent 1020 may process the ACM metadata 1015 and associated ACM data once the restart or other trigger event has completed. The known location may include one or more predefined logical block addresses or physical addresses of the non-volatile memory 110, a predefined file, or the like. In certain embodiments, hardware of the ACM 1011 is configured to cooperate to write the ACM metadata 1015 and/or pointers to the ACM metadata 1015 at a known location. In one embodiment, the known location may be a temporary location that stores the ACM data and ACM metadata 1015 until the host 1014 has recovered from a restart event and the commit agent 1020 may continue to process the ACM data and ACM metadata 1015. In another embodiment, the location may be a persistent location associated with the ACM metadata 1015.

In response to completion of a restart event or other trigger event, during recovery, in one embodiment, a commit agent 1020 may locate and retrieve the ACM metadata 1015 from the non-volatile memory 110, from a predefined location or the like. The commit agent 1020, in response to locating and retrieving the ACM metadata 1015, locates the ACM data associated with the retrieved ACM metadata 1015. The commit agent 1020, in certain embodiments, may locate the ACM data in a substantially similar manner as the commit agent 1020 locates the ACM metadata 1015, retrieving ACM data from a predefined location, retrieving pointers to the ACM data from a predefined location, receiving the ACM data from an external agent or data store, or the like. In one embodiment, the ACM metadata 1015 identifies the associated ACM data and the commit agent 1020 uses the ACM metadata 1015 to locate and retrieve the associated ACM data. For example, the commit agent 1020 may use a predefined mapping to associate ACM data with ACM metadata 1015 (e.g the Nth piece of ACM data may be associated with the Nth piece of ACM metadata 1015 or the like), the ACM metadata 1015 may include a pointer or index for the associated ACM data, or another predefined relationship may exist between committed ACM metadata 1015 and associated ACM data. In another embodiment, an external agent may indicate to the commit agent 1020 where associated ACM data is located.

In response to locating and retrieving the ACM metadata 1015 and associated ACM data, the commit agent 1020 interprets the ACM metadata 1015 and processes the associated ACM data based on the ACM metadata 1015. For example, in one embodiment, the ACM metadata 1015 may identify a block storage volume and LBA(s) where the commit agent 1020 is to write the ACM data upon recovery. In another embodiment, the ACM metadata 1015 may identify an offset within a file within a file system where the commit agent 1020 is to write the ACM data upon recovery. In a further embodiment, the ACM metadata 1015 may identify an application specific persistent object where the commit agent 1020 is to place the ACM data upon recovery, such as a database record or the like. The ACM metadata 1015, in an additional embodiment, may indicate a procedure for the commit agent 1020 to call to process the ACM data, such as a delayed procedure call or the like. In an embodiment where the ACM 1011 advertises or presents volatile ACM buffers 1013 as nonvolatile memory, the ACM metadata 1013 may identify an ACM buffer 1013 where the commit agent 1020 is to write the ACM data upon recovery.

In certain embodiments, the ACM metadata 1015 may identify one or more secondary commit agents 1020 to further process the ACM metadata 1015 and/or associated ACM data. A secondary commit agent 1020 may process ACM metadata 1015 and associated ACM data in a substantially similar manner to the commit agent 1020 described above. Each commit agent 1020 may process ACM data in accordance with a different level or subset of the ACM metadata 1015, or the like. The ACM metadata 1015 may identify a secondary commit agent 1020, in various embodiments, by identifying a program/function of the secondary commit agent 1020 to invoke (e.g., a file path of the program), by including computer executable code of the secondary commit agent 1020, by including a unique identifier indicating which of a set of registered secondary commit agents 1020 to use, and/or by otherwise indicating a secondary commit agent 1020 associated with committed ACM metadata 1015.

In one embodiment, a secondary commit agent 1020 processes a remaining portion of the ACM metadata 1015 and/or of the ACM data after a previous commit agent 1020 has processed the ACM metadata 1015 and/or the ACM data. In a further embodiment, the ACM metadata 1015 may identify another non-volatile medium separate from the ACM 1011 for the secondary commit agent 1020 to persist the ACM data even after a host experiences a restart event. By committing the ACM metadata 1015 and the associated ACM data from the ACM buffers 1013 in response to a trigger event, such as a failure or other restart condition, and processing the ACM metadata 1015 and the associated ACM data once the trigger event has completed or recovered, the ACM 1011 may guarantee persistence of the ACM data and/or performance of the triggered commit action(s) defined by the ACM metadata 1015.

The ACM 1011 is communicatively coupled to a host 1014, which, like the host 114 described above, may comprise operating systems, virtual machines, applications, a processor complex 1012, a central processing unit 1012 (CPU), and the like. In the FIG. 2 example, these entities are referred to generally as ACM users 1016. Accordingly, as used herein, an ACM user may refer to an operating system, a virtual machine operating system (e.g., hypervisor), an application, a library, a CPU fetch-execute algorithm, or other program or process. The ACM 1011 may be communicatively coupled to the host 1014 (as well as the ACM users 1016) via a bus 1040, such as a system bus, a processor's memory exchange bus, or the like (e.g., HyperTransport, QuickPath Interconnect (QPI), PCI bus, PCI-e bus, or the like). In some embodiments, the bus 1040 comprises the primary power connection 1030 (e.g., the non-volatile storage device 1102 may be powered through the bus 1040). Although some embodiments described herein comprise solid-state storage devices, such as certain embodiments of the non-volatile storage device 1102, the disclosure is not limited in this regard, and could be adapted to use any suitable recording/memory/storage device 1102 and/or recording/memory/storage media 1110.

The ACM 1011 may be tightly coupled to the device used to perform the triggered commit actions. For example, the ACM 1011 may be implemented on the same device, peripheral, card, or within the same "isolation zone" as the controller 1004 and/or secondary power source 1024. The tight coupling of the ACM 1011 to the components used to implement the triggered commit actions defines an "isolation zone," which may provide an acceptable level of assurance (based on industry standards or other metric) that the ACM 1011 is capable of implementing the triggered auto-commit actions in the event of a restart condition. In the FIG. 2 example, the isolation zone of the ACM 1011 is provided by the tight coupling of the ACM 1011 with the autonomous controller 1004 and secondary power supply 1024 (discussed below).

The controller 1004 may comprise an I/O controller, such as a network controller (e.g., a network interface controller), storage controller, dedicated restart condition controller, or the like. The controller 1004 may comprise firmware, hardware, a combination of firmware and hardware, or the like. In the FIG. 2 example, the controller 1004 comprises a storage controller, such as the storage controller 104 and/or non-volatile storage device controller described above. The controller 1004 may be configured to operate independently of the host 1014. As such, the controller 1004 may be used to implement the triggered commit action(s) of the ACM 1011 despite the restart conditions discussed above, such as failures in the host 1014 (and/or ACM users 1016) and/or loss of the primary power connection 1030.

The ACM 1011 is powered by a primary power connection 1030, which, like the primary power connection 130 described above, may be provided by a system bus (bus 1040), external power supply, the host 1014, or the like. In certain embodiments, the ACM 1011 also includes and/or is coupled to a secondary power source 1024. The secondary power source 1024 may power the ACM 1011 in the event of a failure to the primary power connection 1030. The secondary power source 1024 may be capable of providing at least enough power to enable the ACM 1011 and/or controller 1004 to autonomously implement at least a portion of a pre-configured triggered commit action(s) when the primary power connection 1030 has failed. The ACM 1011, in one embodiment, commits or persists at least enough data (e.g., ACM data and ACM metadata 1015) while receiving power from the secondary power source 1024, to allow access to the data once the primary power connection 1030 has been restored. In certain embodiments, as described above, the ACM 1011 may perform at least a portion of the pre-configured triggered commit action(s) after the primary power connection 1030 has been restored, using one or more commit agents 1020 or the like.

The ACM 1011 may comprise volatile memory storage. In the FIG. 2 example, the ACM 1011 includes one or more auto-commit buffers 1013. The auto-commit buffers 1013 may be implemented using a volatile Random Access Memory (RAM). In some embodiments, the auto-commit buffers 1013 may be embodied as independent components of the ACM 1011 (e.g., in separate RAM modules). Alternatively, the auto-commit buffers 1013 may be implemented on embedded volatile memory (e.g., BRAM) available within the controller 1004, a processor complex 1012, an FPGA, or other component of the ACM 1011.

Each of the auto-commit buffers 1013 may be pre-configured (armed) with a respective triggered commit action. In some embodiments, each auto-commit buffer 1013 may comprise its own, respective ACM metadata 1015. The ACM metadata 1015, in some embodiments, identifies how and/or where the data stored on the auto-commit buffer 1013 is to be committed. In some examples, the ACM metadata 1015 may comprise a logical identifier (e.g., an object identifier, logical block address (LBA), file name, or the like) associated with the data in the auto-commit buffer 1013. The logical identifier may be predefined. In one embodiment, when an auto-commit buffer 1013 is committed, the data therein may be committed with the ACM metadata 1015 (e.g., the data may be stored at a physical storage location corresponding to the logical identifier and/or in association with the logical identifier). To facilitate committing of ACM data during a hold-up time after a restart event, the ACM 1011 may write ACM data and ACM metadata 1015 in a single atomic operation, such as a single page write or the like. To permit writing of ACM and ACM metadata 1015 in a single atomic operation, the ACM buffers 1013 may be sized to correspond to a single write unit for a non-volatile storage media that is used by the ACM 1011. In some embodiments, the ACM metadata 1015 may comprise a network address, an LBA, or another identifier of a commit location for the data.

In a further embodiment, a logical identifier may associate data of an auto-commit buffer 1013 with an owner of the data, so that the data and the owner maintain the ownership relationship after a restart event. For example, the logical identifier may identify an application, an application type, a process ID, an ACM user 1016, or another entity of a host device 1014, so that the ACM data is persistently associated with the identified entity. In one embodiment, a logical identifier may be a member of an existing namespace, such as a file system namespace, a user namespace, a process namespace, or the like. In other embodiments, a logical identifier may be a member of a new or separate namespace, such as an ACM namespace. For example, a globally unique identifier namespace, as is typically used in distributed systems for identifying communicating entities, may be used as an ACM namespace for logical identifiers. The ACM 1011 may process committed ACM data according to a logical identifier for the data once a restart event has completed. For example, the ACM 1011 may commit the ACM data to a logical identifier associated with a temporary location in response to a restart event, and may write the ACM data to a persistent location identified by another logical identifier during recovery after the restart event.

As described above, the ACM 1011 may be tightly coupled with the components used to implement the triggered commit actions (e.g., the ACM 1011 is implemented within an "isolation zone"), which ensures that the data on the ACM 1011 will be committed in the event of a restart condition. As used herein, a "tight coupling" refers to a configuration wherein the components used to implement the triggered commit actions of the ACM 1011 are within the same "isolation zone," or two or more distinct trusted "isolation zones," and are configured to operate despite external failure or restart conditions, such as the loss of power, invalid shutdown, host 1014 failures, or the like. FIG. 2 illustrates a tight coupling between the ACM 1011, the auto-commit buffers 1013, the controller 1004, which is configured to operate independently of the host 1014, and the secondary power source 1024, which is configured to power the controller 1004 and the ACM 1011 (including the auto-commit buffers 1013) while the triggered commit actions are completed. Examples of a tight coupling include but are not limited to including the controller 1004, the secondary power source 1024, and the auto-commit buffers 1013 on a single printed circuit board (PCB), within a separate peripheral in electronic communication with the host 1014, and the like. In other embodiments, the ACM 1011 may be tightly coupled to other a different set of components (e.g., redundant host devices, redundant communication buses, redundant controllers, alternative power supplies, and so on).

The ACM 1011 may be accessible by the host 1014 and/or ACM users 1016 running thereon. Access to the ACM 1011 may be provided using memory access semantics, such as CPU load/store commands, DMA commands, 3rd party DMA commands, RDMA commands, atomic test and set commands, manipulatable memory pointers, and so on. In some embodiments, memory semantic access to the ACM 1011 is implemented over the bus 1040 (e.g., using a PCI-e BAR as described below).

In a memory semantic paradigm, ACM users 1016 running on the host 1014 may access the ACM 1011 via a memory system 1018 of the host 1014. The memory system 1018 may comprise a memory management unit, virtual memory system, virtual memory manager, virtual memory subsystem (or similar memory address space) implemented by an operating system, a virtualization system (e.g., hypervisor), an application, or the like. A portion of the ACM 1011 (e.g., one or more auto-commit buffers 1013) may be mapped into the memory system 1018, such that memory semantic operations implemented within the mapped memory address range (ACM address range 1021) are performed on the ACM 1011.

The SML 1050, in certain embodiments, allocates and/or arbitrates the storage capacity of the ACM 1011 between multiple ACM users 1016, using a resource management agent or the like. The resource management agent of the SML 1050 may comprise a kernel module provided to an operating system of the host device 1014, a device driver, a thread, a user space application, or the like. In one embodiment, the resource management agent determines how much storage capacity of the ACM buffers 1013 to allocate to an ACM user 1016 and how long the allocation is to last. Because, in certain embodiments, the ACM 1011 commits or persists data across restart events, the resource management agent may allocate storage capacity of ACM buffers 1013 across restart events.

The resource management agent may assign different ACM buffers 1013 to different ACM users 1016, such as different kernel and/or user space applications. The resource management agent may allocate ACM buffers 1013 to different usage types, may map ACM buffers 1013 to different non-volatile memory 110 locations for destaging, or the like. In one embodiment, the resource management agent may allocate the ACM buffers 1013 based on commit agents 1020 associated with the ACM buffers 1013 by the ACM metadata 1015 or the like. For example, a master commit agent 1020 may maintain an allocation map in ACM metadata 1015 identifying allocation information for ACM buffers 1013 of the ACM 1011 and identifying, in one embodiment, one or more secondary commit agents 1020, and the master commit agent 1020 may allocate a portion of the ACM buffers 1013 to each of the secondary commit agents 1020. In another embodiment, commit agents 1020 may register with the resource management agent, may request resources such as ACM buffers 1013 from the resource management agent, or the like. The resource management agent may use a predefined memory management policy, such as a memory pressure policy or the like, to allocate and arbitrate ACM buffer 1013 storage capacity between ACM users 1016.

In some embodiments, establishing an association between an ACM address range 1021 within the memory system 1018 and the ACM 1011 may comprise pre-configuring (arming) the corresponding auto-commit buffer(s) 1013 with a triggered commit action. As described above, this pre-configuration may comprise associating the auto-commit buffer 1013 with a logical identifier or other metadata, which may be stored in the ACM metadata 1015 of the buffer 1013. As described above, the ACM 1011 may be configured to commit the buffer data to the specified logical identifier in the event of a restart condition, or to perform other processing in accordance with the ACM metadata 1015.

Memory semantic access to the ACM 1011 may be implemented using any suitable address and/or device association mechanism. In some embodiments, memory semantic access is implemented by mapping one or more auto-commit buffers 1013 of the ACM 1011 into the memory system 1018 of the host 1014. In some embodiments, this mapping may be implemented using the bus 1040. For example, the bus 1040 may comprise a PCI-e (or similar) communication bus, and the mapping may comprise associating a Base Address Register (BAR) of an auto-commit buffer 1013 of the ACM 1011 on the bus 1040 with the ACM address range 1021 in the memory system 1018 (e.g., the host 1014 mapping a BAR into the memory system 1018).

The association may be implemented by an ACM user 1016 (e.g., by a virtual memory system of an operating system or the like), through an API of a storage layer, such as the storage management layer (SML) 1050. The SML 1050 may be configured to provide access to the auto-commit memory 1011 to ACM users 1016. The storage management layer 1050 may comprise a driver, kernel-level application, user-level application, library, or the like. One example of an SML is the Virtual Storage Layer® of Fusion-io, Inc. of Salt Lake City, Utah. The SML 1050 may provide a SML API 1019 comprising, inter alia, an API for mapping portions of the auto-commit memory 1011 into the memory system 1018 of the host 1014, for unmapping portions of the auto-commit memory 1011 from the memory system 1018 of the host 1014, for flushing the ACM buffers 1013, and the like. The SML 1050 may be configured to maintain metadata 1051, which may include a forward index 1053 comprising associations between logical identifiers of a logical address space and physical storage locations on the auto-commit memory 1011 and/or persistent storage media. In some embodiments, ACM 1011 may be associated with one or more virtual ranges that map to different address ranges of a BAR (or other addressing mechanism). The virtual ranges may be accessed (e.g., mapped) by different ACM users 1016. Mapping or exposing a PCI-e ACM BAR to the host memory 1018 may be enabled on demand by way of a SML API 1019 call.

The SML API 1019 may comprise interfaces for mapping an auto-commit buffer 1013 into the memory system 1018. In some embodiments, the SML API 1019 may extend existing memory management interfaces, such as malloc, calloc, or the like, to map auto-commit buffers 1013 into the virtual memory range of ACM user applications 1016 (e.g., a malloc call through the SML API 1019 may map one or more auto-commit buffers 1013 into the memory system 1018). Alternatively, or in addition, the SML API 1019 may comprise one or more explicit auto-commit mapping functions, such as "ACM_alloc," "ACM_free," or the like. Mapping an auto-commit buffer 1013 may further comprise configuring a memory system 1018 of the host to ensure that memory operations are implemented directly on the auto-commit buffer 1013 (e.g., prevent caching memory operations within a mapped ACM address range 1021).

The association between the ACM address range 1021 within the host memory system 1018 and the ACM 1011 may be such that memory semantic operations performed within a mapped ACM address range 1021 are implemented directly on the ACM 1011 (without intervening system RAM, or other intermediate memory, in a typical write commit operation, additional layers of system calls, or the like). For example, a memory semantic write operation implemented within the ACM address range 1021 may cause data to be written to the ACM 1011 (on one or more of the auto-commit buffers 1013). Accordingly, in some embodiments, mapping the ACM address range 1021 may comprise disabling caching of memory operations within the ACM address range 1021, such that memory operations are performed on an ACM 1011 and are not cached by the host (e.g., cached in a CPU cache, in host volatile memory, or the like). Disabling caching within the ACM address range 1021 may comprise setting a "non-cacheable" flag attribute associated with the ACM range 1021, when the ACM range 1021 is defined.

As discussed above, establishing an association between the host memory system 1018 and the ACM 1011 may comprise "arming" the ACM 1011 to implement a predetermined triggered commit action. The arming may comprise providing the ACM 1011 with a logical identifier (e.g., a logical block address, a file name, a network address, a stripe or mirroring pattern, or the like). The ACM 1011 may use the logical identifier to arm the triggered commit action. For example, the ACM 1011 may be triggered to commit data to a persistent storage medium using the logical identifier (e.g., the data may be stored at a physical address corresponding to the logical identifier and/or the logical identifier may be stored with the data in a log-based data structure). Arming the ACM 1011 allows the host 1014 to view subsequent operations performed within the ACM address range 1021 (and on the ACM 1011) as being "instantly committed," enabling memory semantic write granularity (e.g., byte level operations) and speed with instant commit semantics.

Memory semantic writes such as a "store" operation for a CPU are typically synchronous operations such that the CPU completes the operation before handling a subsequent operation. Accordingly, memory semantic write operations performed in the ACM memory range 1021 can be viewed as "instantly committed," obviating the need for a corresponding "commit" operation in the write-commit operation, which may significantly increase the performance of ACM users 1016 affected by write-commit latency. The memory semantic operations performed within the ACM memory range 1021 may be synchronous. Accordingly, ACM 1011 may be configured to prevent the memory semantic operations from blocking (e.g., waiting for an acknowledgement from other layers, such as the bus 1040, or the like). Moreover, the association between ACM address range 1021 and the ACM 1011 allow memory semantic operations to bypass system calls (e.g., separate write and commit commands and their corresponding system calls) that are typically included in write-commit operations.

Data transfer between the host 1014 and the ACM 1011 may be implemented using any suitable data transfer mechanism including, but not limited to: the host 1014 performing processor JO operations (PIO) with the ACM 1011 via the bus 1040; the ACM 1011 (or other device) providing one or more DMA engines or agents (data movers) to transfer data between the host 1014 and the ACM 1011; the host 1014 performing processor cache write/flush operations; or the like.

As discussed above, an ACM may be configured to automatically perform a pre-configured triggered commit action in response to detecting certain conditions (e.g., restart or failure conditions). In some embodiments, the triggered commit action may comprise committing data stored on the ACM 1014 to a persistent storage media. Accordingly, in some embodiments, an ACM, such as the ACM 1011 described above, may be comprise persistent storage media. FIG. 3 is a block diagram of a system 1100 depicting an embodiment of an ACM configured to implement triggered commit actions, which may include committing data to a persistent, solid-state, and/or non-volatile storage.

Figure 3:
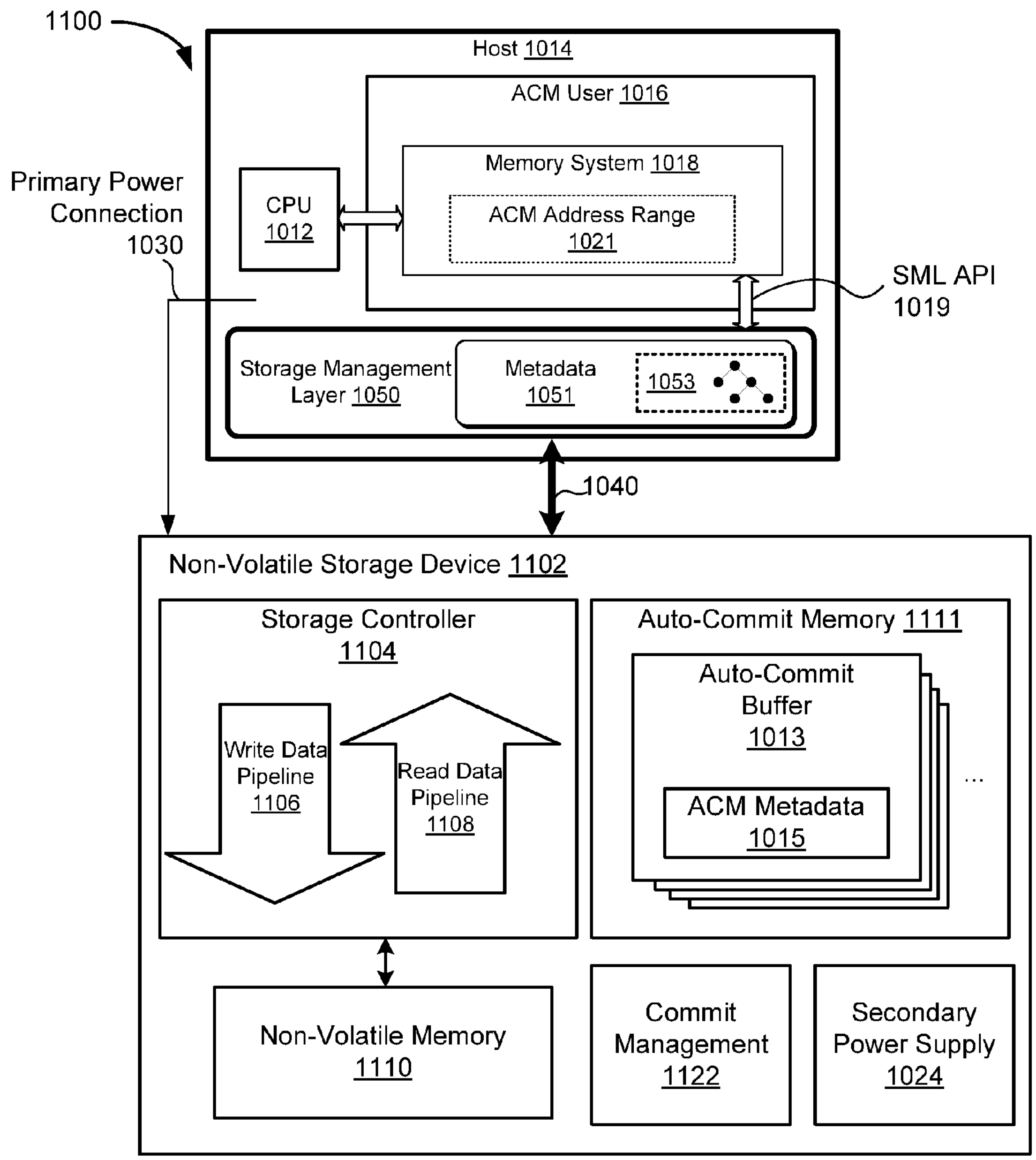
FIG. 3 is a block diagram of another embodiment of an auto-commit memory.

The ACM 1111 of the FIG. 3 example may be tightly coupled to the non-volatile storage device 1102, which comprises a controller 1104. The controller 1104 may comprise a write data pipeline 1106 and a read data pipeline 1108, which may operate as described above. The non-volatile storage device 1102 may be capable of persisting data on a non-volatile memory 1110, such as solid-state storage media.

A commit management apparatus 1122 is used to commit data to the non-volatile memory 1110 in response to a trigger event, such as loss of primary power connection, or other pre-determined trigger event. Accordingly, the commit management apparatus 1122 may comprise and/or be configured to perform the functions of the auto-commit memory 1011 described above. The commit management apparatus 1122 may be further configured to commit data on the ACM 1111 (e.g., the contents of the auto-commit buffers 1013) to the non-volatile memory 1110 in response to a restart condition (or on request from the host 1014 and/or ACM users 1016) and in accordance with the ACM metadata 1015. The commit management apparatus 1122 is one embodiment of a commit agent 1020.

The data on the ACM 1111 may be committed to the persistent storage 1110 in accordance with the ACM metadata 1015, such as a logical identifier or the like. The ACM 1111 may commit the data to a temporary location for further processing after a restart event, may commit the data to a final intended location, or the like as, described above. If the non-volatile memory 1110 is sequential storage device, committing the data may comprise storing the logical identifier or other ACM metadata 1015 with the contents of the auto-commit buffer 1013 (e.g., in a packet or container header). If the non-volatile memory 1110 comprises a hard disk having a 1:1 mapping between logical identifier and physical address, the contents of the auto-commit buffer 1013 may be committed to the storage location to which the logical identifier maps. Since the logical identifier or other ACM metadata 1015 associated with the data is pre-configured (e.g., armed), the ACM 1111 implements the triggered commit action independently of the host 1014. The secondary power supply 1024 supplies power to the volatile auto-commit buffers 1013 of the ACM 1111 until the triggered commit actions are completed (and/or confirmed to be completed), or until the triggered commit actions are performed to a point at which the ACM 1111 may complete the triggered commit actions during recovery after a restart event.

In some embodiments, the ACM 1111 commits data in a way that maintains an association between the data and its corresponding logical identifier (per the ACM metadata 1015). If the non-volatile memory 1110 comprises a hard disk, the data may be committed to a storage location corresponding to the logical identifier, which may be outside of the isolation zone 1301 (e.g., using a logical identifier to physical address conversion). In other embodiments in which the non-volatile memory 1110 comprises a sequential media, such as solid-state storage media, the data may be stored sequentially and/or in a log-based format as described in above and/or in U.S. Provisional Patent Application Publication No. 61/373,271, entitled "APPARATUS, SYSTEM, AND METHOD FOR CACHING DATA," and filed 12 Aug. 2010, which is hereby incorporated by reference in its entirety. The sequential storage operation may comprise storing the contents of an auto-commit buffer 1013 with a corresponding logical identifier (as indicated by the ACM metadata 1015). In one embodiment, the data of the auto-commit buffer 1013 and the corresponding logical identifier are stored together on the media according to a predetermined pattern. In certain embodiments, the logical identifier is stored before the contents of the auto-commit buffer 1013. The logical identifier may be included in a header of a packet comprising the data, or in another sequential and/or log-based format. The association between the data and logical identifier may allow a data index to be reconstructed as described above.

As described above, the auto-commit buffers 1013 of the ACM 1011 may be mapped into the memory system 1018 of the host 1014, enabling the ACM users 1016 of access these buffers 1013 using memory access semantics. In some embodiments, the mappings between logical identifiers and auto-commit buffers 1013 may leverage a virtual memory system of the host 1014.

For example, an address range within the memory system 1018 may be associated with a "memory mapped file." As discussed above, a memory mapped file is a virtual memory abstraction in which a file, portion of a file, or block device is mapped into the memory system 1018 address space for more efficient memory semantic operations on data of the non-volatile storage device 1102. An auto-commit buffer 1013 may be mapped into the host memory system 1018 using a similar abstraction. The ACM memory range 1021 may, therefore, be represented by a memory mapped file. The backing file must be stored on the non-volatile memory 1110 within the isolation zone 1301 (See FIG. 5 below) or another network attached non-volatile storage device 1102 also protected by an isolation zone 1301. The auto-commit buffers 1013 may correspond to only a portion of the file (the file itself may be very large, exceeding the capacity of the auto-commit buffers 1013 and/or the non-volatile memory 1110). When a portion of a file is mapped to an auto-commit buffer 1013, the ACM user 1016 (or other entity) may identify a desired offset within the file and the range of blocks in the file that will operate with ACM characteristics (e.g., have ACM semantics). This offset will have a predefined logical identifier and the logical identifier and range may be used to trigger committing the auto-commit buffer(s) 1013 mapped within the file. Alternatively, a separate offset for a block (or range of blocks) into the file may serve as a trigger for committing the auto-commit buffer(s) 1013 mapped to the file. For example, anytime a memory operation (load, store, poke, etc.) is performed on data in the separate offset or range of blocks may result in a trigger event that causes the auto-commit buffer(s) 1013 mapped to the file to be committed.

The underlying logical identifier may change, however (e.g., due to changes to other portions of the file, file size changes, etc.). When a change occurs, the SML 1050 (via the SML API 1019, an ACM user 1016, or other entity) may update the ACM metadata 1015 of the corresponding auto-commit buffers 1013. In some embodiments, the SML 1050 may be configured to query the host 1014 (operating system, hypervisor, or other application) for updates to the logical identifier of files associated with auto-commit buffers 1013. The queries may be initiated by the SML API 1019 and/or may be provided as a hook (callback mechanism) into the host 1014. When the ACM user 1016 no longer needs the auto-commit buffer 1013, the SML 1050 may de-allocate the buffer 1013 as described above. De-allocation may further comprise informing the host 1014 that updates to the logical identifier are no longer needed.

In some embodiments, a file may be mapped across multiple storage devices (e.g., the storage devices may be formed into a RAID group, may comprise a virtual storage device, or the like). Associations between auto-commit buffers 1013 and the file may be updated to reflect the file mapping. This allows the auto-commit buffers 1013 to commit the data to the proper storage device. The ACM metadata 1015 of the auto-commit buffers 1013 may be updated in response to changes to the underlying file mapping and/or partitioning as described above. Alternatively, the file may be "locked" to a particular mapping or partition while the auto-commit buffers 1013 are in use. For example, if a remapping/repartitioning of a file is required, the corresponding auto-commit buffers 1013 may commit data to the file, and then be re-associated with the file under the new mapping/partitioning scheme. The SML API 1019 may comprise interfaces and/or commands for using the SML 1050 to lock a file, release a file, and/or update ACM metadata 1015 in accordance with changes to a file.

Committing the data to solid-state, non-volatile storage 1110 may comprise the storage controller 1104 accessing data from the ACM 1111 auto-commit buffers 1013, associating the data with the corresponding logical identifier (e.g., labeling the data), and injecting the labeled data into the write data pipeline 1106 as described above. In some embodiments, to ensure there is a page program command capable of persisting the ACM data, the storage controller 1104 maintains two or more pending page programs during operation. The ACM data may be committed to the non-volatile memory 1110 before writing the power loss identifier (power-cut fill pattern) described above.

Figure 4:
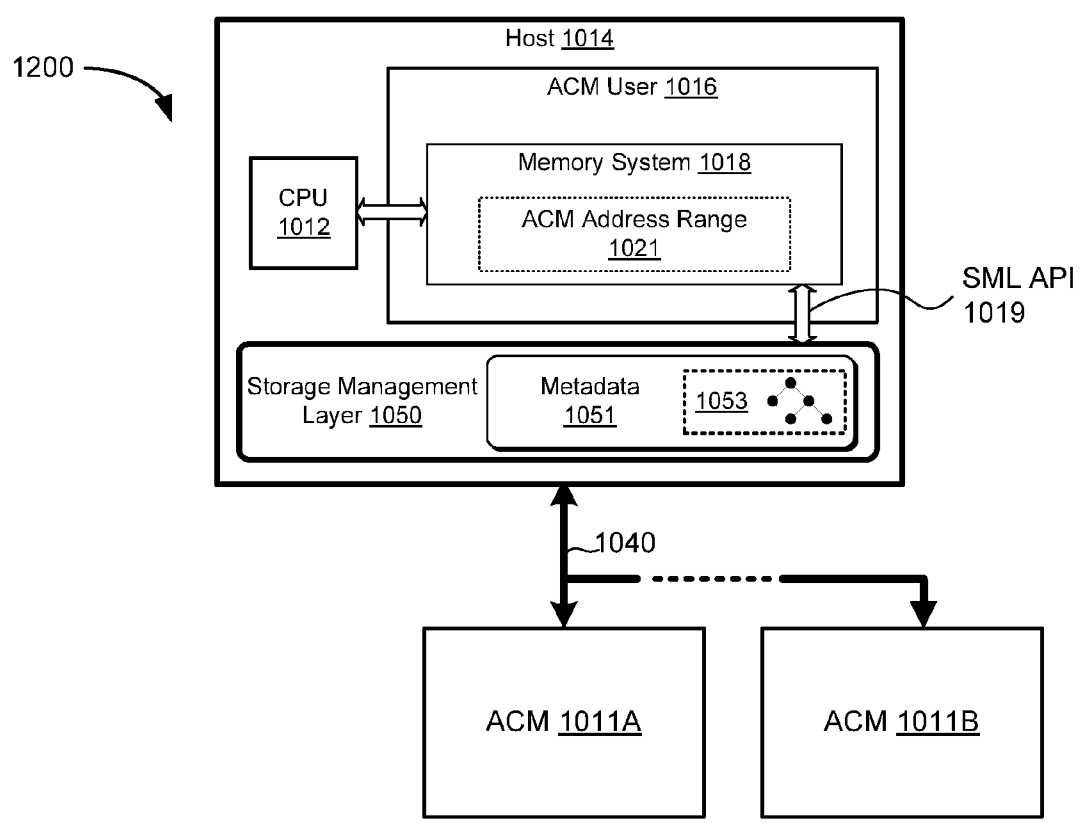
FIG. 4 is a block diagram of a system comprising a plurality of auto-commit memories.

FIG. 4 depicts one embodiment of a system 1200 comprising a plurality of auto-commit memories. In the FIG. 4 example, memory semantic accesses implemented by the host 1014 may be stored on a plurality of ACMs, including 1011A and 1011B. In some embodiments, host data may be mirrored between the ACMs 1011A and 1011B. The mirroring may be implemented using a multi-cast bus 1040. Alternatively, or in addition, one of the ACMs (AM 1011A) may be configured to rebroadcast data to the ACM 1011B. The ACMs 1011A and 1011B may be local to one another (e.g., on the same local bus). Alternatively, the ACMs 1011A and 1011B may located on different systems, and may be communicatively coupled via a bus that supports remove data access, such as Infiniband, a remote PCI bus, RDMA, or the like.

In some embodiments, the ACMs 1011A and 1011B may implement a striping scheme (e.g., a RAID scheme). In this case, different portions of the host data may be sent to different ACMs 1011A and/or 1011B. Driver level software, such as a volume manager implemented by the SML 1050 and/or operating system 1018 may map host data to the proper ACM per the striping pattern.

In some configurations, the memory access semantics provided by the ACMs may be adapted according to a particular storage striping pattern. For example, if host data is mirrored from the ACM 1011A to the ACM 1011B, a memory semantic write may not complete (and/or an acknowledgement may not be returned) until the ACM 1011A verifies that the data was sent to the ACM 1011B (under the "instant commit" semantic). Similar adaptations may be implemented when ACMs are used in a striping pattern (e.g., a memory semantic write may be not return and/or be acknowledged, until the striping pattern for a particular operation is complete). For example, in a copy on write operation, the ACM 1011A may store the data of an auto-commit buffer, and then cause the data to be copied to the ACM 1011B. The ACM 1011A may not return an acknowledgment for the write operation (or allow the data to be read) until the data is copied to the ACM 1011B.

The use of mirrored ACM devices 1011A and 1011B may be used in a high-availability configuration. For example, the ACM devices 1011A and 1011B may be implemented in separate host computing devices. Memory semantic accesses to the devices 1011A and 1011B are mirrored between the devices as described above (e.g., using PCI-e access). The devices may be configured to operate in high-availability mode, such that device proxying may not be required. Accordingly, trigger operations (as well as other memory semantic accesses) may be mirrored across both devices 1011A and 1011B, but the devices 1011A and 1011B may not have to wait for a "acknowledge" from the other before proceeding, which removes the other device from the write-commit latency path.

Figure 5:
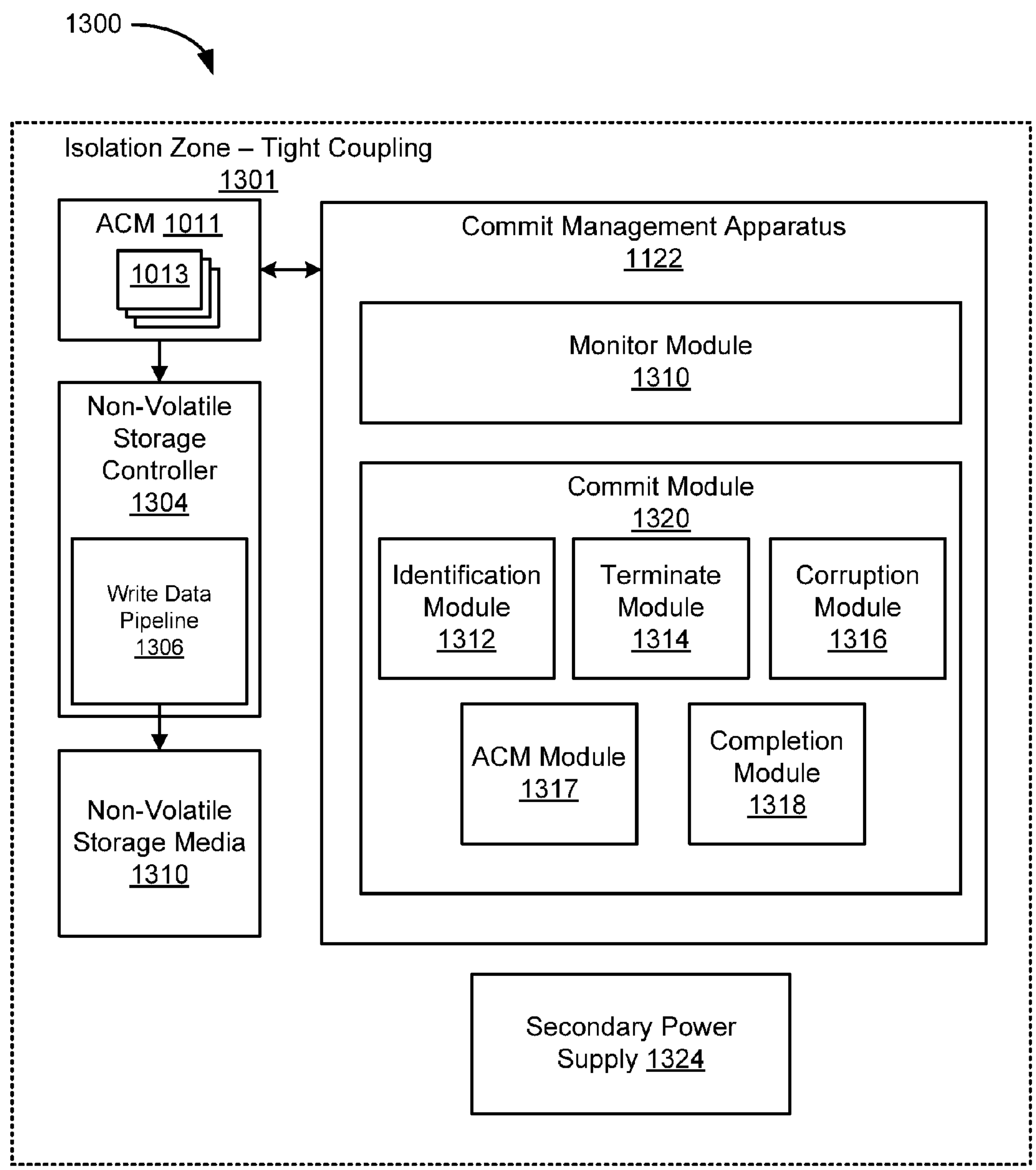
FIG. 5 is a block diagram of an auto-commit memory implemented with a commit management apparatus.

FIG. 5 is a block diagram of a one embodiment 1300 of a commit management apparatus 1122. The commit management apparatus 1122 may be tightly coupled (e.g., within an isolation zone 1301) to the auto-commit memory 1011, the non-volatile storage controller 1304, the non-volatile storage media 1310, and/or the secondary power supply 1324. The tight coupling may comprise implementing these components 132, 1011, 1304, 1310, and/or 1324 on the same die, the same peripheral device, on the same card (e.g., the same PCB), within a pre-defined isolation zone, or the like. The tight coupling may ensure that the triggered commit actions of the ACM buffers 1013 are committed in the event of a restart condition.

The commit management apparatus 1122 includes a monitor module 1310, which may be configured to detect restart conditions, such as power loss or the like. The monitor module 1310 may be configured to sense triggering events, such as restart conditions (e.g., shutdown, restart, power failures, communication failures, host or application failures, and so on) and, in response, to initiate the commit module 1320 to initiate the commit loss mode of the apparatus 1122 (failure loss mode) and/or to trigger the operations of other modules, such as modules 1312, 1314, 1316, 1317, and/or 1318. The commit module 1320 includes an identification module 1312, terminate module 1314, corruption module 1316, and completion module 1318, which may operate as described above.

The identification module 1312 may be further configured to identify triggered commit actions to be performed for each ACM buffer 1013 of the ACM 1011. As discussed above, the identification module 1312 may prioritize operations based on relative importance, with acknowledged operations being given a higher priority than non-acknowledged operations. The contents of auto-commit buffers 1013 that are armed to be committed may be assigned a high priority due to the "instant commit" semantics supported thereby. In some embodiments, the ACM triggered commit actions may be given a higher priority than the acknowledged contents of the write data pipeline 1306. Alternatively, the contents of armed auto-commit buffers 1013 may be assigned the "next-highest' priority. The priority assignment may be user configurable (via an API, control (IOCTL), or the like).

The termination module 1314 terminates non-essential operations to allow "essential" to continue as described above. The termination module 1314 may be configured to hold up portions of the ACM 1011 that are "armed" to be committed (e.g., armed auto-commit buffers), and may terminate power to non-armed (unused) portions of the auto-commit memory 1011. The termination module 1314 may be further configured to terminate power to portions of the ACM 1011 (individual auto-commit buffers 1013) as the contents of those buffers are committed.

The corruption module 1316 identifies corrupt (or potentially corrupt) data in the write data pipeline 1306 as described above. The module 1316 may be further configured to identify corrupt ACM data 1011 (data that was written to the ACM 1011 during a power disturbance or other restart condition). The corruption module 1316 may be configured to prevent corrupt data on the ACM 1011 from being committed in a triggered commit action.

An ACM module 1317 is configured to access armed auto-commit buffers in the auto-commit memory 1011, identify the ACM metadata 1015 associated therewith (e.g., label the data with the corresponding logical identifier per the ACM metadata 1015), and inject the data (and metadata) into the write data pipeline of the non-volatile storage controller 1304. In some embodiments, the logical identifier (or other ACM metadata 1015) of the auto-commit buffer 1013 may be stored in the buffer 1013 itself. In this case, the contents of the auto-commit buffer 1013 may be streamed directly into a sequential and/or log-based storage device without first identifying and/or labeling the data. The ACM module 1317 may inject data before or after data currently in the write data pipeline 1306. In some embodiments, data committed from the ACM 1011 is used to "fill out" the remainder of a write buffer of the write data pipeline 1306 (after removing potentially corrupt data). If the remaining capacity of the write buffer is insufficient, the write buffer is written to the non-volatile storage 1310, and a next write buffer is filled with the remaining ACM data.

As discussed above, in some embodiments, the non-volatile storage controller 1304 may maintain an armed write operation (logical page write) to store the contents of the write data pipeline 1306 in the event of power loss. When used with an ACM 1011, two (or more) armed write operations (logical page writes) may be maintained to ensure the contents of both the write data pipeline 1306, and all the armed buffers 1013 of the ACM 1011 can be committed in the event of a restart condition. Because a logical page in a write buffer may be partially filled when a trigger event occurs, the write buffer is sized to hold at least one more logical page of data than the total of all the data stored in all ACM buffers 1013 of the ACM 1011 and the capacity of data in the write data pipeline that has been acknowledged as persisted. In this manner, there will be sufficient capacity in the write buffer to complete the persistence of the ACM 1011 in response to a trigger event. Accordingly, the auto-commit buffers 1013 may be sized according to the amount of data the ACM 1011 is capable of committing. Once this threshold is met, the SML 1050 may reject requests to use ACM buffers 1013 until more become available.

The completion module 1318 is configured to flush the write data pipeline regardless of whether the certain buffers, packets, and/or pages are completely filled. The completion module 1318 is configured to perform the flush (and insert the related padding data) after data on the ACM 1011 (if any) has been injected into the write data pipeline 1306. The completion module 1318 may be further configured to inject completion indicator into the write data pipeline, which may be used to indicate that a restart condition occurred (e.g., a restart condition fill pattern). This fill pattern may be included in the write data pipeline 1306 after injecting the triggered data from the ACM 1011.

As discussed above, the secondary power supply 1324 may be configured to provide sufficient power to store the contents of the ACM 1011 as well as data in the write data pipeline 1306. Storing this data may comprise one or more write operations (e.g., page program operations), in which data is persistently stored on the non-volatile storage media 1310. In the event a write operation fails, another write operation, on a different storage location, may be attempted. The attempts may continue until the data is successfully persisted on the non-volatile storage media 1310. The secondary power supply 1324 may be configured to provide sufficient power for each of a plurality of such page program operations to complete. Accordingly, the secondary power supply 1324 may be configured to provide sufficient power to complete double (or more) page program write operations as required to store the data of the ACM 1011 and/or write data pipeline 1306.

Figure 6:
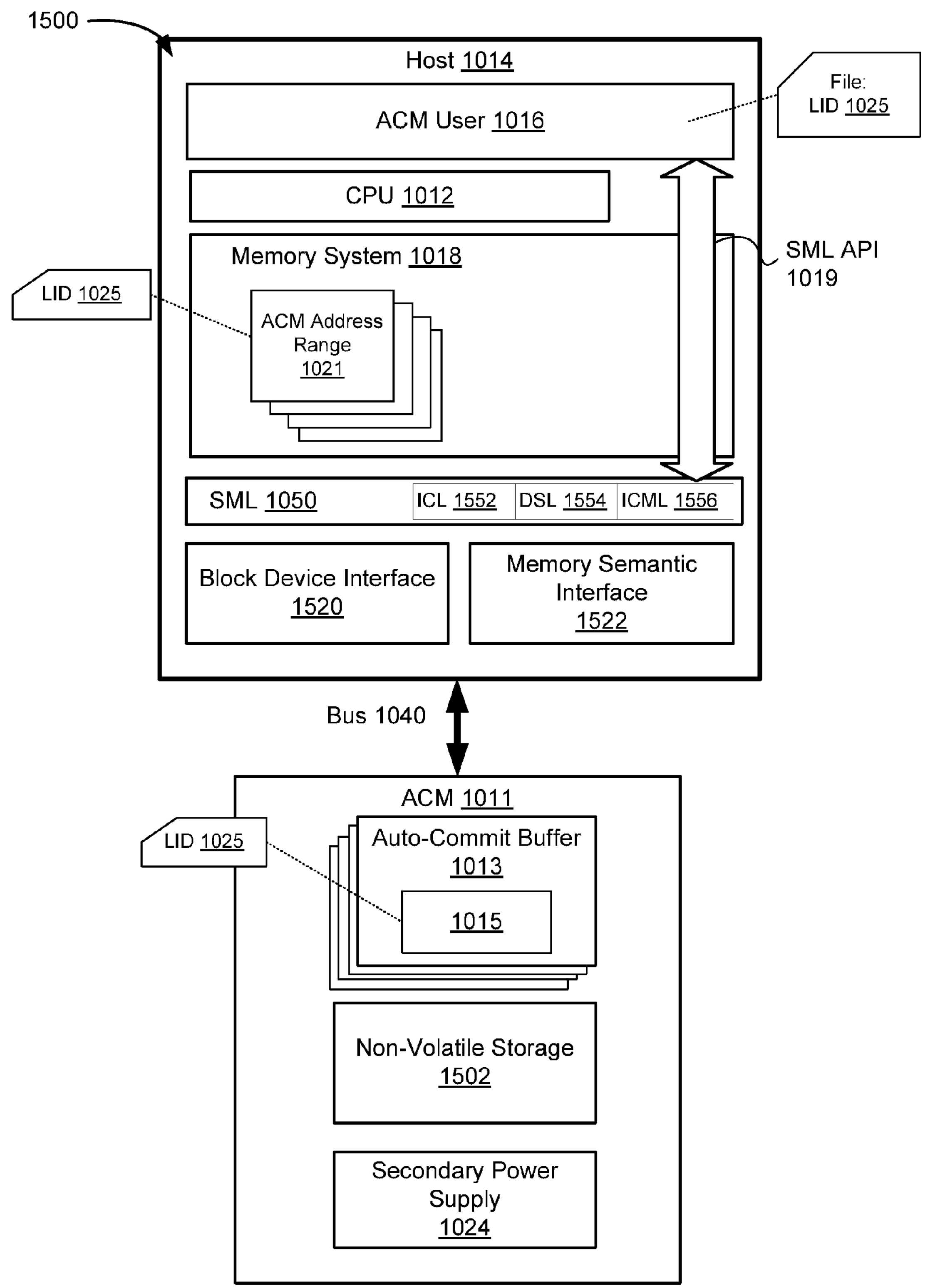
FIG. 6 is a block diagram of another embodiment of a system comprising an auto-commit memory.

FIG. 6 is a block diagram 1500 depicting a host computing device 1014 accessing an ACM using memory access semantics. The host computing device 1014 may comprise a processor complex/CPU 1012, which may include, but is not limited to, one or more of a general purpose processor, an application-specific processor, a reconfigurable processor (FPGA), a processor core, a combination of processors, a processor cache, a processor cache hierarchy, or the like. In one embodiment, the processor complex 1012 comprises a processor cache, and the processor cache may include one or more of a write combine buffer, an L1 processor cache, an L2 processor cache, an L3 processor cache, a processor cache hierarchy, and other types of processor cache. One or more ACM users 1016 (e.g., operating systems, applications, and so on) operate on the host 1014.

The host 1014 may be communicatively coupled to the ACM 1011 via a bus 1040, which may comprise a PCI-e bus, or the like. Portions of the ACM 1011 are made accessible to the host 1014 may mapping in auto-commit buffers 1013 into the host 1014. In some embodiments, mapping comprises associating an address range within the host memory system 1018 with an auto-commit buffer 1013 of the ACM 1011. These associations may be enabled using the SML API 1019 and/or SML 1050 available on the host 1014.

The SML 1050 may comprise libraries and/or provide interfaces (e.g., SML API 1019) to implement the memory access semantics described above. The API 1019 may be used to access the ACM 1011 using memory access semantics via a memory semantic access module 1522. Other types of access, such as access to the non-volatile storage 1502, may be provided via a block device interface 1520.

The SML 1050 may be configured to memory map auto-commit buffers 1013 of the ACM 1011 into the memory system 1018 (via the SML API 1019). The memory map may use a virtual memory abstraction of the memory system 1018. For example, a memory map may be implemented using a memory mapped file abstraction. In this example, the operating system (or application) 1016 designates a file to be mapped into the memory system 1018. The file is associated with a logical identifier (LID) 1025 (e.g., logical block address), which may be maintained by a file system, an operating system 1016, or the like.

The memory mapped file may be associated with an auto-commit buffer 1013 of the ACM 1013. The association may be implemented by the SML 1050 using the bus 1040. The SML 1050 associates the address range of the memory mapped file (in the memory system 1018) with a device address of an auto-commit buffer 1013 on the ACM 1011. The association may comprise mapping a PCI-e BAR into the memory system 1018. In the FIG. 6 example, the ACM address range 1021 in the memory system 1018 is associated with the auto-commit buffer 1013.

As discussed above, providing memory access semantics to the ACM 1011 may comprise "arming" the ACM 1011 to commit data stored thereon in the event of failure or other restart. The pre-configured arming ensures that, in the event of a restart, data stored on the ACM 1011 will be committed to the proper logical identifier. The pre-configuration of the trigger condition enables applications 1016 to access the auto-commit buffer 1013 using "instant-commit" memory access semantics. The logical identifier used to arm the auto-commit buffer may be obtained from an operating system, the memory system 1018 (e.g., virtual memory system), or the like.

The SML 1050 may be configured to arm the auto-commit buffers 1013 with a logical identifier (e.g., automatically, by callback, and/or via the SML API 1019). Each auto-commit buffer 1013 may be armed to commit data to a different logical identifier (different LBA, persistent identifier, or the like), which may allow the ACM 1011 to provide memory semantic access to a number of different, concurrent ACM users 1016. In some embodiments, arming an auto-commit buffer 1013 comprises setting the ACM metadata 1015 with a logical identifier. In the FIG. 6 example, the ACM address range 1021 is associated with the logical identifier 1025, and the ACM metadata 1015 of the associated auto-commit buffer is armed with the corresponding logical identifier 1025.

The SML 1050 may arm an auto-commit buffer using an I/O control (IOCTL) command comprising the ACM address range 1021, the logical identifier 1025, and/or an indicator of which auto-commit buffer 1013 is to be armed. The SML 1050 (through the SML API 1019) may provide an interface to disarm or "detach" the auto-commit buffer 1013. The disarm command may cause the contents of the auto-commit buffer 1013 to be committed as described above (e.g., committed to the non-volatile storage device 1502). The detach may further comprise "disarming" the auto-commit buffer 1013 (e.g., clearing the ACM metadata 1015). The SML 1050 may be configured to track mappings between address ranges in the memory system 1018 and auto-commit buffers 1013 so that a detach command is performed automatically.

Alternatively, or in addition, the SML 1050 may be integrated into the operating system (or virtual operating system, e.g., hypervisor) of the host 1014. This may allow the auto-commit buffers 1013 to be used by a virtual memory demand paging system. The operating system may (through the SML API 1019 or other integration technique) map/arm auto-commit buffers for use by ACM users 1016. The operating system may issue commit commands when requested by an ACM user 1016 and/or its internal demand paging system. Accordingly, the operating system may use the ACM 1011 as another, generally available virtual memory resource.

Once an ACM user 1016 has mapped the ACM address range 1021 to an auto-commit buffer 1013 and has armed the buffer 1013, the ACM user 1016 may access the resource using memory access semantics, and may consider the memory accesses to be "logically" committed as soon as the memory access has completed. The ACM user 1016 may view the memory semantic accesses to the ACM address range 1021 to be "instantly committed" because the ACM 1011 is configured to commit the contents of the auto-commit buffer (to the logical identifier 1025) regardless of experiencing restart conditions. Accordingly, the ACM user 1016 may not be required to perform separate write and commit commands (e.g., a single memory semantic write is sufficient to implement a write-commit). Moreover, the mapping between the auto-commit buffer 1013 and the ACM 1011 disclosed herein removes overhead due to function calls, system calls, and even a hypervisor (if the ACM user 1016 is running in a virtual machine) that typically introduce latency into the write-commit path. The write-commit latency time of the ACM user 1016 may therefore be reduced to the time required to access the ACM 1011 itself.

As described above, in certain embodiments, the host 1014 may map one or more ACM buffers 1013 into an address range of a physical memory address space addressable by a CPU, a kernel, or the like of the host device 1014, such as the memory system 1018, as directly attached physical memory, as MMIO addressable physical memory over a PCI-e bus, or otherwise mapped as one or more pages of physical memory. The host 1014 may further map at least a portion of the physically mapped ACM buffers 1013 into a virtual memory address space, accessible to user-space processes or the like as virtual memory. The host 1014 may map the entire capacity of the physically mapped ACM buffers 1013 into a virtual memory address space, a portion of the physically mapped ACM buffers 1013 into a virtual memory address space, or the like.

In a similar manner, the host 1014 may include a virtual machine hypervisor, host operating system, or the like that maps the physically mapped ACM buffers 1013 into an address space for a virtual machine or guest operating system. The physically mapped ACM buffers 1013 may appear to the virtual machine or guest operating system as physically mapped memory pages, with the virtual machine hypervisor or host operating system spoofing physical memory using the ACM buffers 1013. A resource management agent, as described above, may allocate/arbitrate storage capacity of the ACM buffers 1013 among multiple virtual machines, guest operating systems, or the like.

Because, in certain embodiments, virtual machines, guest operating systems, or the like detect the physically mapped ACM buffers 1013 as if they were simply physically mapped memory, the virtual machines can sub-allocate/arbitrate the ACM buffers 1013 into one or more virtual address spaces for guest processes, or the like. This allows processes within guest operating systems, in one embodiment, to change ACM data and/or ACM metadata 1015 directly, without making guest operating system calls, without making requests to the hypervisor or host operating system, or the like.

In another embodiment, instead of spoofing physical memory for a virtual machine and/or guest operating system, a virtual machine hypervisor, a host operating system, or the like of the host device 1014 may use para-virtualization techniques. For example, a virtual machine and/or guest operating system may be aware of the virtual machine hypervisor or host operating system and may work directly with it to allocate/arbitrate the ACM buffers 1013, or the like. When the ACM 1011 is used in a virtual machine environment, in which one or more ACM users 1016 operate within a virtual machine maintained by a hypervisor, the hypervisor may be configured to provide ACM users 1016 operating within the virtual machine with access to the SML API 1019 and/or SML 1050.

The hypervisor may access the SML API 1019 to associate logical identifiers with auto-commit buffers 1013 of the ACM 1011, as described above. The hypervisor may then provide one or more armed auto-commit buffers 1013 to the ACM users 1016 (e.g., by mapping an ACM address range 1021 within the virtual machine memory system to the one or more auto-commit buffers 1013). The ACM user 1016 may then access the ACM 1011 using memory access semantics (e.g., efficient write-commit operations), without incurring overheads due to, inter alia, hypervisor and other system calls. The hypervisor may be further configured to maintain the ACM address range 1021 in association with the auto-commit buffers 1013 until explicitly released by the ACM user 1016 (e.g., the keep the mapping from changing during use). Para-virtualization and cooperation, in certain embodiments, may increase the efficiency of the ACM 1011 in a virtual machine environment.

In some embodiments, the ACM user 1016 may be adapted to operate with the "instant commit" memory access semantics provided by the ACM 1013. For example, since the armed auto-commit buffers 1013 are triggered to commit in the event of a restart (without an explicit commit command), the order in which the ACM user 1016 performs memory access to the ACM 1011 may become a consideration. The ACM user 1016 may employ memory barriers, complier flags, and the like to ensure the proper ordering of memory access operations.

For example, read before write hazards may occur where an ACM user 1016 attempts to read data through the block device interface 1520 that is stored on the ACM 1011 (via the memory semantic interface 1522). In some embodiments, the SML 1050 may maintain metadata tracking the associations between logical identifiers and/or address ranges in the memory system 1018 and auto-commit buffers 1013. When an ACM user 1016 (or other entity) attempts to access a logical identifier that is mapped to an auto-commit buffer 1013 (e.g., through the block device interface 1520), the SML 1050 directs the request to the ACM 1011 (via the memory semantic interface 1522), preventing a read before write hazard.

The SML 1050 may be configured to provide a "consistency" mechanism for obtaining a consistent state of the ACM 1011 (e.g., a barrier, snapshot, or logical copy). The consistency mechanism may be implemented using metadata maintained by the SML 1050, which, as described above, may track the triggered auto-commit buffers 1013 in the ACM 1011. A consistency mechanism may comprise the SML 1050 committing the contents of all triggered auto-commit buffers 1013, such that the state of the persistent storage is maintained (e.g., store the contents of the auto-commit buffers 1013 on the non-volatile storage 1502, or other persistent storage).

As described above, ACM users 1016 may access the ACM 1011 using memory access semantics, at RAM granularity, with the assurance that the operations will be committed if necessary (in the event of restart, failure, power loss, or the like). This is enabled by, inter alia, a mapping between the memory system 1018 of the host 1014 and corresponding auto-commit buffers 1013; memory semantic operations implemented within an ACM memory range 1021 mapped to an auto-commit buffer 1013 are implemented directly on the buffer 1013. As discussed above, data transfer between the host 1041 and the ACM 1011 may be implemented using any suitable data transfer mechanism including, but not limited to: the host 1014 performing processor IO operations (PIO) with the ACM 1011 via the bus 1040 (e.g., MMIO, PMIO, and the like); the ACM 1011 (or other device) providing one or more DMA engines or agents (data movers) to transfer data between the host 1014 and the ACM 1011; the host 1014 performing processor cache write/flush operations; or the like. Transferring data on the bus 1040 may comprise issuing a bus "write" operation followed by a "read." The subsequent "read" may be required where the bus 1040 (e.g., PCI bus) does not provide an explicit write acknowledgement.

In some embodiments, an ACM user may wish to transfer data to the ACM 1011 in bulk as opposed to a plurality of small transactions. Bulk transfers may be implemented using any suitable bulk transfer mechanism. The bulk transfer mechanism may be predicated on the features of the bus 1040. For example, in embodiments comprising a PCI-e bus 1040, bulk transfer operations may be implemented using bulk register store CPU instructions.

Similarly, certain data intended for the ACM 1011 may be cached in processor cache of the processor complex 1012. Data that is cached in a processor cache may be explicitly flushed to the ACM 1011 (to particular auto-commit buffers 1013) using a CPU cache flush instruction, or the like, such as the serializing instruction described below.

The DMA engines described above may also be used to perform bulk data transfers between an ACM user 1016 and the ACM 1011. In some embodiments, the ACM 1011 may implement one or more of the DMA engines, which may be allocated and/or accessed by ACM users 1016 using the SML 1050 (through the SML API 1019). The DMA engines may comprise local DMA transfer engines for transferring data on a local, system bus as well as RDMA transfer engines for transferring data using a network bus, network interface, or the like.

In some embodiments, the ACM 1011 may be used in caching applications. For example, the non-volatile storage device 1502 may be used as cache for other backing store, such as a hard disk, network-attached storage, or the like (not shown). One or more of the ACM 1011 auto-commit buffers 1013 may be used as a front-end to the non-volatile storage 1502 cache (a write-back cache) by configuring one or more of the auto-commit buffers 1013 of the ACM 1011 to commit data to the appropriate logical identifiers in the non-volatile storage 1502. The triggered buffers 1013 are accessible to ACM users 1016 as described above (e.g., by mapping the buffers 1013 into the memory system 1018 of the host 1014). A restart condition causes the contents of the buffers 1013 to be committed to the non-volatile storage 1502 cache. When the restart condition is cleared, the cached data in the non-volatile storage 1502 (committed by the auto-commit buffers 1013 on the restart condition) will be viewed as "dirty" in the write cache and available for use and/or migration to the backing store. The use of the ACM 1011 as a cache front-end may increase performance and/or reduce wear on the cache device.

In some embodiments, auto-commit buffers 1013 of the ACM 1011 may be leveraged as a memory write-back cache by an operating system, virtual memory system, and/or one or more CPUs of the host 1014. Data cached in the auto-commit buffers 1013 as part of a CPU write-back cache may be armed to commit as a group. When committed, the auto-commit buffers 1013 may commit both data and the associated cache tags. In some embodiments, the write-back cache auto-commit buffers 1013 may be armed with an ACM address (or armed with a predetermined write-back cache address). When the data is restored, logical identifier information, such as LBA and the like, may be determined from a log or other data.

In some embodiments, the SML 1050 may comprise libraries and/or publish APIs adapted to a particular set of ACM users 1016. For example, the SML 1050 may provide an Instant Committed Log Library (ICL) 1552 adapted for applications whose performance is tied to write-commit latency, such as transaction logs (database, file system, and other transaction logs), store and forward messaging systems, persistent object caching, storage device metadata, and the like.

The ICL 1552 provides mechanisms for mapping auto-commit buffers 1013 of the ACM 1011 into the memory system 1018 of an ACM user 1016 as described above. ACM users 1016 (or the ICL 1552 itself) may implement an efficient "supplier/consumer" paradigm for auto-commit buffer 1013 allocation, arming, and access. For example, a "supplier" thread or process (in the application space of the ACM users 1016) may be used to allocate and/or arm auto-commit buffers 1013 for the ACM user 1016 (e.g., map auto-commit buffers 1013 to address ranges within the memory system 1018 of the host 1014, arm the auto-commit buffers 1013 with a logical identifier, and so on). A "consumer" thread or process of the ACM user 1016 may then accesses the pre-allocated auto-commit buffers 1013. In this approach, allocation and/or arming steps are taken out of the write-commit latency path of the consumer thread. The consumer thread of the ACM user 1016 may consider memory semantic accesses to the memory range mapped to the triggered auto-commit buffers (the ACM memory range 1021) as being "instantly committed" as described above.

Performance of the consumer thread(s) of the ACM user 1016 may be enhanced by configuring the supplier threads of an Instant Committed Log Library (ICL) 1552 (or ACM user 1016) to allocate and/or arm auto-commit buffers 1013 in advance. When a next auto-commit buffer 1013 is needed, the ACM user 1016 have access a pre-allocated/armed buffer from a pool maintained by the supplier. The supplier may also perform cleanup and/or commit operations when needed. For example, if data written to an auto-commit buffer is to be committed to persistent storage, a supplier thread (or another thread outside of the write-commit path) may cause the data to be committed (using the SML API 1019). Committing the data may comprise re-allocating and/or re-arming the auto-commit buffer 1013 for a consumer thread of the ACM user 1016 as described above.

The "supplier/consumer" approach described above may be used to implement a "rolling buffer." An ACM user 1016 may implement an application that uses a pre-determined amount of "rolling" data. For example, an ACM user 1016 may implement a message queue that stores the "last 20 inbound messages" and/or the ACM user 1016 may manage directives for a non-volatile storage device (e.g., persistent trim directives or the like). A supplier thread may allocate auto-commit buffers 1013 having at least enough capacity to hold the "rolling data" needed by the ACM user 1016 (e.g., enough capacity to hold the last 20 inbound messages). A consumer thread may access the buffers using memory access semantics (load and store calls) as described above. The SML API 1019 (or supplier thread of the ACM user 1016) may monitor the use of the auto-commit buffers 1013. When the consumer thread nears the end of its auto-commit buffers 1013, the supplier thread may re-initialize the "head" of the buffers 1013, by causing the data to be committed (if necessary), mapping the data to another range within the memory system 1018, and arming the auto-commit buffer 1013 with a corresponding logical identifier. As the consumer continues to access the buffers 1013, the consumer stores new data at a new location that "rolls over" to the auto-commit buffer 1013 that was re-initialized by the supplier thread, and continues to operate. In some cases, data written to the rolling buffers described above may never be committed to persistent storage (unless a restart condition or other triggering condition occurs). Moreover, if the capacity of the auto-commit buffers 1013 is sufficient to hold the rolling data of the ACM user, the supplier threads may not have to perform re-initialize/re-arming described above. Instead, the supplier threads may simply re-map auto-commit buffers 1013 that comprise data that has "rolled over" (and/or discard the "rolled over" data therein).

In its simplest form, a rolling buffer may comprise two ACM buffers 1013, and the SML 1050 may write to one ACM buffer 1013 for an ACM user 1016 while destaging previously written data from the other ACM buffer 1013 to a storage location, such as the non-volatile memory 1110 or the like. In response to filling one ACM buffer 1013 and completing a destaging process of the other ACM buffer 1013, the SML 1050 may transparently switch the two ACM buffers such that the ACM user 1016 writes to the other ACM buffer 1013 during destaging of the one ACM buffer 1013, in a ping-pong fashion. The SML 1050 may implement a similar rolling process with more than two ACM buffers 1013. The ICL 1552, in certain embodiments, includes and/or supports one or more transactional log API functions. An ACM user 1016 may use the ICL 1552, in these embodiments, to declare or initialize a transactional log data structure.

As a parameter to a transactional log API command to create a transactional log data structure, in one embodiment, the ICL 1552 receives a storage location, such as a location in a namespace and/or address space of the non-volatile storage 1502 or the like, to which the SML 1050 may commit, empty, and/or destage data of the transactional log from two or more ACM buffers 1013 in a rolling or circular manner as described above. Once an ACM user 1016 has initialized or declared a transactional log data structure, in one embodiment, the use of two or more ACM buffers 1013 to implement the transactional log data structure is substantially transparent to the ACM user 1016, with the performance and benefits of the ACM 1011. The use of two or more ACM buffers 1013, in certain embodiments, is transparent when the destage rate for the two or more ACM buffers 1013 is greater than or equal to the rate at which the ACM user 1016 writes to the two or more ACM buffers 1013. The ICL 1552, in one embodiment, provides byte-level writes to a transactional log data structure using two or more ACM buffers 1013.

In another example, a supplier thread may maintain four (4) or more ACM buffers 1013. A first ACM buffer 1013 may be armed and ready to accept data from the consumer, as described above. A second ACM buffer 1013 may be actively accessed (e.g., filled) by a consumer thread, as described above. A third ACM buffer 1013 may be in a pre-arming process (e.g., re-initializing, as described above), and a fourth ACM buffer 1013 may be "emptying" or "destaging" (e.g., committing to persistent storage, as described above).

In some embodiments, the ICL 1552 and/or rolling log mechanisms described above may be used to implement an Intent Log for Synchronous Writes for a filesystem (e.g., the ZFS file system). The log data (ZIL) may be fairly small (1 to 4 gigabytes) and is typically "write only." Reads may only be performed for file system recovery. One or more auto-commit buffers 1013 may be used to store filesystem data using a rolling log and/or demand paging mechanism as described above.

The ICL library 1552 may be configured to operate in a high-availability mode as described above in conjunction with FIG. 4. In a high-availability mode, the SML 1050 and/or bus 1040 sends commands pertaining to memory semantic accesses to two or more ACM 1011, each of which may implement the requested operations and/or be triggered to commit data in the event of a restart condition.

The ACM 1011 disclosed herein may be used to enable other types of applications, such as durable synchronization primitives. A synchronization primitive may include, but is not limited to: a semaphore, mutex, atomic counter, test and set, or the like.

A synchronization primitive may be implemented on an auto-commit buffer 1013. ACM users 1016 (or other entities) that wish to access the synchronization primitive may map the auto-commit buffer 1013 into the memory system 1018. In some embodiments, each ACM user 1016 may map the synchronization primitive auto-commit buffer 1013 into its own, respective address range in the memory system 1018. Since the different address ranges are all mapped to the same auto-commit buffer 1013, all will show the same state of the synchronization primitive. ACM users 1016 on remote computing devices may map the synchronization primitive auto-commit buffer 1013 into their memory system using an RDMA network or other remote access mechanism (e.g., Infiniband, remote PCI, etc.).

In some embodiments, the SML 1050 may comprise a Durable Synchronization Primitive Library (DSL) 1554 to facilitate the creation of and/or access to synchronization primitives on the ACM 1011. The DSL 1554 may be configured to facilitate one-to-many mappings as described above (one auto-commit buffer 1030-to-many address ranges in the memory system 1018).

The ACM users 1016 accessing the semaphore primitive may consider their accesses to be "durable," since if a restart condition occurs while the synchronization primitive is in use, the state of the synchronization primitive will be persisted as described above (the auto-commit buffer 1013 of the synchronization primitive will be committed to the non-volatile storage 1502, or other persistent storage).

As described above, the SML 1050 may be used to map a file into the memory system 1018 (virtual address space) of the host 1014. The file may be mapped in an "Instant Committed Memory" (ICM) mode. In this mode, all changes made to the memory mapped file are guaranteed to be reflected in the file, even if a restart condition occurs. This guarantee may be made by configuring the demand paging system to use an auto-commit buffer 1013 of the ACM 1011 for all "dirty" pages of the ICM file. Accordingly, when a restart condition occurs, the dirty page will be committed to the file, and no data will be lost.

In some embodiments, the SML 1050 may comprise an ICM Library (ICML) 1556 to implement these features. The ICML 1556 may be integrated with an operating system and/or virtual memory system of the host 1014. When a page of an ICM memory mapped file is to become dirty, the ICML 1556 prepares an auto-commit buffer 1013 to hold the dirty page. The auto-commit buffer 1013 is mapped into the memory system 1018 of the host 1014, and is triggered to commit to a logical identifier associated with the memory mapped file. As described above, changes to the pages in the memory system 1018 are implemented on the auto-commit buffer 1013 (via the memory semantic access module 1522).

The ICML 1556 may be configured to commit the auto-commit buffers 1013 of the memory mapped file when restart conditions occur and/or when the demand paging system of the host 1014 needs to use the auto-commit buffer 1013 for another purpose. The determination of whether to "detach" the auto-commit buffer 1013 from a dirty page may be made by the demand paging system, by the SML 1050 (e.g., using a least recently used (LRU) metric, or the like), or by some other entity (e.g., an ACM user 1016). When the auto-commit buffer is detached, the SML 1050 may cause its contents to be committed. Alternatively, the contents of the auto-commit buffer 1013 may be transferred to system RAM at which point the virtual memory mapping of the file may transition to use a RAM mapping mechanisms.

In some embodiments, the SML 1050 (or ICML 1556) may be configured to provide a mechanism to notify the operating system (virtual memory system or the like) that a page of a memory mapped file is about to become dirty in advance of an ACM user 1016 writing the data. This notification may allow the operating system to prepare an auto-commit buffer 1013 for the dirty page in advance, and prevent stalling when the write actually occurs (while the auto-commit buffer is mapped and armed). The notification and preparation of the auto-commit buffer 1013 may implemented in a separate thread (e.g., a supplier thread as described above).

The SML 1050 and/or ICML 1556 may provide an API to notify the operating system that a particular page that is about to be written has no useful contents and should be zero filled. This notification may help the operating system to avoid unnecessary read operations.

The mechanisms for memory mapping a file to the ACM 1011 may be used in log-type applications. For example, the ICL library 1552 may be implemented to memory map a log file to one or more auto-commit buffers 1013 as described above. A supplier thread may provide notifications to the operating system regarding which pages are about to become dirty and/or to identify pages that do not comprise valid data.

Alternatively, or in addition, the ICML 1556 may be implemented without integration into an operating system of the host 1014. In these embodiments, the ICML 1556 may be configured to monitor and/or trap system signals, such as mprotect, mmap, and manual segmentation fault signals to emulate the demand paging operations typically performed by an operating system.

Figure 7:
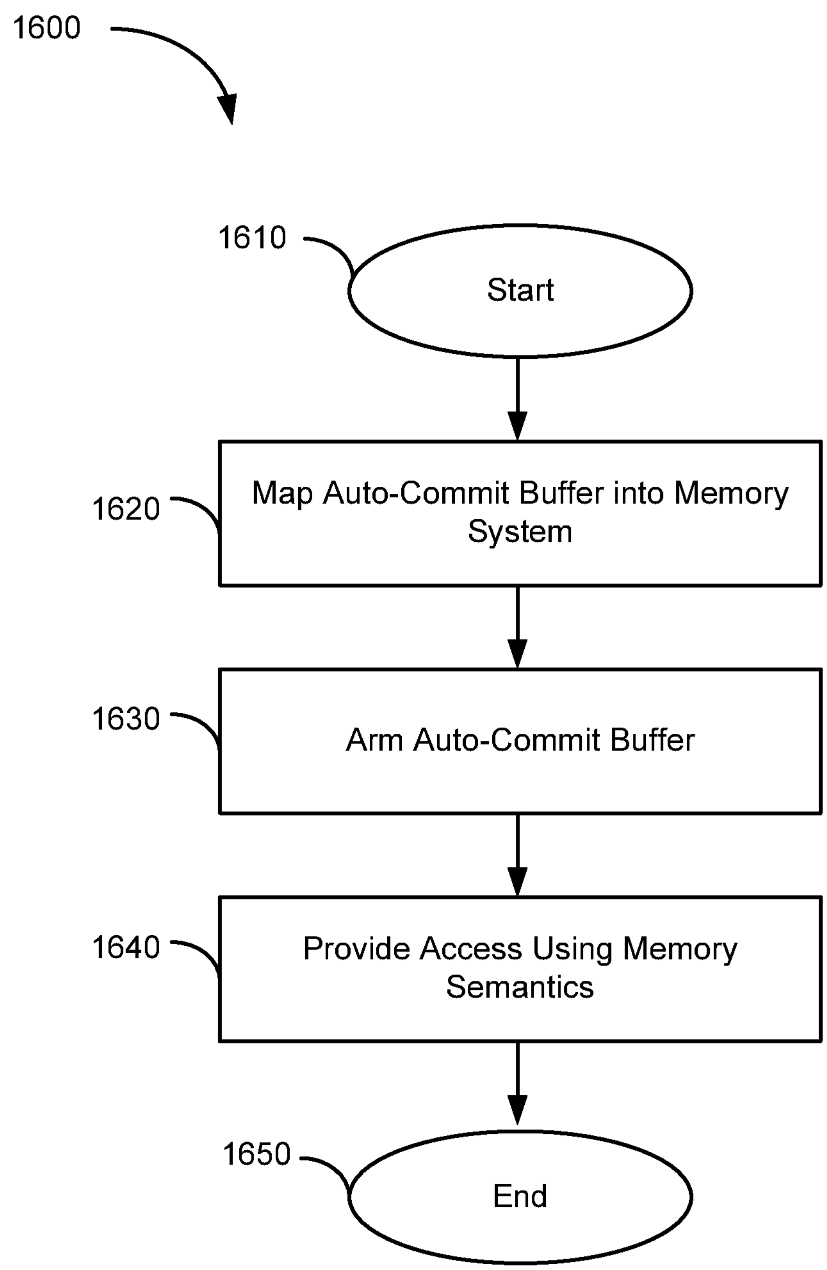
FIG. 7 is a flow diagram of one embodiment of a method for providing an auto-commit memory.

FIG. 7 is a flow diagram of one embodiment of a method 1600 for providing an auto-commit memory. At step 1610 the method 1600 may start and be initialized. Step 1610 may comprise the method 1600 initiating communication with an ACM over a bus (e.g., initiating communication with ACM 1011 via bus 1040).

At step 1620, an auto-commit buffer of the ACM may be mapped into the memory system of a computing device (e.g., the host 1014). The mapping may comprise associating a BAR address of the auto-commit buffer with an address range in the memory system.

At step 1630, the auto-commit buffer may be armed with ACM metadata configured to cause the auto-commit buffer to be committed to a particular persistent storage and/or at a particular location in the persistent storage in the event of a restart condition. In some embodiments, the ACM metadata may comprise a logical identifier such as a LBA, object identifier, or the like. Step 1630 may comprise verifying that the ACM metadata is valid and/or can be used to commit the contents of the auto-commit buffer.

At step 1640, an ACM user, such as an operating system, application, or the like, may access the armed auto-commit buffer using memory access semantics. The ACM user may consider the accesses to be "instantly committed" due to the arming of step 1630. Accordingly, the ACM user may implement "instant committed" writes that omit a separate and/or explicit commit command. Moreover, since the memory semantic accesses are directly mapped to the auto-commit buffer (via the mapping of step 1620), the memory semantic accesses may bypass systems calls typically required in virtual memory systems.

At step 1650 the method 1600 ends until a next auto-commit buffer is mapped and/or armed.

Figure 8:
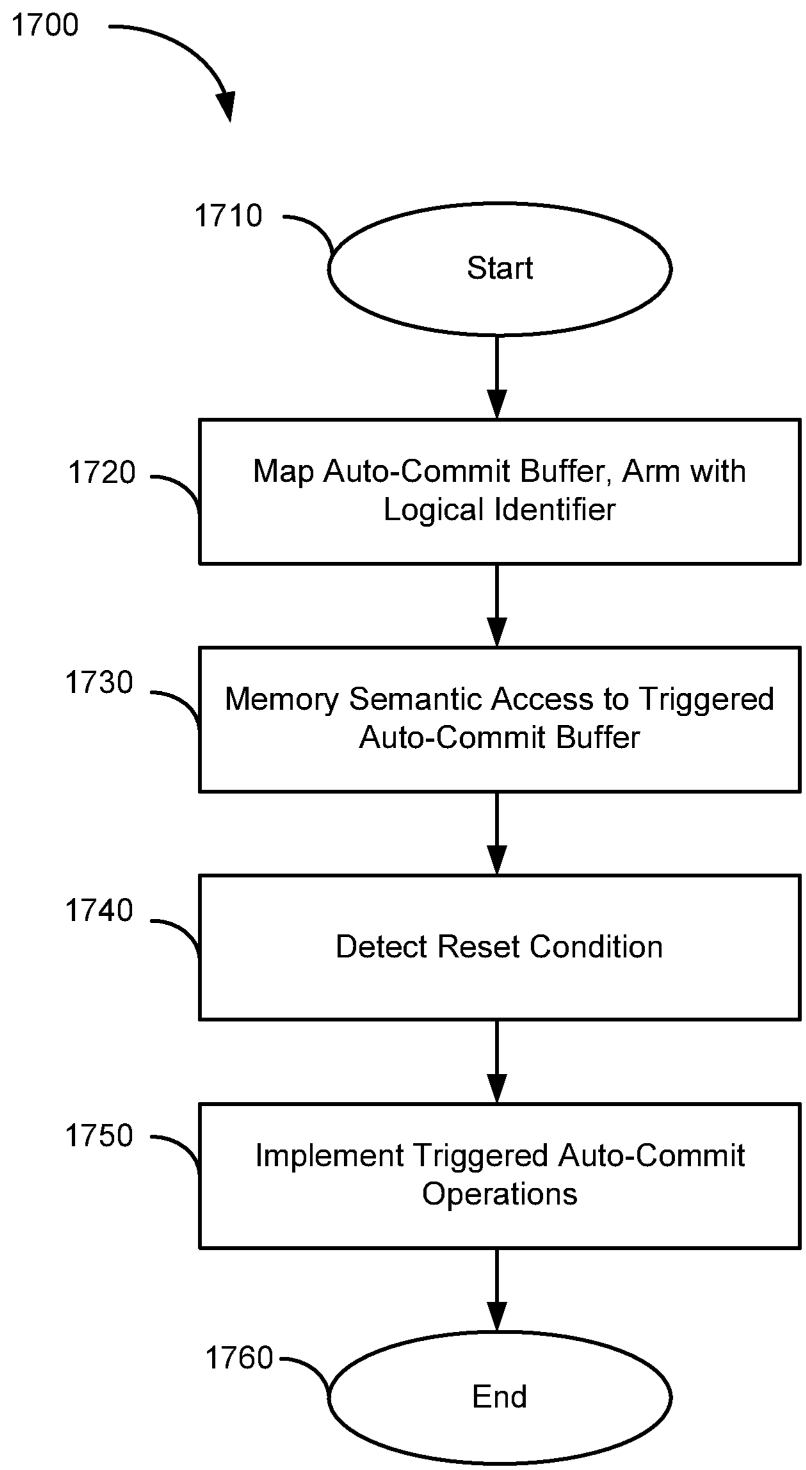
FIG. 8 is a flow diagram of another embodiment of a method for providing an auto-commit memory.

FIG. 8 is a flow diagram of another embodiment of a method 1700 for providing an auto-commit memory. At step 1710 the method 1700 starts and is initialized as described above.

At step 1720, an auto-commit buffer of an ACM is mapped into the memory system of a computing device (e.g., the host 1014), and is armed as described above.

At step 1730, an ACM user accesses the auto-commit buffer using memory access semantics (e.g., by implementing memory semantic operations within the memory range mapped to the auto-commit buffer at step 1720).

At step 1740, a restart condition is detected. As described above, the restart condition may be a system shutdown, a system restart, a loss of power, a loss of communication between the ACM and the host computing device, a software fault, or any other restart condition that precludes continued operation of the ACM and/or the host computing device.

At step 1750, the ACM implements the armed triggered commit actions on the auto-commit buffer. The triggered commit action may comprise committing the contents of the auto-commit buffer to persistent storage, such as a solid-state or other non-volatile storage or the like.

At step 1760, the method 1700 ends until a next auto-commit buffer is mapped and/or armed or a restart condition is detected.

Figure 9:
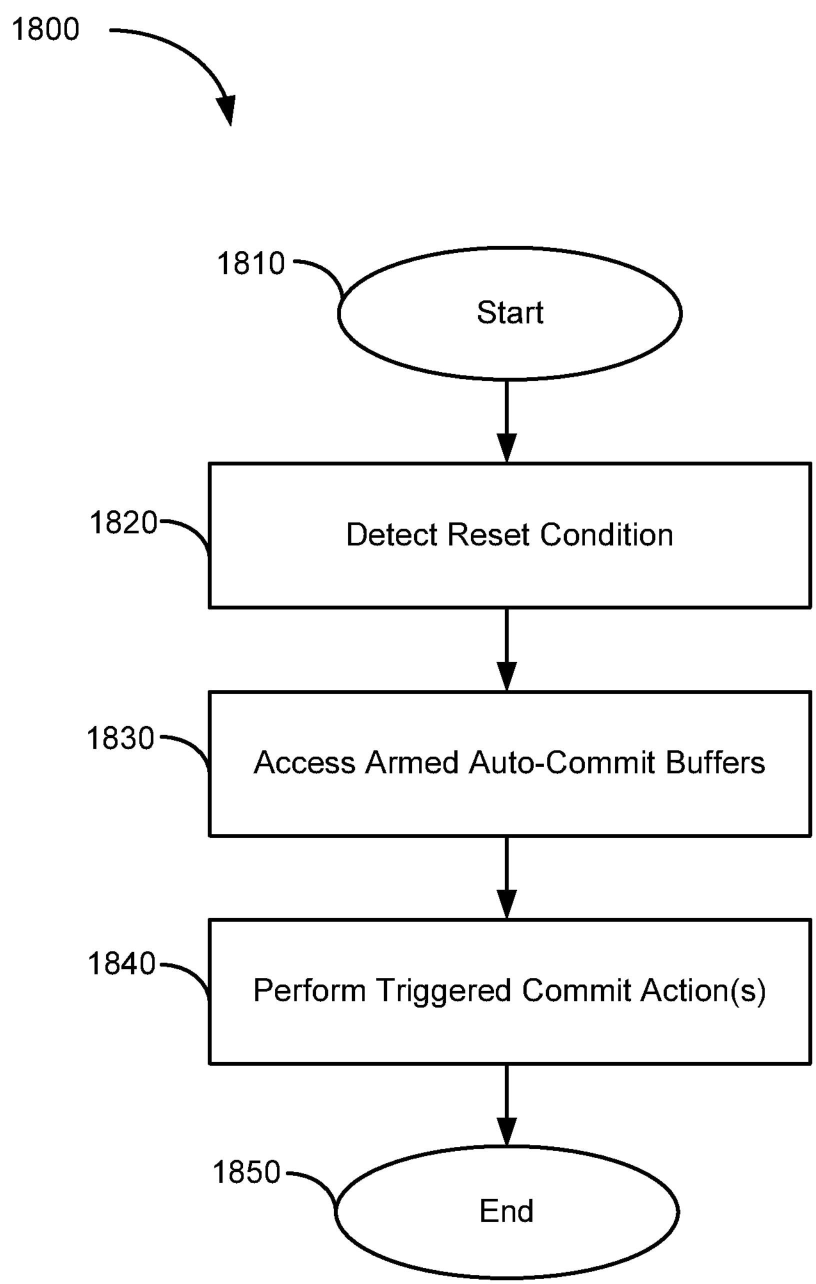
FIG. 9 is a flow diagram of another embodiment of a method for providing an auto-commit memory.

FIG. 9 is a flow diagram of another embodiment for providing an auto-commit memory. At step 1810, the method 1800 starts and is initialized as described above. At step 1820, a restart condition is detected.

At step 1830, the method 1800 accesses armed auto-commit buffers on the ACM (if any). Accessing the armed auto-commit buffer may comprise the method 1800 determining whether an auto-commit buffer has been armed by inspecting the triggered ACM metadata thereof. If no triggered ACM metadata exists, or the ACM metadata is invalid, the method 1800 may determine that the auto-commit buffer is not armed. If valid triggered ACM metadata does exist for a particular auto-commit buffer, the method 1800 identifies the auto-commit buffer as an armed buffer and continues to step 1840.

At step 1840, the triggered commit action for the armed auto-commit buffers is performed. Performing the triggered commit action may comprise persisting the contents of the auto-commit buffer to a sequential and/or log-based storage media, such as a solid-state or other non-volatile storage media. Accordingly, the triggered commit action may comprise accessing a logical identifier of the auto-commit buffer, labeling the data with the logical identifier, and injecting the labeled data into a write data pipeline. Alternatively, the triggered commit action may comprise storing the data on a persistent storage having a one-to-one mapping between logical identifier and physical storage address (e.g., a hard disk). The triggered commit action may comprise storing the contents of the armed auto-commit buffer to the specified physical address.

Performing the triggered commit action at step 1840 may comprise using a secondary power supply to power the ACM, solid-state storage medium, and/or other persistent, non-volatile storage medium, until the triggered commit actions are completed.

In certain embodiments, instead of or in addition to using a volatile memory namespace, such as a physical memory namespace, a virtual memory namespace, or the like and/or instead of or in addition to using a storage namespace, such as a file system namespace, a logical unit number (LUN) namespace, or the like, one or more commit agents 1020, as described above, may implement an independent persistent memory namespace for the ACM 1011. For example, a volatile memory namespace, which is typically accessed using an offset in physical and/or virtual memory, is not persistent or available after a restart event such as a reboot, failure event, or the like and a process that owned the data in physical and/or virtual memory prior to the restart event typically no longer exists after the restart event. Alternatively, a storage namespace is typically accessed using a file name and an offset, a LUN ID and an offset, or the like. While a storage namespace may be available after a restart event, a storage namespace may have too much overhead for use with the ACM 1011. For example, saving a state for each executing process using a file system storage namespace may result in a separate file for each executing process, which may not be an efficient use of the ACM 1011.

The one or more commit agents 1020 and/or the controller 1004, in certain embodiments, provide ACM users 1016 with a new type of persistent memory namespace for the ACM 1011 that is persistent through restart events without the overhead of a storage namespace. One or more processes, such as the ACM user 1016, in one embodiment, may access the persistent memory namespace using a unique identifier, such as a globally unique identifier (GUID), universal unique identifier (UUID), or the like so that data stored by a first process for an ACM user 1016 prior to a restart event is accessible to a second process for the ACM user 1016 after the restart event using a unique identifier, without the overhead of a storage namespace, a file system, or the like.

The unique identifier, in one embodiment, may be assigned to an ACM user 1016 by a commit agent 1020, the controller 1004, or the like. In another embodiment, an ACM user 1016 may determine its own unique identifier. In certain embodiments, the persistent memory namespace is sufficiently large and/or ACM users 1016 determine a unique identifier in a predefined, known manner (e.g., based on a sufficiently unique seed value, nonce, or the like) to reduce, limit, and/or eliminate collisions between unique identifiers. In one embodiment, the ACM metadata 1015 includes a persistent memory namespace unique identifier associated with an owner of an ACM buffer 1013, an owner of one or more pages of an ACM buffer 1013, or the like.

In one embodiment, the one or more commit agents 1020 and/or the controller 1004 provide a persistent memory namespace API to ACM users 1016, over which the ACM users 1016 may access the ACM 1011 using the persistent memory namespace. In various embodiments, the one or more commit agents 1020 and/or the controller 1004 may provide a persistent memory namespace API function to transition, convert, map, and/or copy data from an existing namespace, such as a volatile memory namespace or a storage namespace, to a persistent memory namespace; a persistent memory namespace API function to transition, convert, map, and/or copy data from a persistent memory namespace to an existing namespace, such as a volatile memory namespace or a storage namespace; a persistent memory namespace API function to assign a unique identifier such as a GUID, a UUID, or the like; a persistent memory namespace API function to list or enumerate ACM buffers 1013 associated with a unique identifier; a persistent memory namespace API function to export or migrate data associated with a unique identifier so that an ACM user 1016 such as an application and/or process may take its ACM data to a different host 1014, to a different ACM 1011, or the like; and/or other persistent memory namespace API functions for the ACM 1011.

For example, an ACM user 1016, in one embodiment, may use a persistent memory namespace API function to map one or more ACM buffers 1013 of a persistent memory namespace into virtual memory of an operating system of the host 1014, or the like, and the mapping into the virtual memory may end in response to a restart event while the ACM user 1016 may continue to access the one or more ACM buffers 1013 after the restart event using the persistent memory namespace. In certain embodiments, the SML 1050 may provide the persistent memory namespace API in cooperation with the one or more commit agents 1020 and/or the controller 1004.

The persistent memory namespace, in certain embodiments, is a flat non-hierarchical namespace of ACM buffers 1013 (and/or associated ACM pages), indexed by the ACM metadata 1015. The one or more commit agents 1020 and/or the controller 1004, in one embodiment, allow the ACM buffers 1013 to be queried by ACM metadata 1015. In embodiments where the ACM metadata 1015 includes a unique identifier, in certain embodiments, an ACM user 1016 may query or search the ACM buffers 1013 by unique identifier to locate ACM buffers 1013 (and/or stored data) associated with a unique identifier. In a further embodiment, the one or more commit agents 1020 and/or the controller 1004 may provide one or more generic metadata fields in the ACM metadata 1015 such that an ACM user 1016 may define its own ACM metadata 1015 in the generic metadata field, or the like. The one or more commit agents 1020 and/or the controller 1004, in one embodiment, may provide access control for the ACM 1011, based on unique identifier, or the like.

In one embodiment, an ACM buffer 1013 may be a member of a persistent memory namespace and one or more additional namespaces, such as a volatile namespace, a storage namespace or the like. In a further embodiment, the one or more commit agents 1020 and/or the controller 1004 may provide multiple ACM users 1016 with simultaneous access to the same ACM buffers 103. For example, multiple ACM users 1016 of the same type and/or with the same unique identifier, multiple instances of a single type of ACM user 1016, multiple processes of a single ACM user 1016, or the like may share one or more ACM buffers 1013. Multiple ACM users 1016 accessing the same ACM buffers 1013, in one embodiment, may provide their own access control for the shared ACM buffers 1013, such as a locking control, turn-based control, moderator-based control, or the like. In a further embodiment, using a unique identifier, a new ACM user 1016, an updated ACM user 1016, or the like on the host 1014 may access In certain embodiments, the ACM 1011 may comprise a plurality of independent access channels, buses, and/or ports, and may be at least dual ported (e.g., dual ported, triple ported, quadruple ported). In embodiments where the ACM 1011 is at least dual ported, the ACM 1011 is accessible over a plurality of independent buses 1040. For example, the ACM 1011 may be accessible over redundant bus 1040 connections with a single host 1014, may be accessible to a plurality of hosts 1014 over separate buses 104 with the different hosts 1014, or the like. In embodiments where the ACM 1011 is at least dual ported, if one node and/or access channel fails (e.g., a host 1014, a bus 1040), one or more additional nodes and/or access channels to the ACM 1011 remain functional, obviating the need for redundancy, replication, or the like between multiple hosts 1014.

In one embodiment, the ACM 1011 comprises a PCI-e attached dual port device, and the ACM 1011 may be connected to and in communication with two hosts 1014 over independent PCI-e buses 1040. For example, the ACM 1011 may comprise a plurality of PCI-e edge connectors for connecting to a plurality of PCI-e slot connectors, or the like. In a further embodiment, the power connection 1030 may also be redundant, with one power connection 1030 per bus 1040 or the like. At least one of the plurality of connections, in certain embodiments, may comprise a data network connection such as a NIC or the like. For example, the ACM 1011 may comprise one or more PCI-e connections and one or more data network connections.

In one embodiment, the controller 1004 may arbitrate between a plurality of hosts 1014 to which the ACM 1011 is coupled, such that one host 1014 may access the ACM buffers 1013 at a time. The controller 1004, in another embodiment, may accept a reservation request from a host 1014 and may provide the requesting host 1014 with access to the ACM buffers 1013 in response to receiving the reservation request. The ACM 1011 may natively support a reservation request as an atomic operation of the ACM 1011. In other embodiments, the ACM 1011 may divide ACM buffers 1013 between hosts 1014, may divide ACM buffers 1013 between hosts but share backing non-volatile memory 1110 between hosts, or may otherwise divide the ACM buffers 1013, the non-volatile memory 1110, and/or associated address spaces between hosts 1014.

In one embodiment, the controller 1004, the one or more commit agents 1020, and/or other elements of the ACM 1011 may be dual-headed, split-brained, or the like, each head or brain being configured to communicate with a host 1014 and with each other to provide redundant functions for the ACM 1011. By being at least dual ported, in certain embodiments, the ACM 1011 may be redundantly accessible, without the overhead of replication, duplication, or the like which would otherwise reduce I/O speeds of the ACM 1011, especially if such replication, duplication, were performed over a data network or the like.

Figure 10A:
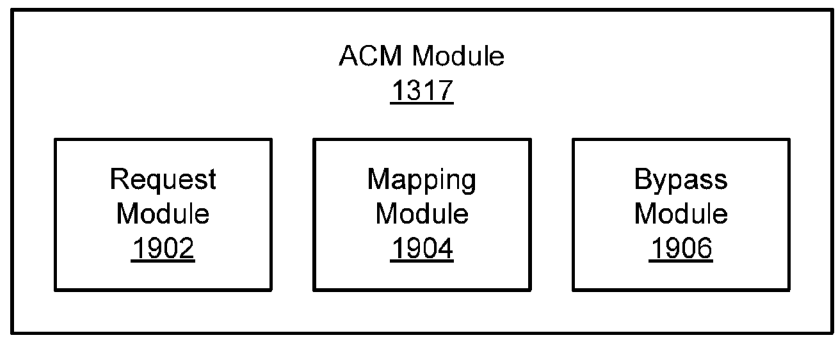
FIG. 10A is a schematic block diagram illustrating one embodiment of an auto-commit memory module.

FIG. 10A depicts one embodiment of an ACM module 1317. The ACM module 1317, in certain embodiments, may be substantially similar to the ACM module 1317 described above with regard to FIG. 5. In other embodiments, the ACM module 1317 may include, may be integrated with, and/or may be in communication with the SML 1050, the storage controller 1004, 1104, 1304, and/or the commit agent 1020.

In general, the ACM module 1317 services auto-commit requests from an ACM user 1016 or other client for the ACM 1011. As described above with regard to the ACM users 1016, as used herein, a client may comprise one or more of an operating system (OS), virtual operating platform (e.g., an OS with a hypervisor), guest OS, application, process, thread, entity, utility, user, or the like, that is configured to access or use the ACM 1011. In the depicted embodiment, the ACM module 1317 includes a request module 1902, a mapping module 1904, and a bypass module 1906. The ACM module 1317, in certain embodiments, provides an interface whereby an ACM user 1016 or other client may access data stored in the byte addressable ACM buffers 1013, whether the ACM buffers 1013 are natively volatile or non-volatile, regardless of the type of media used for the ACM buffers 1013.

Instead of or in addition to the above methods of accessing the ACM 1011, such as using a memory map (e.g., mmap) interface, in certain embodiments, the ACM module 1317 may expose the auto-commit buffers 1013 directly to ACM users 1016 or other clients, bypassing one or more operating system and/or kernel layers, which may otherwise reduce performance of the ACM 1011, increasing access times, introducing delays, or the like. The ACM module 1317 may provide access to the ACM 1011 using an existing I/O interface, such as a standard read/write API or the like, so that ACM users 1016 or other clients may access the ACM 1011 and receive its benefits with little or no modification or customization. In another embodiment, the ACM module 1317 may provide a custom or modified ACM interface, which may provide ACM users 1016 and other clients more control over operation of the ACM 1011 than may be provided by existing interfaces.

As described above, in certain embodiments, the ACM module 1317 and/or the ACM 1011 enable clients such as the ACM users 1016 to access fast, byte-addressable, persistent memory, combining benefits of volatile memory and non-volatile storage. Auto-commit logic inside the hardware of the storage device 102, such as the auto-commit memory 1011 described above with regard to FIG. 1, in certain embodiments, provides power-cut protection for data written to the auto-commit buffers 1013 of the ACM 1011. The ACM module 1317 and/or its sub-modules, in various embodiments, may at least partially be integrated with a device driver executing on the processor 1012 of the host computing device 1014 such as the SML 1050, may at least partially be integrated with a hardware controller 1004, 1104 of the ACM 1011 and/or non-volatile storage device 1102, as microcode, firmware, logic circuits, or the like, or may be divided between a device driver and a hardware controller 1004, 1104, or the like.

In one embodiment, the request module 1902 is configured to monitor, detect, intercept, or otherwise receive requests for data of the non-volatile memory device 1102 from clients, such as the ACM users 1016 described above, another module, a host computing device 1014, or the like. The request module 1902 may receive data requests over an API, a shared library, a communications bus, or another interface. As used herein, a data request may comprise a storage request, a memory request, an auto-commit request, or the like to access data, such as the open, read, write, trim, load, and/or store requests described above.

The request module 1902 may receive data requests using an existing or standard I/O interface, such as read and write requests over the block device interface 1520, load and store commands over the memory semantic interface 1522, or the like. By using the auto-commit buffers 1013 to support standard requests or commands, in certain embodiments, the request module 1902 may allow the ACM users 1016 or other clients to access the ACM 1011 transparently, with little or no modification or customization using the standard requests or commands. For example, an ACM user 1016 may send data requests to the request module 1902 over the block device interface 1520, the memory semantic interface 1522, or the like using standard requests or commands, with no knowledge of whether the ACM module 1317 services or satisfies the request using the auto-commit buffers 1013 or the non-volatile memory media 1110, allowing the mapping module 1904 described below to dynamically determine how to allocate data between the non-volatile memory media 1110 and the auto-commit buffers 1013. The request module 1902 may intercept data requests using an existing or standard interface using a filter driver, overloading an interface, using LD_PRELOAD, intercepting or trapping a segmentation fault, or the like.

In certain embodiments, the request module 1902 may receive data requests using a custom or modified ACM interface, such as an ACM API, the SML API 1019, or the like. Data requests received over a custom or modified interface, in certain embodiments, may indicate whether a requesting ACM user 1016 or other client intends the data request to be serviced using the auto-commit buffers 1013 or the non-volatile memory medium 1102 (e.g., whether data of the request is to be associated with the auto-commit buffers 1013 or the non-volatile memory medium 1102). For example, the request module 1902 may receive data requests including an auto-commit flag indicating whether data of the request is associated with or is to be associated with an auto-commit buffer 1013 of the ACM 1011. An auto-commit flag may comprise a bit, a field, a variable, a parameter, a namespace identifier or other logical identifier, or another indicator.

In certain embodiments, instead of a separate auto-commit flag, a data request may indicate whether the data is associated with an auto-commit buffer 1013 or with the non-volatile memory media 1110 based on a namespace identifier or other logical indicator of the data request. As used herein, a namespace comprises a container or range of logical or physical identifiers that index or identify data, data locations, or the like. As described above, examples of namespaces may include a file system namespace, a LUN namespace, a logical address space, a storage namespace, a virtual memory namespace, a persistent ACM namespace, a volatile memory namespace, an object namespace, a network namespace, a global or universal namespace, a BAR namespace, or the like.

A namespace identifier, as used herein, comprises an indication of a namespace to which data belongs. In one embodiment, a namespace identifier may comprise a logical identifier, as described above. For example, a namespace identifier may include a file identifier and/or an offset from a file system namespace, a LUN ID and an offset from a LUN namespace, an LBA or LBA range from a storage namespace, one or more virtual memory addresses from a virtual memory namespace, an ACM address from a persistent ACM namespace, a volatile memory address from a volatile memory namespace of the host device 1014, an object identifier, a network address, a GUID, UUID, or the like, a BAR address or address range from a BAR namespace, or another logical identifier. In a further embodiment, a namespace identifier may comprise a label or a name for a namespace, such as a directory, a file path, a device identifier, or the like. In another embodiment, a namespace identifier may comprise a physical address or location for data. As described above, certain namespaces, and therefore namespace identifiers, may be temporary or volatile, and may not be available to an ACM user 1016 after a restart event. Other namespaces, and therefore namespace identifiers, may be persistent, such as a file system namespace, a LUN namespace, a persistent ACM namespace, or the like, and data associated with the persistent namespace may be accessible to an ACM user 1016 or other client after a restart event using the persistent namespace identifier.

An address or range of addresses may be associated with a namespace if the address or range of addresses comprises an identifier from the namespace, if the address or range of addresses is mapped into the namespace, or the like. Data or a range of data may be associated with a namespace if the data is stored in a storage medium of the namespace, such as the auto-commit buffers 1013 or the non-volatile memory media 1102, if the data is mapped to the namespace in a logical-to-physical mapping structure, if the data is associated with a namespace identifier for the namespace, or the like.

A logical namespace may be associated with both the auto-commit buffers 1013 and the non-volatile memory media 1110, with different logical identifiers from the logical namespace mapped to different physical identifiers or locations for the auto-commit buffers 1013 and/or the non-volatile memory media 1110. For example, certain data associated with file identifiers of a file system may be stored in the auto-commit buffers 1013 while other data associated with file identifiers of the file system may be stored in the non-volatile memory media 1110, even data at different offsets within the same file.

The request module 1902 may receive an open request to initialize a namespace identifier or other logical identifier, such as opening a file or the like. The request module 1902 may receive a write request, a store request, or the like to store data in the auto-commit buffers 1013 and/or the non-volatile memory medium 1110 of the non-volatile memory device 1102. The request module 1902 may receive a read request, a load request, or the like to read data from the auto-commit buffers 1013 and/or the non-volatile memory medium 1110 of the non-volatile memory device 1102. In one embodiment, a namespace identifier of a data request identifies both a namespace for and data of the data request, such as the logical identifiers described above. In another embodiment, a data request may comprise both a namespace identifier and a separate logical identifier for the data.

The request module 1902, in certain embodiments, may receive data requests in user-space. As used herein, kernel-space may comprise an area of memory (e.g., volatile memory, virtual memory, main memory) of the host computing device 1014; a set of privileges, libraries, or functions; a level of execution; or the like reserved for a kernel, operating system, or other privileged or trusted processes or applications. User-space, as used herein, may comprise an area of memory (e.g., volatile memory, virtual memory, main memory) of the host computing device 1014; a set of privileges, libraries, or functions; a level of execution; or the like available to untrusted, unprivileged processes or applications.

Due to access control restrictions, privilege requirements, or the like for kernel-space, providing a device driver, library, API, or the like for the ACM 1011 in kernel-space may have greater delays than in user-space. Further, use of a storage stack of a kernel or operating system, in certain embodiments, may introduce additional delays. An operating system or kernel storage stack, as used herein, may comprise one or more layers of device drivers, translation layers, file systems, caches, and/or interfaces provided in kernel-space, for accessing a data storage device. As described in greater detail below, with regard to the bypass module 1906, the ACM module 1317 may provide direct access to the ACM 1011 by bypassing and/or replacing one or more layers of an operating system or kernel storage stack, reading and writing data directly between the ACM buffers 1013 and user-space or the like.

In one embodiment, the mapping module 1904 is configured to map or associate namespace identifiers, logical identifiers, or the like to the ACM buffers 1013 and/or the non-volatile memory media 1110. In certain embodiments, the mapping module 1904 may maintain a logical-to-physical mapping structure, as described below with regard to FIG. 11, mapping logical identifiers or other namespace identifiers to physical locations in the non-volatile memory media 1110 and/or the ACM buffers 1013. In one embodiment, the mapping module 1904 may access and/or maintain separate logical-to-physical mapping structures, one for the non-volatile memory media 1110 and one for the ACM buffers 1013. As described above, in certain embodiments, the ACM buffers 1013 and the non-volatile memory media 1110 may be accessible and/or addressable at different granularities. For example, the ACM buffers 1013 may be byte-addressable, while the non-volatile memory media 1110 may be block-addressable (e.g., 512 byte blocks, 4 KiB blocks, or the like).

In response to the request module 1902 receiving a data request for a range of data, for a logical identifier or other namespace identifier, or the like, such as an open request, a write request, a read request, a load request, a store request, or the like, the mapping module 1904 may determine whether there is a relationship between the data and/or namespace identifier and one or more auto-commit buffers 1013. Data and/or a logical identifier or other namespace identifier for the data may have a relationship with an auto-commit buffer 1013 if the data is stored in the auto-commit buffer 1013, if the data is targeted for or intended to be stored in the auto-commit buffer 1013, if the data is identified in a data request for an auto-commit buffer 1013, or the like. The mapping module 1904, in one embodiment, may determine whether an existing association or mapping exists between requested data and/or a namespace identifier and the auto-commit buffers 1013. In a further embodiment, the mapping module 1904 may determine whether or not to map or create an association between requested data and an auto-commit buffer 1013.

In one embodiment, the mapping module 1904 maps or associates data with an auto-commit buffer 1013 in response to an auto-commit flag of a data request for the data, as described above. For example, as described above, in embodiments where the request module 1902 receives data requests over a custom or extended interface, an ACM user 1016 or other client may indicate which data is to be stored in and associated with the auto-commit buffers 1013, using auto-commit flags or other indicators.

In a further embodiment, where the request module 1902 receives data requests transparently, using an existing, standard interface or the like, the mapping module 1904 may dynamically determine which data is stored in and associated with the auto-commit buffers 1013 and which data is stored in the non-volatile memory media 1110. The mapping module 1904 may be configured to optimally distribute data between the auto-commit buffers 1013 and the non-volatile memory media 1110, based on one or more efficiency factors for namespace identifiers, for data, or the like. An efficiency factor, as used herein, may comprise an indicator or representation of an effect or impact of storing or associating data within the auto-commit buffers 1013.

The mapping module 1904 may monitor or track efficiency factors for different data, different ACM users 1016, different namespace identifiers, or the like. In one embodiment, an efficiency factor may include an access frequency for data. For example, the mapping module 1904 may be more likely to store data in the auto-commit buffers 1013 that is more frequently accessed. In various embodiments, efficiency factors may include a size of data, a type of data, a quality of service (QoS) for data or for an ACM user 1016, a service level agreement with an ACM user 1016, an age of data, an amount of available storage capacity in the auto-commit buffers 1013 and/or in the non-volatile memory medium 1110, or the like. The mapping module 1904 may balance or weigh multiple efficiency factors to determine whether to associate or store data of a certain namespace identifier or range of namespace identifiers with the auto-commit buffers 1013.

In one embodiment, the mapping module 1904 cooperates with the SML 1050 to determine mappings for data in a logical address space or other namespace of the non-volatile memory media 1110 and to preserve the mappings as metadata 1051 or a forward index 1053, such as the logical-to-physical mapping structure described below with regard to FIG. 11. In other embodiments, the mapping module 1904 may cooperate with an operating system, a file manager, a storage stack, a memory system 1018, or the like to create mappings, to assign namespace identifiers, or the like.

In certain embodiments, mapping a namespace identifier, such as a filename and an offset, to an ACM buffer 1013, or otherwise initializing or creating a mapping may be a privileged operation, performed in kernel-space or the like. The mapping module 1904 may use an IOCTL call, a shared memory queue between user-space and kernel-space, or the like so that data requests for the auto-commit buffers 1013 can be serviced or satisfied from user-space, while mappings may be performed, at least partially, in kernel-space. In one embodiment, the mapping module 1904, as part of or in addition to mapping namespace identifiers such as filenames and offsets to the auto-commit buffers 1013, maps the associated page of an ACM buffer 1013 into a virtual address space of the requesting ACM user 1016, as described above, so that the data is accessible to the ACM user 1016 as virtual memory of the host computing device 1014.

The mapping module 1904 may map and/or store an entire data object, such as a file or the like, to an ACM buffer 1013. In certain embodiments, the mapping module 1904 may map and/or store a portion of a data object, such as a particular offset or range of data within a file, to an ACM buffer 1013. The mapping module 1904 may map and/or store the remainder of a file mapped partially to an ACM buffer 1013 to the non-volatile memory media 1110.

The mapping module 1904, in certain embodiments, cooperates with the ACM module 1317 and/or a commit agent 1020 to arm ACM buffers 1013 with ACM metadata 1015 including mappings of namespace identifiers, or the like, so that the ACM buffers 1013 are configured to perform appropriate commit actions for the data in the ACM buffers 1013 to remain persistently associated with the namespace identifiers, even after a restart event. In this manner, the ACM users 1016 may continue to access the data using the same namespace identifiers even after the restart event. As described above, the ACM metadata 1015 may include multiple sections, or parts. In one embodiment, the ACM metadata 1015 includes a logical identifier to which the ACM buffer 1013 is to commit the data in the non-volatile memory media 1110 (e.g., an LBA or the like) and a namespace identifier (e.g., a filename, a filename and an offset, an inode number, a LUN address, or the like) for the data, which the commit agent 1020 may use to recover the data after a restart event, allowing the ACM users 1016 to continue to access the data using the namespace identifier.

In one embodiment, the bypass module 1906 is configured to service and/or satisfy requests that the request module 1902 receives, using the ACM buffers 1013 and/or the non-volatile memory media 1110. In response to the mapping module 1904 determining that a namespace identifier of a data request is associated with the ACM buffers 1013, the bypass module 1906 may service or satisfy the data request using the ACM buffers 1013 (e.g., storing the data in the ACM buffers 1013 in response to a write or store request, reading the data from the ACM buffers 1013 in response to a read or load request, or the like).

In certain embodiments, the bypass module 1906 services or satisfies data requests directly from the ACM buffers 1013, accessing hardware of the ACM buffers 1013 directly from user-space without using an operating system or kernel storage stack, writing data directly to the ACM buffers 1013, reading data directly from the ACM buffers 1013, or the like. The bypass module 1906, in embodiments where one or more pages of the ACM buffers 1013 are mapped into virtual memory of an ACM user 1016 on the host device 1014, may access the hardware of the ACM buffers 1013 directly and copy data from the ACM buffers 1013 directly into or from the virtual memory at an offset indicated by a namespace identifier of the data request from user-space, without any kernel-space libraries, calls, memory accesses, or the like.

For example, the bypass module 1906 may be integrated with and/or cooperate with a user-space device driver for the non-volatile memory device 1102, executing on the processor 1012 of the host device 1014, and may service or satisfy data requests by mapping or copying data to and from hardware of the auto-commit buffers 1013 and a virtual memory of a requesting client, such as a shared virtual memory for a plurality of ACM users 1016, separate virtual memory spaces of different ACM users 1016, or the like, all from user-space. By servicing data requests in user-space, directly from an auto-commit buffer 1013 without passing through an operating system or kernel storage stack, in certain embodiments, the bypass module 1906 may reduce operating system or kernel overhead associated with accessing the non-volatile memory device 1102, decrease access times, or the like.

For data requests that the mapping module 1904 determines are not associated with an auto-commit buffer 1013, the bypass module 1906 may service or satisfy the requests using the non-volatile memory medium 1110 (e.g., storing the data in the non-volatile memory medium 1110 in response to a write request, reading the data from the non-volatile memory medium 1110 in response to a read request, or the like). For certain data requests, the mapping module 1904 may determine that a range of data and/or range of namespace identifiers is partially associated with the auto-commit buffers 1013 and partially associated with the non-volatile memory medium 1110, and the bypass module 1906 may split the data request, satisfying it partially from the auto-commit buffers 1013 and partially from the non-volatile memory medium 1110, may consolidate the data in either the auto-commit buffers 1013 or the non-volatile memory medium 1110, or the like.

Figure 10B:
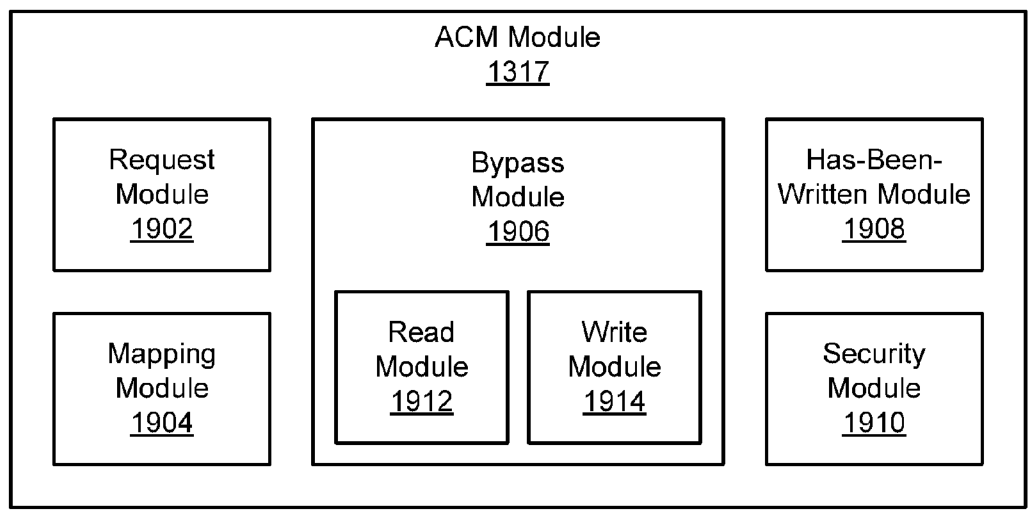
FIG. 10B is a schematic block diagram illustrating another embodiment of an auto-commit memory module.

FIG. 10B depicts another embodiment of an ACM module 1317. In one embodiment, the ACM module 1317 may be substantially similar to one or more of the ACM modules 1317 described above with regard to FIGS. 5 and 10A. In the depicted embodiment, the ACM module 1317 of FIG. 10B includes a request module 1902, a mapping module 1904, and a bypass module 1906 and further includes a has-been-written module 1908 and a security module 1910. The bypass module 1906 in FIG. 10B includes a read module 1912 and a write module 1914. In one embodiment, the request module 1902 and the mapping module 1904 are substantially similar to the request module 1902 and the mapping module 1904 described above with regard to FIG. 10A.

In one embodiment, the bypass module 1906 uses the read module 1912 to service or satisfy read requests for data. The read module 1912, in response to the mapping module 1904 determining that the namespace identifier of a read request is mapped to the auto-commit buffers 1013, reads the data specified in the read request (e.g., data at a specified offset within a file, or the like) directly from the mapped location in the auto-commit buffers 1013 from user-space, bypassing or skipping an operating system or kernel storage stack. If the mapping module 1904 determines that the namespace identifier of the read request is not mapped to or associated with the auto-commit buffers 1013, the read module 1912 may read the data from the non-volatile memory media 1110. The bypass module 1906 may use the read module 1912 to return the read data to a requesting client such as an ACM user 1016, mapping or copying the read data into virtual memory for the requesting client, sending the data to the requesting client, or the like.

In one embodiment, the bypass module 1906 uses the write module 1914 to service or satisfy write requests for data. In response to the mapping module 1904 determining that the namespace identifier of a write request is mapped to the auto-commit buffers 1013, the write module 1914 may write the data specified in the write request directly to the mapped location in the auto-commit buffers 1013 from user-space, bypassing or skipping an operating system or kernel storage stack. If the mapping module 1904 determines that the namespace identifier of the write request is not mapped to or associated with the auto-commit buffers 1013, the write module 1914 may write the data to the non-volatile memory media 1110. The write module 1914 may read or copy the write data from virtual memory for the requesting client, sending the data to the auto-commit buffers 1013 and/or the non-volatile memory media 1110, or the like.

In one embodiment, the has-been-written module 1908 may track which portions of data of the auto-commit buffers 1013 have been updated, are not yet stored in the non-volatile memory media 1110, or the like. In certain embodiments, portions of the data of the auto-commit buffers 1013 may already be stored in and/or committed to the non-volatile memory media 1110. In response to a restart event or another commit trigger, it may be more efficient for the auto-commit buffers 1013 to commit, flush, or destage just data that is not already stored in the non-volatile memory media 1110, instead of committing all of the data. Further, the commit agent 1020 may need to know which portions of a page or other storage region have been updated in order to recover the page or other storage region after a restart event.

Similarly, reading an entire page's contents back into the auto-commit buffers 1013 from the backing non-volatile memory media 1110 may also be an expensive or time consuming operation. For example, if the cost of reading the page contents in from the non-volatile memory media 1110 is 50 us, and each write to the auto-commit buffers 1013 takes 500 ns or less, even if the page is written 100 times after the initial read—the cost of the initial read will still represent 50% of the latency associated with accessing the page.

The has-been-written module 1908 may track which data in the auto-commit buffers 1013 has been updated and is not stored by the non-volatile memory media 1110, which data is already stored in the non-volatile memory media 1110, or the like. For example, the has-been-written module 1908 may maintain a bitmap or other data structure such as a bitmap, bitmask, bit field, table, vector, or the like, populated with indicators of which data has been updated since the data was loaded, since a previous commit operation, or the like. The has-been-written module 1908, periodically or in response to a restart event, may persist a has-been-written bitmap or other data structure to the non-volatile memory media 1110, and the has-been-written module 1908 may cooperate with the commit agent 1020 to merge updates to data and/or different versions of data. In one embodiment, the has-been-written module 1908 allows the auto-commit buffers 1908 to commit or copy just data that has been updated, in response to a commit trigger or restart event, and the commit agent 1020 may merge the updates with a previous version of the data preserved in a sequential log of the non-volatile memory media 1110 after recovery from the restart event or the like.

In one embodiment, the has-been-written module 1908 associates a has-been-written bitmap or other has-been-written metadata with each ACM page of the auto-commit buffers 1013. The has-been-written module 1908 may track updates or changes to data in the auto-commit buffers 1013 at a byte-level, with a bit in a has-been-written bitmap for each byte or the like, indicating whether or not the corresponding byte has been written or updated. Upon destaging, instead of using a read modify write, the controller 1104 may cooperate with the has-been-written module 1908 to identify updated regions of the page, allowing sub-block writes or the like.

In one embodiment, the has-been-written module 1908 may provide ACM users 1016 with access to has-been-written bitmaps. For example, an ACM page of the ACM buffers 1013 may store a last page/block of a log file. Each update to the ACM page may increase the size of the file. Instead of noting and storing each change to the file length, to reduce the overhead of system calls, a has-been-written bitmap from the has-been-written module 1908 may be used to derive a new file length while maintaining the ACM 1011 efficiency.

In a further embodiment, the has-been-written module 1908 may maintain one or more has-been-written data structures at a sub-page granularity, such as a byte granularity, an error correcting code (ECC) chunk or block granularity, or the like. A has-been-written data structure, in certain embodiments, may allow the commit agent 1020 or the like to determine what data within a page is dirty and not stored by the non-volatile memory media 1110, if there are holes in a range of data due to out-of-order delivery, or the like.

The has-been-written module 1908, in certain embodiments, provides access to a has-been-written data structure using memory access (e.g., load/store semantics), provides a "clear-all" byte to clear a set of has-been-written bits at once, or the like. The has-been-written module 1908 may clear or reset has-been-written metadata from a has-been-written data structure in response to the auto-commit buffers 1013 committing, destaging, flushing, or otherwise copying the data to the non-volatile memory media 1110. The has-been-written module 1908, in one embodiment, may use a has-been-written data structure stored in volatile memory to locate data to commit, destage, or flush to the non-volatile memory media 1110 without accessing or reading the non-volatile memory media 1112, preventing an extra read-modify-write operation or the like.

The has-been-written module 1908, in one embodiment, maintains the has-been-written data structure such that it parallels every byte of virtual memory with a corresponding bit that automatically indicates which bytes have indeed had data "stored" to them, been written, been modified, been updated, or the like.

In certain embodiments, the has-been-written module 1908 and/or the SML 1050 may provide one or more has-been-written data structures as part of a persistent storage namespace itself, such as a filesystem namespace, a logical unit number (LUN) namespace, or the like. For example, the has-been-written module 1908 and/or the SML 1050 may provide a has-been-written data structure as a "shadow file" or the like that is designated to contain the bitmask of another file. ACM users 1016 may perform MMIO writes or other operations for both of these files or pages. In another embodiment, a has-been-written data structure may be interleaved within the data it represents, such as a 512 byte bitmask interleaved after each 4 kibibyte block within the same file, or the like.

In one embodiment, the security module 1910 is configured to provide access controls, enforce permissions, protect against attacks, or the like for data stored in the auto-commit buffers 1013 and/or the non-volatile memory media 1110. Because the ACM module 1317 may provide access to the ACM buffers 1013 in user-space, the ACM buffers 1013 may be susceptible to denial-of-service (DoS) or other attacks. For example, an ACM user 1016 may maliciously monopolize bandwidth of the communications bus 1040, such as a PCIe bus or the like. The security module 1910, in one embodiment, monitors or tracks traffic on the communications bus 1040, access to each page of the auto-commit buffers 1013, or the like. The security module 1910, in a further embodiment, may disable access to an ACM user 1016 by unmapping an ACM page of data from the ACM user's virtual memory in response to the monitored access to the ACM page in virtual memory exceeding a traffic threshold, or the like.

As described above, a user-space library, process, or application may be an untrusted entity. In certain embodiments, file system access permissions that are normally enforced by the operating system or kernel in kernel-space, may be bypassed by the bypass module 1906, which operates in user-space as described above. To present this from happening, in one embodiment, the security module 1910 is configured to use virtual memory access controls to enforce file system access permissions associated with data files of the auto-commit buffers 1013 mapped or copied into virtual memory. For example, if the file access permission for a file stored in an ACM page is read-only, the security module 1910 may cooperate with the mapping module 1904 to map the ACM page into virtual memory as read-only. As described above, in certain embodiments, the mapping module 1904 performs mappings in kernel-space, which may allow the security module 1910 to maintain access controls, even if the bypass module 1906 provides access in user-space.

As described above, once data has been stored in the auto-commit buffers 1013, the ACM 1011 preserves or persists the data in non-volatile memory media 110, 1110 and provides the data from the non-volatile memory media 110, 1110 to clients, such as ACM users 1016, after recovery from the restart event.

Figure 11:
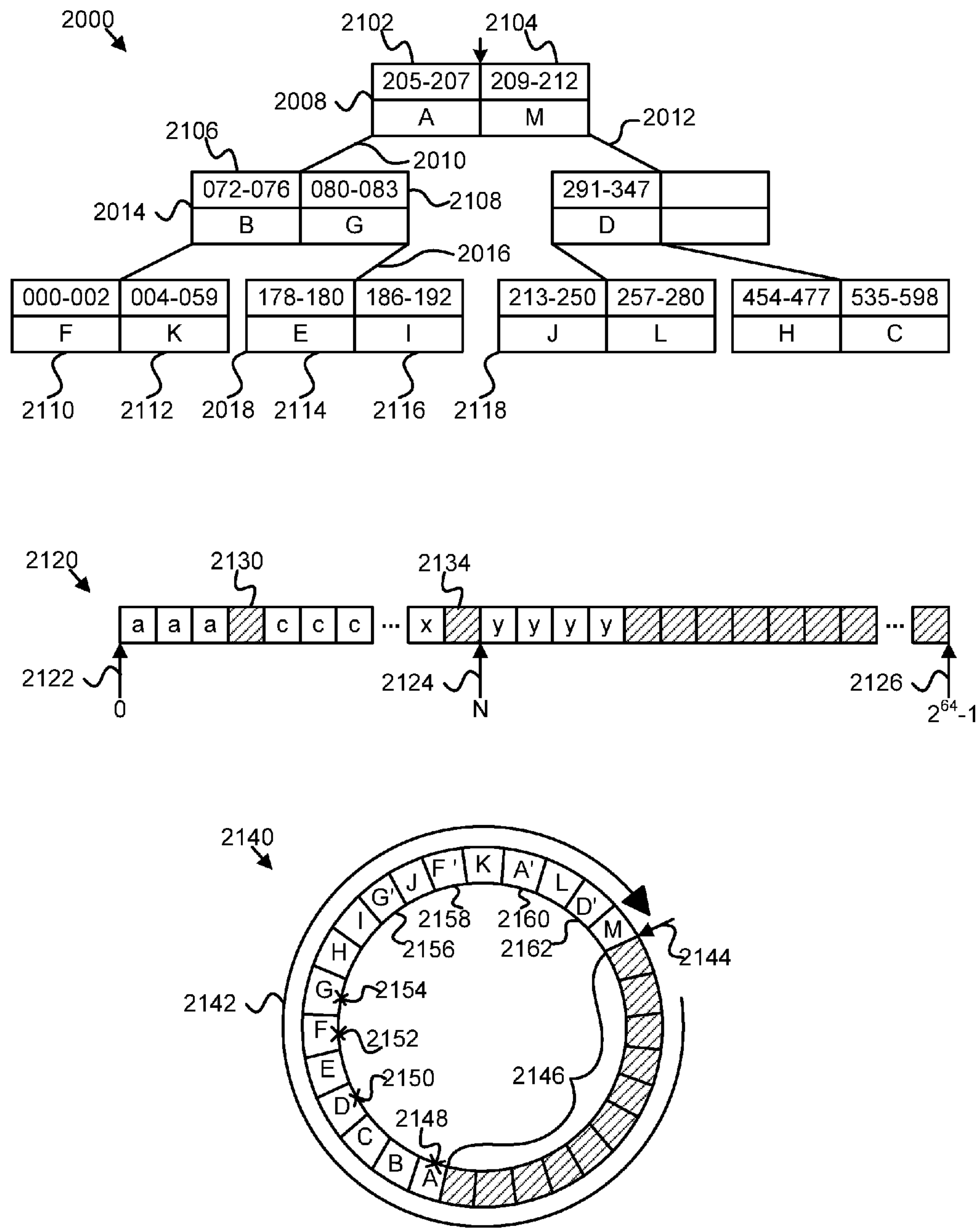
FIG. 11 is a schematic block diagram illustrating one embodiment of a mapping structure, a sparse logical address space, and a log-based writing structure.

The ACM module 1317 and its various sub-modules 1902, 1904, 1906, 1908, 1910, 1912, 1914 as described above, may be disposed in a device driver for the ACM 1011 executing on a processor 1012 of the host device 1014, such as the SML 1050, may be disposed in a storage controller 104, 1004, 1104, 1304 for the ACM 1011, and/or may comprise portions in each of a device driver and a storage controller 104, 1004, 1104, 1304, or the like FIG. 11 depicts one embodiment of an address mapping structure 2000, a logical address space 2120, and a sequential, log-based, append-only writing structure 2140. The address mapping structure 2000, in one embodiment, is maintained by the storage controller 104, 1004, 1104, 1304, the storage management layer 1050, a logical-to-physical translation layer or address mapping structure, or the like to map LBAs or other logical addresses to physical locations on the non-volatile storage media 1110. While the depicted embodiment is described with regard to the non-volatile storage media 1110, in other embodiments, the address mapping structure 2000 may map namespace identifiers for the auto-commit buffers 1013 or the like. The address mapping structure 2000, in the depicted embodiment, is a B-tree with several entries. In the depicted embodiment, the nodes of the address mapping structure 2000 include direct references to physical locations in the non-volatile storage device 1102. In other embodiments, the address mapping structure 2000 may include links that map to entries in a reverse map, or the like. The address mapping structure 2000, in various embodiments, may be used either with or without a reverse map. In other embodiments, the references in the address mapping structure 2000 may include alphanumerical characters, hexadecimal characters, pointers, links, and the like.

The address mapping structure 2000, in the depicted embodiment, includes a plurality of nodes. Each node, in the depicted embodiment, is capable of storing two entries. In other embodiments, each node may be capable of storing a greater number of entries, the number of entries at each level may change as the address mapping structure 2000 grows or shrinks through use, or the like.

Each entry, in the depicted embodiment, maps a variable length range of LBAs of the non-volatile storage device 1102 to a physical location in the storage media 1110 for the non-volatile storage device 1102. Further, while variable length ranges of LBAs, in the depicted embodiment, are represented by a starting address and an ending address, in other embodiments, a variable length range of LBAs may be represented by a starting address and a length, or the like. In one embodiment, the capital letters 'A' through 'M' represent a logical or physical erase block in the physical storage media 1110 of the non-volatile storage device 1102 that stores the data of the corresponding range of LBAs. In other embodiments, the capital letters may represent other physical addresses or locations of the non-volatile storage device 1102. In the depicted embodiment, the capital letters 'A' through 'M' are also depicted in the log-based writing structure 2140 which represents the physical storage media 1110 of the non-volatile storage device 1102.

In the depicted embodiment, membership in the address mapping structure 2000 denotes membership (or storage) in the non-volatile storage device 1102. In another embodiment, an entry may further include an indicator of whether the non-volatile storage device 1102 stores data corresponding to a logical block within the range of LBAs, data of a reverse map, and/or other data.

In the depicted embodiment, the root node 2008 includes entries 2102, 2104 with noncontiguous ranges of LBAs. A "hole" exists at LBA "208" between the two entries 2102, 2104 of the root node. In one embodiment, a "hole" indicates that the non-volatile storage device 1102 does not store data corresponding to one or more LBAs corresponding to the "hole." In one embodiment, the non-volatile storage device 1102 supports block I/O requests (read, write, trim, etc.) with multiple contiguous and/or noncontiguous ranges of LBAs (e.g., ranges that include one or more "holes" in them). A "hole," in one embodiment, may be the result of a single block I/O request with two or more noncontiguous ranges of LBAs. In a further embodiment, a "hole" may be the result of several different block I/O requests with LBA ranges bordering the "hole."

In the depicted embodiment, similar "holes" or noncontiguous ranges of LBAs exist between the entries 2106, 2108 of the node 2014, between the entries 2110, 2112 of the left child node of the node 2014, between entries 2114, 2116 of the node 2018, and between entries of the node 2118. In one embodiment, similar "holes" may also exist between entries in parent nodes and child nodes. For example, in the depicted embodiment, a "hole" of LBAs "060-071" exists between the left entry 2106 of the node 2014 and the right entry 2112 of the left child node of the node 2014.

The "hole" at LBA "003," in the depicted embodiment, can also be seen in the logical address space 2120 of the non-volatile storage device 1102 at logical address "003" 2130. The hash marks at LBA "003" 2140 represent an empty location, or a location for which the non-volatile storage device 1102 does not store data. The "hole" at LBA 2134 in the logical address space 2120, is due to one or more block I/O requests with noncontiguous ranges, a trim or other deallocation command to the non-volatile storage device 1102, or the like. The address mapping structure 2000 supports "holes," noncontiguous ranges of LBAs, and the like due to the sparse and/or thinly provisioned nature of the logical address space 2120.

The logical address space 2120 of the non-volatile storage device 1102, in the depicted embodiment, is sparse and/or thinly provisioned, and is larger than the physical storage capacity and corresponding storage device address space of the non-volatile storage device 1102. In the depicted embodiment, the non-volatile storage device 1102 has a 64 bit logical address space 2120 beginning at logical address "0" 2122 and extending to logical address "264-1" 2126. Because the storage device address space corresponds to only a subset of the logical address space 2120 of the non-volatile storage device 1102, the rest of the logical address space 2120 may be allocated, mapped, and used for other functions of the non-volatile storage device 1102.

The sequential, log-based, append-only writing structure 2140, in the depicted embodiment, is a logical representation of the physical storage media 1110 of the non-volatile storage device 1102. In certain embodiments, the non-volatile storage device 1102 stores data sequentially, appending data to the log-based writing structure 2140 at an append point 2144. The non-volatile storage device 1102, in a further embodiment, uses a storage space recovery process, such as a garbage collection module or other storage space recovery module that re-uses non-volatile storage media 1110 storing deallocated/unused logical blocks. Non-volatile storage media 1110 storing deallocated/unused logical blocks, in the depicted embodiment, is added to an available storage pool 2146 for the non-volatile storage device 1102. By clearing invalid data from the non-volatile storage device 1102, as described above, and adding the physical storage capacity corresponding to the cleared data back to the available storage pool 2146, in one embodiment, the log-based writing structure 2140 is cyclic, ring-like, and has a theoretically infinite capacity.

In the depicted embodiment, the append point 2144 progresses around the log-based, append-only writing structure 2140 in a circular pattern 2142. In one embodiment, the circular pattern 2142 wear balances the non-volatile storage media 122, increasing a usable life of the non-volatile storage media 1110. In the depicted embodiment, a garbage collection module or other storage capacity recovery process has marked several blocks 2148, 2150, 2152, 2154 as invalid, represented by an "X" marking on the blocks 2148, 2150, 2152, 2154. The garbage collection module, in one embodiment, will recover the physical storage capacity of the invalid blocks 2148, 2150, 2152, 2154 and add the recovered capacity to the available storage pool 2146. In the depicted embodiment, modified versions of the blocks 2148, 2150, 2152, 2154 have been appended to the log-based writing structure 2140 as new blocks 2156, 2158, 2160, 2162 in a read, modify, write operation or the like, allowing the original blocks 2148, 2150, 2152, 2154 to be recovered.

Figure 12:
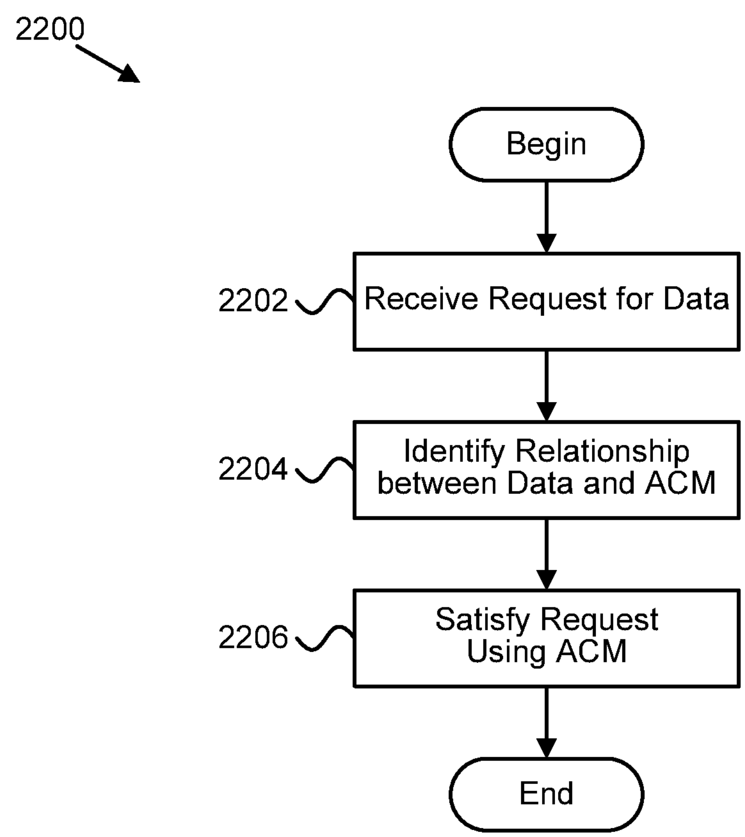
FIG. 12 is a schematic flow chart diagram illustrating one embodiment of a method for providing access to auto-commit memory.

FIG. 12 depicts one embodiment of a method 2200 for providing access to auto-commit memory 1011. The method 2200 begins, and the request module 1902 receives 2202 a request for data. The request may include a namespace identifier for the data. The mapping module 1904 identifies 2204 a relationship between the namespace identifier and an auto-commit buffer 1013. The bypass module 1906 satisfies 2206 or services the received 2202 request using the auto-commit buffer 1013 in response to the identified 2204 relationship associating the namespace identifier with the auto-commit buffer 1013 and the method 2200 ends.

Figure 13:
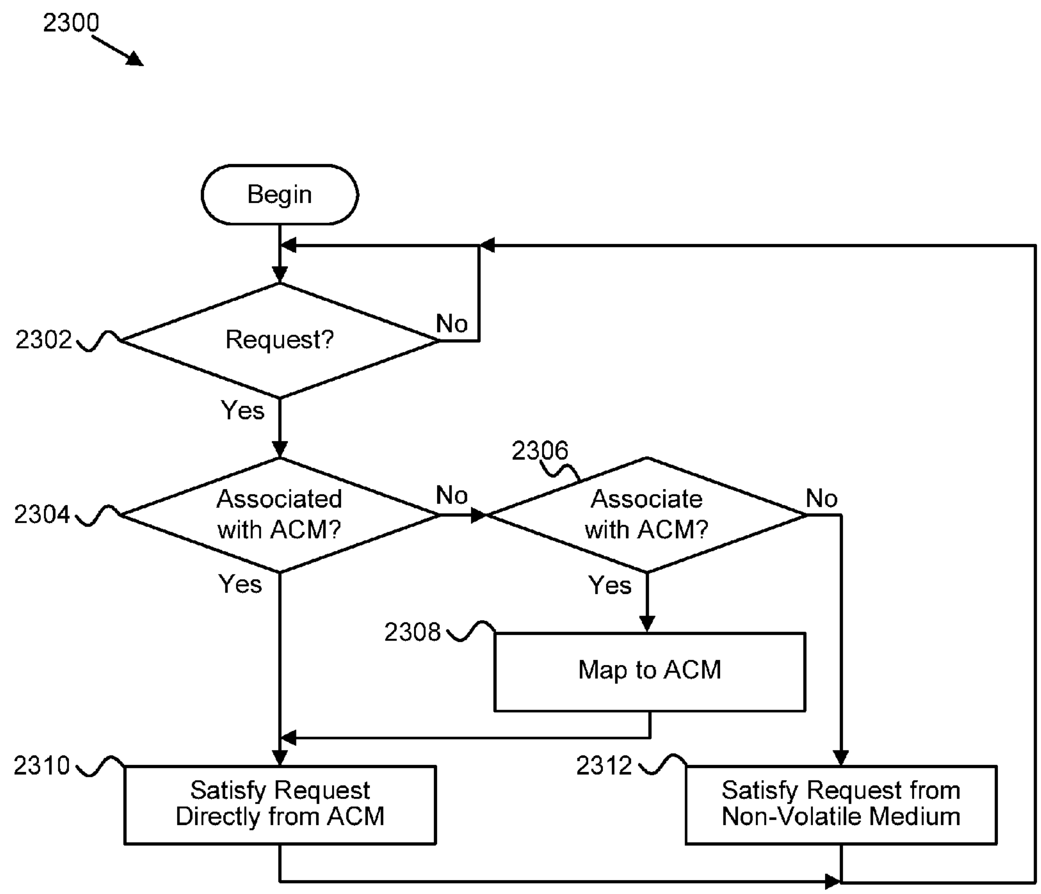
FIG. 13 is a schematic flow chart diagram illustrating another embodiment of a method for providing access to auto-commit memory.

FIG. 13 depicts another embodiment of a method 2300 for providing access to auto-commit memory 1011. The method

2100 begins, and the request module 1902 determines 2302 whether a request for data of the non-volatile memory device 1102 has been received. Once the request module 1902 determines 2302 that a request has been received, the mapping module 1904 determines 2304 whether the data, a namespace identifier or other logical identifier, or the like of the request is associated with the auto-commit memory 1011.

If the mapping module 1904 determines 2304 that the data of the request is not associated with the auto-commit memory 1011, the mapping module 1904 determines 2306 whether to associate the data with the auto-commit memory 1011. If the mapping module 1904 determines 2306 to associate the data with the auto-commit memory 1011, the mapping module 1904 maps 2308 or associates the data of the request with the auto-commit memory 1011, otherwise the storage controller 1104 satisfies 2312 or services the received 2302 request from the non-volatile memory media 1110. The mapping module 1904 may map 2308 the data or cause the data to be mapped 2308 to the auto-commit memory 1011 from kernel-space.

If the mapping module 2304 determines 2304 that the data of the received 2302 request is associated with the auto-commit memory 1011 or if the mapping module 2304 determines 2306 to map 2308 the data to the auto-commit memory 1011, the bypass module 1906 satisfies 2310 or services the received 2302 request directly from the auto-commit memory 1011, bypassing an operations system or kernel storage stack or the like to satisfy 2310 the request from user-space. The request module 1902 continues to monitor 2302 or otherwise receive or intercept requests for data of the non-volatile memory device 1102.

A means for associating a logical identifier or other namespace identifier with a page of auto-commit memory 1011, in various embodiments, may include a storage management layer 1050, a device driver, a storage controller 104, 1004, 1104, 1304, a mapping module 1904, other logic hardware, and/or other executable code stored on a computer readable storage medium. Other embodiments may include similar or equivalent means for associating a namespace identifier with a page of auto-commit memory 1011.

A means for bypassing an operating system storage stack to satisfy a storage request for data of a page of auto-commit memory 1011, in various embodiments, may include a storage management layer 1050, a device driver, a storage controller 104, 1004, 1104, 1304, a mapping module 1904, other logic hardware, and/or other executable code stored on a computer readable storage medium. Other embodiments may include similar or equivalent means for bypassing an operating system storage stack to satisfy a storage request for data of a page of auto-commit memory 1011.

A means for preserving data of a page of auto-commit memory 1011 in response to a failure condition or restart event, in various embodiments, may include a secondary power supply 124, 1024, 1324, an auto-commit memory 1011, 1111, an auto-commit buffer 1013, a commit agent 1020, a commit management module 1122, a commit module 1320, an ACM module 1317, other logic hardware, and/or other executable code stored on a computer readable storage medium. Other embodiments may include similar or equivalent means for preserving data of a page of auto-commit memory 1011 in response to a failure condition.

A means for providing access to preserved data after a failure condition or restart event, in various embodiments, may include a non-volatile storage device 102, a non-volatile memory media 110, 1110, 1310, 1502, a storage management layer 1050, a commit agent 1020, an auto-commit memory 1011, 1111, an auto-commit buffer 1013, logic hardware, and/or other executable code stored on a computer readable storage medium. Other embodiments may include similar or equivalent means for providing access to preserved data after a failure condition or restart event.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus comprising:

a client-addressable volatile memory medium on a circuit board, the circuit board configured to be installed on a memory bus of a processor;

a non-volatile memory medium on the same circuit board, the non-volatile memory medium accessible using a memory semantic interface and a block device interface; and a mapping module configured to selectively store data in one of the volatile memory medium and the non-volatile memory medium, the data provided by way of one or more commands from the processor, wherein storing the data in the non-volatile memory medium using the memory semantic interface comprises storing the data in the client-addressable volatile memory medium and providing metadata to the client-addressable volatile memory medium, the metadata specifying an address of the non-volatile memory medium to which the data is stored in response to a predefined trigger.

2. The apparatus of claim 1, wherein the mapping module is configured to select one of the volatile memory medium and the non-volatile memory medium for storing the data based on an address associated with the data.

3. The apparatus of claim 1, wherein the mapping module is configured to select one of the volatile memory medium and the non-volatile memory medium for storing the data based on a flag included in the one or more commands from the processor.

4. The apparatus of claim 1, further comprising a request module configured to provide access to data of the non-volatile memory medium using memory semantic operations.

5. The apparatus of claim 4, wherein the memory semantic operations comprise one or more of a load memory operation and a store memory operation for the data of the non-volatile memory medium.

6. The apparatus of claim 1, wherein the mapping module comprises a hardware controller on the same circuit board as the volatile memory medium and the non-volatile memory medium.

7. The apparatus of claim 1, wherein the mapping module comprises computer executable code stored on a non-transitory computer readable medium, the computer executable code executable on the processor to selectively store the data in one of the volatile memory medium and the non-volatile memory medium.

8. The apparatus of claim 1, wherein the circuit board comprises a dual in-line memory module comprising the volatile memory medium and the non-volatile memory medium, the dual in-line memory module configured to be received by an adapter of a motherboard comprising the memory bus of the processor.

9. The apparatus of claim 1, wherein one or more of the volatile memory medium and the non-volatile memory medium is accessible over the memory bus using one or more of a double data rate (DDR) interface, a hypertransport interface, a quickpath interconnect interface, a direct memory access (DMA) interface, a remote DMA (RDMA) interface, and a third party DMA interface.

10. The apparatus of claim 1, wherein the data of the volatile memory medium is associated with an identifier of a persistent namespace, the persistent namespace configured to survive a restart event and to grant access to data of the identifier subsequent to the restart event.

11. The apparatus of claim 1, further comprising a secondary power source on the circuit board, wherein the volatile memory medium is within an isolation zone of the non-volatile memory medium and the isolation zone is configured to receive power from the secondary power source in response to the predefined trigger.

12. A system comprising:

a memory device in communication with a central processing unit (CPU);

a volatile memory of the memory device, the volatile memory mapped into an address space of the CPU; and a non-volatile storage medium of the memory device, data of the non-volatile storage medium accessible to the CPU using an address space of the non-volatile storage medium, wherein the memory device provides access to the data of the non-volatile storage medium using a memory semantic interface over a memory bus of the CPU, and using a block device interface over the same memory bus of the CPU, wherein the memory device provides access to the data of the non-volatile storage medium using a memory semantic interface by storing the data in the volatile memory and providing metadata to the volatile memory, the metadata specifying an address of the non-volatile storage medium to which the data is stored in response to a predefined trigger.

13. The system of claim 12, wherein the address space of the non-volatile storage medium comprises a logical address space with logical addresses mapped to physical locations of the non-volatile storage medium.

14. The system of claim 12, further comprising the CPU, a motherboard, and a direct interface to the CPU, wherein the memory device is in communication with the CPU using the direct interface and the memory device is coupled to the motherboard.

15. The system of claim 14, wherein the direct interface comprises the memory bus of the CPU.

16. A method comprising:

receiving first and second requests from a processor over a direct connection with the processor to store data in a storage device in communication with the processor over the direct connection;

storing data of the first request in a client-addressable volatile memory of the storage device; and storing data of the second request in a non-volatile memory of the storage device, the non-volatile memory accessible using a memory semantic interface and a block device interface, wherein storing the data in the non-volatile memory using the memory semantic interface comprises storing the data in the client-addressable volatile memory and providing metadata to the client-addressable volatile memory, the metadata specifying an address of the non-volatile memory to which the data is stored in response to a predefined trigger.

17. The method of claim 16, further comprising determining in which of the volatile memory and the non-volatile memory to store data of the first and second requests in response to receiving the first and second requests based on addresses of the data of the first and second requests.

18. The method of claim 16, wherein at least one of the first and second requests comprises a memory semantic store request.

19. The method of claim 16, wherein at least one of the first and second requests comprises a block storage write request.

* * * * *